(12) United States Patent
Chang

(10) Patent No.: US 11,333,228 B2
(45) Date of Patent: May 17, 2022

(54) RECIPROCATING LINEAR PRIME MOVER

(71) Applicant: Chun-Jong Chang, Zhubei (TW)

(72) Inventor: Chun-Jong Chang, Zhubei (TW)

( * ) Notice: Subject to any disclaimer, the term of this patent is extended or adjusted under 35 U.S.C. 154(b) by 0 days.

(21) Appl. No.: 16/910,218

(22) Filed: Jun. 24, 2020

(65) Prior Publication Data
US 2021/0003198 A1    Jan. 7, 2021

Related U.S. Application Data

(60) Provisional application No. 62/869,033, filed on Jul. 1, 2019.

(51) Int. Cl.
| *F16H 19/06* | (2006.01) |
| *F16H 37/00* | (2006.01) |
| *B62M 9/00* | (2006.01) |
| *F16D 41/24* | (2006.01) |

(52) U.S. Cl.
CPC ............ *F16H 19/06* (2013.01); *B62M 9/00* (2013.01); *F16D 41/24* (2013.01); *F16H 2019/0681* (2013.01)

(58) Field of Classification Search
CPC .. F16H 19/06; F16H 2019/0681; B62M 9/00; B62M 1/28; F16D 41/24
USPC .......................... 74/88, 37, 512, 478, 473.16
See application file for complete search history.

(56) References Cited

U.S. PATENT DOCUMENTS

| 4,169,609 | A | * | 10/1979 | Zampedro | B62M 1/28 280/241 |
| 5,683,321 | A | * | 11/1997 | Barnett | A61G 5/023 280/250 |
| 5,979,922 | A | * | 11/1999 | Becker | B62K 3/005 280/241 |
| 6,000,707 | A | * | 12/1999 | Miller | B62K 3/002 280/251 |
| 6,129,646 | A | * | 10/2000 | Farmos | B62M 1/24 280/241 |
| 8,215,654 | B1 | * | 7/2012 | Leser | B62M 1/28 280/252 |
| 10,882,586 | B2 | * | 1/2021 | Luo | B62M 1/28 |
| 2003/0020254 | A1 | * | 1/2003 | Weaver, II | B62M 1/24 280/252 |
| 2014/0137679 | A1 | * | 5/2014 | Pittini | H02K 7/1004 74/89.23 |
| 2017/0138452 | A1 | * | 5/2017 | Fitzsimmons | A63B 22/00 |

* cited by examiner

*Primary Examiner* — Jake Cook

(57) ABSTRACT

This invention provides a reciprocating linear prime mover, comprising a first roller, disposed on a first driving axis along with a second axis; a second roller, disposed on a second driving axis along with the second axis; a closed first linear driving element winded on and between the first roller and the second roller, comprising a first linear part and a second linear part between the first roller and the second roller, wherein the second linear part is above the first linear part along a (+) third axis; a first part disposed between the first roller and the second roller, wherein the first part is reciprocatingly moved along with the first axis, and the first part comprises a first one-way clutch nearby the inner side of the first linear part and contacting therewith, and a second one-way clutch nearby the inner side of the second linear part and contacting therewith.

1 Claim, 49 Drawing Sheets

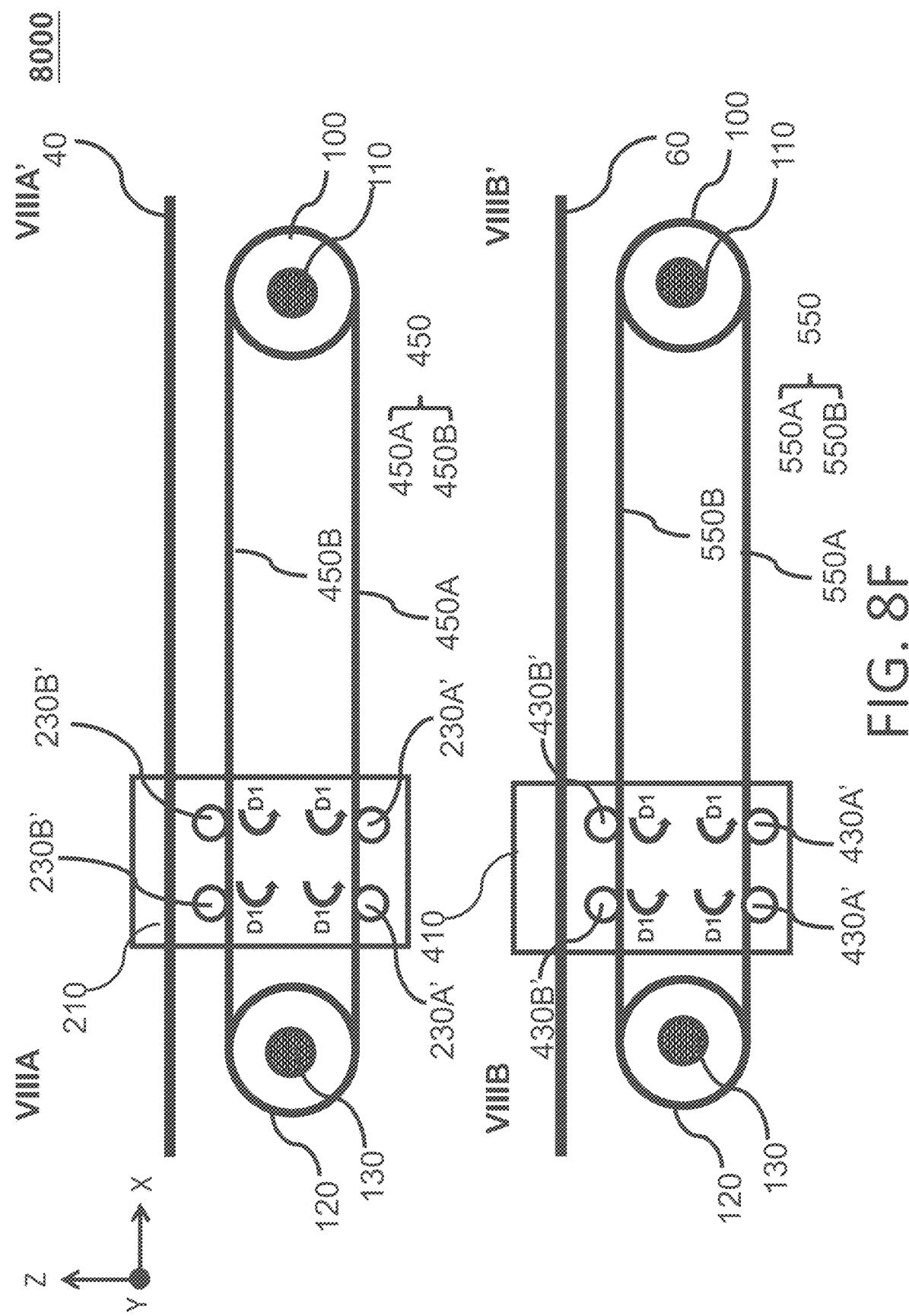

RECIPROCATING LINEAR PRIME MOVER

This application claims the benefit of U.S. provisional patent application No. 62/869,033, filed on Jul. 1, 2019, and the entirety of which is incorporated by reference herein.

BACKGROUND OF THE INVENTION

Field of the Invention

This invention relates to a linear prime mover, and particularly relates to a reciprocating linear prime mover.

Description of the Related Art

During the period of 1867 to 1885, the development of bicycles in Western Europe has been gradually fixed and become a familiar appearance in the world today. In the past 130 years, although flywheels, chains, pneumatic tires, and transmission mechanisms have been invented to improve riding efficiency or comfort, the basic structure of bicycles has not undergone fundamental changes. The most ingrained element is the rotary pedaling prime mover.

As shown in FIGS. 9A-9C, it shows a schematic diagram of a conventional rotary pedaling prime mover at different pedaling angles, wherein R is the turntable lever arm, F is the pedaling force of a leg, A is the angle of forward rotation from the top dead center, B is the angle between the handle and the horizontal plane, B+A=90 degrees, Fø is the component of F in the direction parallel to R, F⊥ is F in the direction perpendicular to R, and the downward pedaling by gravity will produce a torque τ=F×R×sin(A), or τ=F×R×cos(B). Generally speaking, the effective torque applied to the pedal is only in the range of 90 degrees from 2 o'clock to 4 o'clock, and when the pedal reaches the 3 o'clock direction, the moment τ generated by gravity pedaling down can reach the maximum value, that is, τ=F×R. However, when one leg applies force to the pedal lever arm R of the turntable, the lifting of the other leg does not apply torque to the turntable, unless the pedal is equipped with shoe covers or shoe clips, and even if the leg force is greater than the body weight, as long as the human body sitting on the chair cushion, the maximum force that the rider can step on is only the body weight, unless the human body leans forward from the seat and pulls the arms upwards to pull the arms downwards to increase the downward pressure on the pedals. The movement of "stand-up pedaling" has the opportunity to exert pressure under excess body weight; if it is a reclining or recumbent bicycle, although the foot is stepped forward or pulled back (when there is a shoe cover or a shoe jam), each cycle is additional invalid power consumption of leg lift must be applied from bottom dead center to top dead center.

In view of the shortcomings of the above-mentioned rotatory pedaling prime mover, a prime mover that can provide the most effective work is highly expected by the industry. Therefore, the present invention disclose a reciprocating linear pedaling prime mover. The feature of this linear reciprocating pedaling prime mover is that the reciprocating rotatory motion of the legs is modified into the reciprocating linear flexion and extension of the legs, by which one leg is flexed while the other leg is stretching, the combined force of the legs can be multiplied by the force. After each linear motion stroke is completed, the reverse linear motion stroke is repeated, and the driving direction remains unchanged. At any moment of the full stroke of the reciprocating linear flexion and extension of the legs, both can generate 2 times of the instantaneous power equivalent to the maximum moment point of the circular rotation, that is, the moment when the gravity is stepped down, τ=(F1+F2)×R×sin(90 degrees)=(F1+F2)×R×cos (0 degrees)=(F1+F2)×R≅2×F×R.

SUMMARY OF THE INVENTION

One aspect of this invention is to provide a reciprocating linear prime mover, comprising: a first roller, disposed on a first driving axis along with a second axis; a second roller, disposed on a second driving axis along with the second axis; a closed first linear driving element winded on and between the first roller and the second roller, comprising a first linear part and a second linear part between the first roller and the second roller, wherein the second linear part is above the first linear part along with a (+) third axis; a first part disposed between the first roller and the second roller, wherein the first part is reciprocatingly moved along with the first axis, and the first part comprises at least a first one-way clutch nearby the inner side of the first linear part and contacting therewith, and at least a second one-way clutch nearby the inner side of the second linear part and contacting therewith, and the first one-way clutch and the second one-way clutch rotate along with a same first rotation direction D1; and a first forcing apparatus fasten on the first part; wherein, the first axis and the second axis are perpendicular to each other, and the first axis and the third axis are perpendicular to each other; wherein, when the first forcing apparatus is moved to carry the first part to move along with (+) first axis, the second one-way clutch is slipped along with the second linear part without any linkage, and the first one-way clutch is backstoppedly engaged with the first linear part to carry the first linear part to move forward toward (+) first axis and drive the first roller, the first driving axis, the second roller and the second driving axis to rotate along with the same first rotation direction D1; wherein, when the first forcing apparatus is moved to carry the first part to move along with (+) first axis, the first one-way clutch is slipped along with the first linear part without any linkage, and the second one-way clutch is backstoppedly engaged with the second linear part to carry the second linear part to move forward toward (−) first axis and drive the first roller, the first driving axis, the second roller and the second driving axis to rotate along with the same first rotation direction D1.

The reciprocating linear prime mover as mentioned above, further comprising: a closed first linear driving element winded on and between the first roller and the second roller, comprising a third linear part and a fourth linear part between the first roller and the second roller, wherein the fourth linear part is above the third linear part along with a (+) third axis, and the first linear part is adjacent to the third linear part, and the second linear part is adjacent to the fourth linear part; a second part disposed between the first roller and the second roller, wherein the second part is reciprocatingly moved along with the first axis, and the second part comprises at least a third one-way clutch nearby the inner side of the third linear part and contacting therewith, and at least a fourth one-way clutch nearby the inner side of the fourth linear part and contacting therewith, and the third one-way clutch and the fourth one-way clutch rotate along with the same first rotation direction D1 as the first one-way clutch and the second one-way clutch; and a second forcing apparatus fasten on the second part; wherein, when the second forcing apparatus is moved to carry the second part to move along with (+) first axis, the fourth one-way clutch is slipped along with the fourth linear part without any linkage, and the third one-way clutch is backstoppedly engaged with the third linear part to carry the third linear part to move forward toward (+) first axis and drive the first roller, the first driving axis, the second roller and the second driving axis to rotate along with the same first rotation direction D1; wherein, when the second forcing apparatus is moved to carry the second part to move along with (+) first axis, the third one-way clutch is slipped along with the third linear part without any linkage, and the fourth one-way clutch is backstoppedly engaged with the fourth linear part to carry the fourth linear part to move forward toward (−) first axis and drive the first roller, the first driving axis, the second roller and the second driving axis to rotate along with the same first rotation direction D1.

The reciprocating linear prime mover as mentioned above, wherein the first closed driving element and the second closed driving element are integrated as a whole, and the first linear part and the third linear part are integrated as a whole, and the second linear part and the fourth linear part are integrated as a whole.

Another aspect of this invention is to provide another reciprocating linear prime mover, comprising: a first roller, disposed on a first driving axis along with a second axis; a second roller, disposed on a second driving axis along with the second axis; a closed first linear driving element winded on and between the first roller and the second roller, comprising a first linear part and a second linear part between the first roller and the second roller, wherein the second linear part is above the first linear part along with a (+) third axis; a first part disposed between the first roller and the second roller, wherein the first part is reciprocatingly moved along with the first axis, and the first part comprises at least a first one-way clutch nearby the outer side of the first linear part and contacting therewith, and at least a second one-way clutch nearby the outer side of the second linear part and contacting therewith, and the first one-way clutch and the second one-way clutch rotate along with a same second rotation direction D2; and a first forcing apparatus fasten on the first part; wherein, the first axis and the second axis are perpendicular to each other, and the first axis and the third axis are perpendicular to each other; wherein, when the first forcing apparatus is moved to carry the first part to move along with (+) first axis, the second one-way clutch is slipped along with the second linear part without any linkage, and the first one-way clutch is backstoppedly engaged with the first linear part to carry the first linear part to move forward toward (+) first axis and drive the first roller, the first driving axis, the second roller and the second driving axis to rotate along with the same first rotation direction D1; wherein, when the first forcing apparatus is moved to carry the first part to move along with (+) first axis, the first one-way clutch is slipped along with the first linear part without any linkage, and the second one-way clutch is backstoppedly engaged with the second linear part to carry the second linear part to move forward toward (−) first axis and drive the first roller, the first driving axis, the second roller and the second driving axis to rotate along with the same first rotation direction D1.

The reciprocating linear prime mover as mentioned above, further comprising: a closed first linear driving element winded on and between the first roller and the second roller, comprising a third linear part and a fourth linear part between the first roller and the second roller, wherein the fourth linear part is above the third linear part along with a (+) third axis, and the first linear part is adjacent to the third linear part, and the second linear part is adjacent to the fourth linear part; a second part disposed between the first roller and the second roller, wherein the second part is reciprocatingly moved along with the first axis, and the second part comprises at least a third one-way clutch nearby the outer side of the third linear part and contacting therewith, and at least a fourth one-way clutch nearby the outer side of the fourth linear part and contacting therewith, and the third one-way clutch and the fourth one-way clutch rotate along with the same second rotation direction D2 as the first one-way clutch and the second one-way clutch; and a second forcing apparatus fasten on the second part; wherein, when the second forcing apparatus is moved to carry the second part to move along with (+) first axis, the fourth one-way clutch is slipped along with the fourth linear part without any linkage, and the third one-way clutch is backstoppedly engaged with the third linear part to carry the third linear part to move forward toward (+) first axis and drive the first roller, the first driving axis, the second roller and the second driving axis to rotate along with the same first rotation direction D1; wherein, when the second forcing apparatus is moved to carry the second part to move along with (+) first axis, the third one-way clutch is slipped along with the third linear part without any linkage, and the fourth one-way clutch is backstoppedly engaged with the fourth linear part to carry the fourth linear part to move forward toward (−) first axis and drive the first roller, the first driving axis, the second roller and the second driving axis to rotate along with the same first rotation direction D1.

The reciprocating linear prime mover as mentioned above, wherein the first closed driving element and the second closed driving element are integrated as a whole, and the first linear part and the third linear part are integrated as a whole, and the second linear part and the fourth linear part are integrated as a whole.

Another aspect of this invention is to provide another reciprocating linear prime mover, comprising: a first roller, disposed on a first driving axis along with a second axis; a second roller, disposed on a second driving axis along with the second axis; a closed first linear driving element winded on and between the first roller and the second roller, comprising a first linear part and a second linear part between the first roller and the second roller, wherein the second linear part is above the first linear part along with a (+) third axis; a first part disposed between the first roller and the second roller, wherein the first part is reciprocatingly moved along with the first axis, and the first part comprises at least a first two-ways clutch nearby the inner side of the first linear part and contacting therewith, and at least a second two-ways clutch nearby the inner side of the second linear part and contacting therewith, and the first two-ways clutch and the second two-ways clutch rotate along with a same first rotation direction D1 or a same second rotation direction D2; and a first forcing apparatus fasten on the first part; wherein, the first axis and the second axis are perpendicular to each other, and the first axis and the third axis are perpendicular to each other; wherein, when the first forcing apparatus is moved to carry the first part to move along with (+) first axis, and the first two-ways clutch and the second two-ways clutch are controlled to rotate along with the same first rotation direction D1, the second two-ways clutch is slipped along with the second linear part without any linkage, and the first two-ways clutch is backstoppedly engaged with the first linear part to carry the first linear part to move forward toward (+) first axis and drive the first roller, the first driving axis, the second roller and the second driving axis to rotate along with the same first rotation direction D1; wherein, when the first forcing apparatus is moved to carry the first part to move along with (+) first axis, and the first two-ways clutch and the second two-ways clutch are controlled to rotate along with the same first rotation direction D1, the first two-ways clutch is slipped along with the first linear part without any linkage, and the second two-ways clutch is backstoppedly engaged with the second linear part to carry the second linear part to move forward toward (−) first axis and drive the first roller, the first driving axis, the second roller and the second driving axis to rotate along with the same first rotation direction D1; wherein, when the first forcing apparatus is moved to carry the first part to move along with (+) first axis, and the first two-ways clutch and the second two-ways clutch are controlled to rotate along with the same second rotation direction D2, the first two-ways clutch is slipped along with the first linear part without any linkage, and the second two-ways clutch is backstoppedly engaged with the second linear part to carry the second linear part to move forward toward (+) first axis and drive the first roller, the first driving axis, the second roller and the second driving axis to rotate along with the same second rotation direction D2; wherein, when the first forcing apparatus is moved to carry the first part to move along with (+) first axis, and the first two-ways clutch and the second two-ways clutch are controlled to rotate along with the same second rotation direction D2, the second two-ways clutch is slipped along with the second linear part without any linkage, and the first two-ways clutch is backstoppedly engaged with the first linear part to carry the first linear part to move forward toward (−) first axis and drive the first roller, the first driving axis, the second roller and the second driving axis to rotate along with the same second rotation direction D2.

The reciprocating linear prime mover as mentioned above, further comprising: a closed first linear driving element winded on and between the first roller and the second roller, comprising a third linear part and a fourth linear part between the first roller and the second roller, wherein the fourth linear part is above the third linear part along with a (+) third axis, and the first linear part is adjacent to the third linear part, and the second linear part is adjacent to the fourth linear part; a second part disposed between the first roller and the second roller, wherein the second part is reciprocatingly moved along with the first axis, and the second part comprises at least a third two-ways clutch nearby the inner side of the third linear part and contacting therewith, and at least a fourth two-ways clutch nearby the inner side of the fourth linear part and contacting therewith, and the third two-ways clutch and the fourth two-ways clutch rotate along with the same first rotation direction D1 or the same second rotation direction D2 as the first two-ways clutch and the second two-ways clutch; and a second forcing apparatus fasten on the second part; wherein, when the second forcing apparatus is moved to carry the second par to move along with (+) first axis, and the third two-ways clutch and the fourth two-ways clutch are controlled to rotate along with the same first rotation direction D1, the fourth two-ways clutch is slipped along with the fourth linear part without any linkage, and the third two-ways clutch is backstoppedly engaged with the third linear part to carry the third linear part to move forward toward (+) first axis and drive the first roller, the first driving axis, the second roller and the second driving axis to rotate along with the same first rotation direction D1; wherein, when the first forcing apparatus is moved to carry the second par to move along with (+) first axis, and the third two-ways clutch and the fourth two-ways clutch are controlled to rotate along with the same first rotation direction D1, the third two-ways clutch is slipped along with the third linear part without any linkage, and the fourth two-ways clutch is backstoppedly engaged with the fourth linear part to carry the second linear part to move forward toward (−) first axis and drive the first roller, the first driving axis, the second roller and the second driving axis to rotate along with the same first rotation direction D1; wherein, when the first forcing apparatus is moved to carry the second par to move along with (+) first axis, and the third two-ways clutch and the fourth two-ways clutch are controlled to rotate along with the same second rotation direction D2, the third two-ways clutch is slipped along with the third linear part without any linkage, and the fourth two-ways clutch is backstoppedly engaged with the fourth linear part to carry the fourth linear part to move forward toward (+) first axis and drive the first roller, the first driving axis, the second roller and the second driving axis to rotate along with the same second rotation direction D2; wherein, when the first forcing apparatus is moved to carry the second par to move along with (+) first axis, and the third two-ways clutch and the fourth two-ways clutch are controlled to rotate along with the same second rotation direction D2, the fourth two-ways clutch is slipped along with the fourth linear part without any linkage, and the third two-ways clutch is backstoppedly engaged with the third linear part to carry the third linear part to move forward toward (−) first axis and drive the first roller, the first driving axis, the second roller and the second driving axis to rotate along with the same second rotation direction D2.

The reciprocating linear prime mover as mentioned above, wherein the first closed driving element and the second closed driving element are integrated as a whole, and the first linear part and the third linear part are integrated as a whole, and the second linear part and the fourth linear part are integrated as a whole.

Another aspect of this invention is to provide another reciprocating linear prime mover, comprising: a first roller, disposed on a first driving axis along with a second axis; a second roller, disposed on a second driving axis along with the second axis; a closed first linear driving element winded on and between the first roller and the second roller, comprising a first linear part and a second linear part between the first roller and the second roller, wherein the second linear part is above the first linear part along with a (+) third axis; a first part disposed between the first roller and the second roller, wherein the first part is reciprocatingly moved along with the first axis, and the first part comprises at least a first two-ways clutch nearby the outer side of the first linear part and contacting therewith, and at least a second two-ways clutch nearby the outer side of the second linear part and contacting therewith, and the first two-ways clutch and the second two-ways clutch rotate along with a same first rotation direction D1 or a same second rotation direction D2; and a first forcing apparatus fasten on the first part; wherein, the first axis and the second axis are perpendicular to each other, and the first axis and the third axis are perpendicular to each other; wherein, when the first forcing apparatus is moved to carry the first part to move along with (+) first axis, and the first two-ways clutch and the second two-ways clutch are controlled to rotate along with the same second rotation direction D2, the second two-ways clutch is slipped along with the second linear part without any linkage, and the first two-ways clutch is backstoppedly engaged with the first linear part to carry the first linear part to move forward toward (+) first axis and drive the first roller, the first driving axis, the second roller and the second driving axis to rotate along with the same first rotation direction D1; wherein, when the first forcing apparatus is moved to carry the first part to move along with (+) first axis, and the first two-ways clutch and the second two-ways clutch are controlled to rotate along with the same second rotation direction D2, the first two-ways clutch is slipped along with the first linear part without any linkage, and the second two-ways clutch is backstoppedly engaged with the second linear part to carry the second linear part to move forward toward (−) first axis and drive the first roller, the first driving axis, the second roller and the second driving axis to rotate along with the same first rotation direction D1; wherein, when the first forcing apparatus is moved to carry the first part to move along with (+) first axis, and the first two-ways clutch and the second two-ways clutch are controlled to rotate along with the same first rotation direction D1, the first two-ways clutch is slipped along with the first linear part without any linkage, and the second two-ways clutch is backstoppedly engaged with the second linear part to carry the second linear part to move forward toward (+) first axis and drive the first roller, the first driving axis, the second roller and the second driving axis to rotate along with the same second rotation direction D2; wherein, when the first forcing apparatus is moved to carry the first part to move along with (+) first axis, and the first two-ways clutch and the second two-ways clutch are controlled to rotate along with the same first rotation direction D1, the second two-ways clutch is slipped along with the second linear part without any linkage, and the first two-ways clutch is backstoppedly engaged with the first linear part to carry the first linear part to move forward toward (−) first axis and drive the first roller, the first driving axis, the second roller and the second driving axis to rotate along with the same second rotation direction D2.

The reciprocating linear prime mover as mentioned above, further comprising: a closed first linear driving element winded on and between the first roller and the second roller, comprising a third linear part and a fourth linear part between the first roller and the second roller, wherein the fourth linear part is above the third linear part along with a (+) third axis, and the first linear part is adjacent to the third linear part, and the second linear part is adjacent to the fourth linear part; a second part disposed between the first roller and the second roller, wherein the second part is reciprocatingly moved along with the first axis, and the second part comprises at least a third two-ways clutch nearby the outer side of the third linear part and contacting therewith, and at least a fourth two-ways clutch nearby the outer side of the fourth linear part and contacting therewith, and the third two-ways clutch and the fourth two-ways clutch rotate along with the same first rotation direction D1 or the same second rotation direction D2 as the first two-ways clutch and the second two-ways clutch; and a second forcing apparatus fasten on the second part; wherein, when the second forcing apparatus is moved to carry the second par to move along with (+) first axis, and the third two-ways clutch and the fourth two-ways clutch are controlled to rotate along with the same second rotation direction D2, the fourth two-ways clutch is slipped along with the fourth linear part without any linkage, and the third two-ways clutch is backstoppedly engaged with the third linear part to carry the third linear part to move forward toward (+) first axis and drive the first roller, the first driving axis, the second roller and the second driving axis to rotate along with the same first rotation direction D1; wherein, when the first forcing apparatus is moved to carry the second par to move along with (+) first axis, and the third two-ways clutch and the fourth two-ways clutch are controlled to rotate along with the same second rotation direction D2, the third two-ways clutch is slipped along with the third linear part without any linkage, and the fourth two-ways clutch is backstoppedly engaged with the fourth linear part to carry the second linear part to move forward toward (−) first axis and drive the first roller, the first driving axis, the second roller and the second driving axis to rotate along with the same first rotation direction D1; wherein, when the first forcing apparatus is moved to carry the second par to move along with (+) first axis, and the third two-ways clutch and the fourth two-ways clutch are controlled to rotate along with the same first rotation direction D1, the third two-ways clutch is slipped along with the third linear part without any linkage, and the fourth two-ways clutch is backstoppedly engaged with the fourth linear part to carry the fourth linear part to move forward toward (+) first axis and drive the first roller, the first driving axis, the second roller and the second driving axis to rotate along with the same second rotation direction D2; wherein, when the first forcing apparatus is moved to carry the second par to move along with (+) first axis, and the third two-ways clutch and the fourth two-ways clutch are controlled to rotate along with the same second rotation direction D2, the fourth two-ways clutch is slipped along with the fourth linear part without any linkage, and the third two-ways clutch is backstoppedly engaged with the third linear part to carry the third linear part to move forward toward (−) first axis and drive the first roller, the first driving axis, the second roller and the second driving axis to rotate along with the same second rotation direction D2.

The reciprocating linear prime mover as mentioned above, wherein the first closed driving element and the second closed driving element are integrated as a whole, and the first linear part and the third linear part are integrated as a whole, and the second linear part and the fourth linear part are integrated as a whole.

BRIEF DESCRIPTION OF THE DRAWINGS

FIGS. 8B-8H are cross-sectional views along with cross-sectional lines VIIIA-VIIIA' and VIIIB-VIIIB' of FIG. 8A.

DETAILED DESCRIPTION OF THE INVENTION

The making and using of the embodiments of the present disclosure are discussed in detail below. However, it should be noted that the embodiments provide many applicable inventive concepts that can be embodied in a variety of specific methods. The specific exemplary embodiments discussed are merely illustrative of specific methods to make and use the embodiments, and do not limit the scope of the disclosure.

EMBODIMENTS

Embodiment 1

Figure 1A:
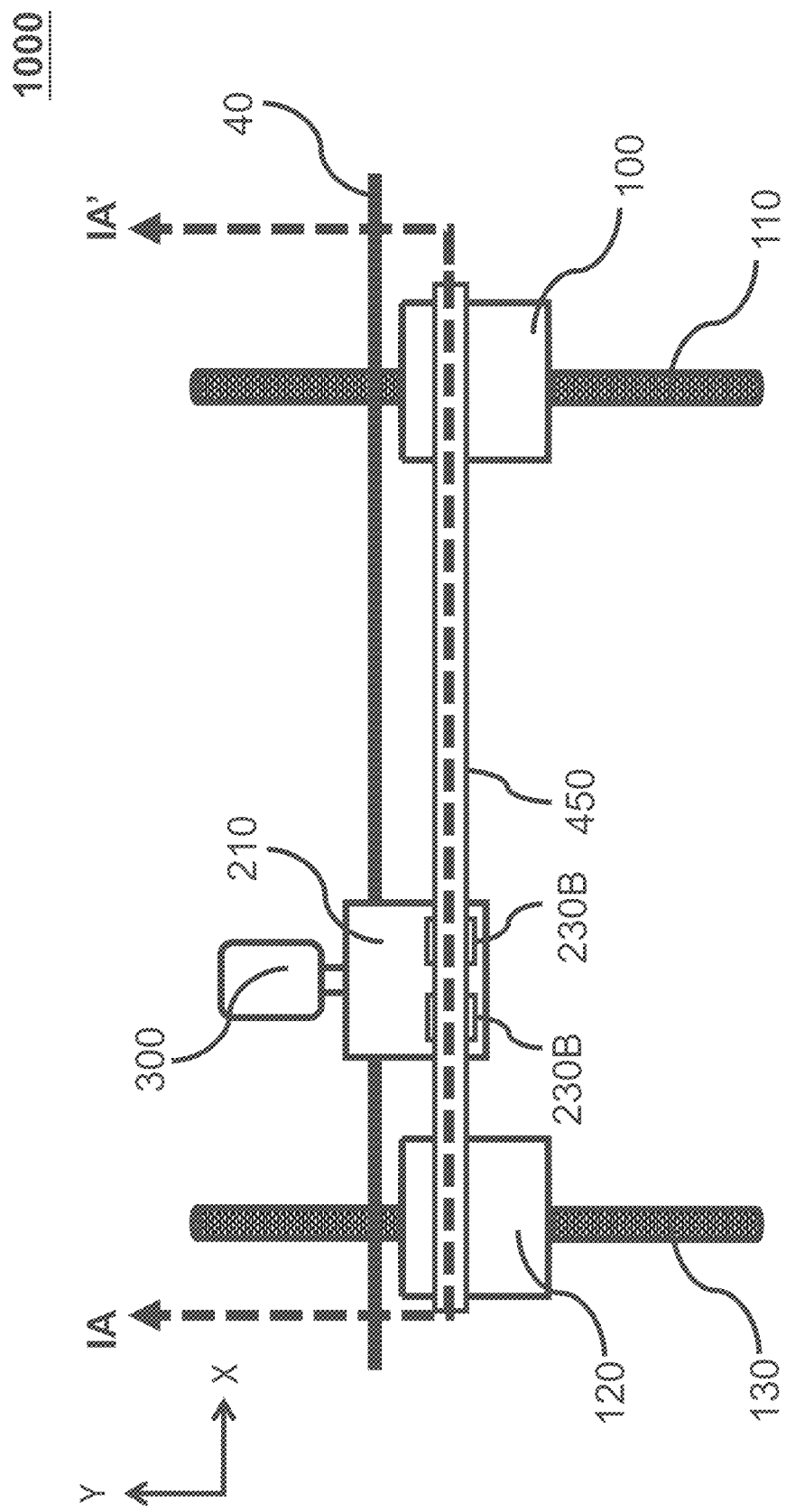
FIG. 1A is a top view illustrating the reciprocating linear prime mover 1000 according to Embodiment 1 of this invention.
Figure 1B:
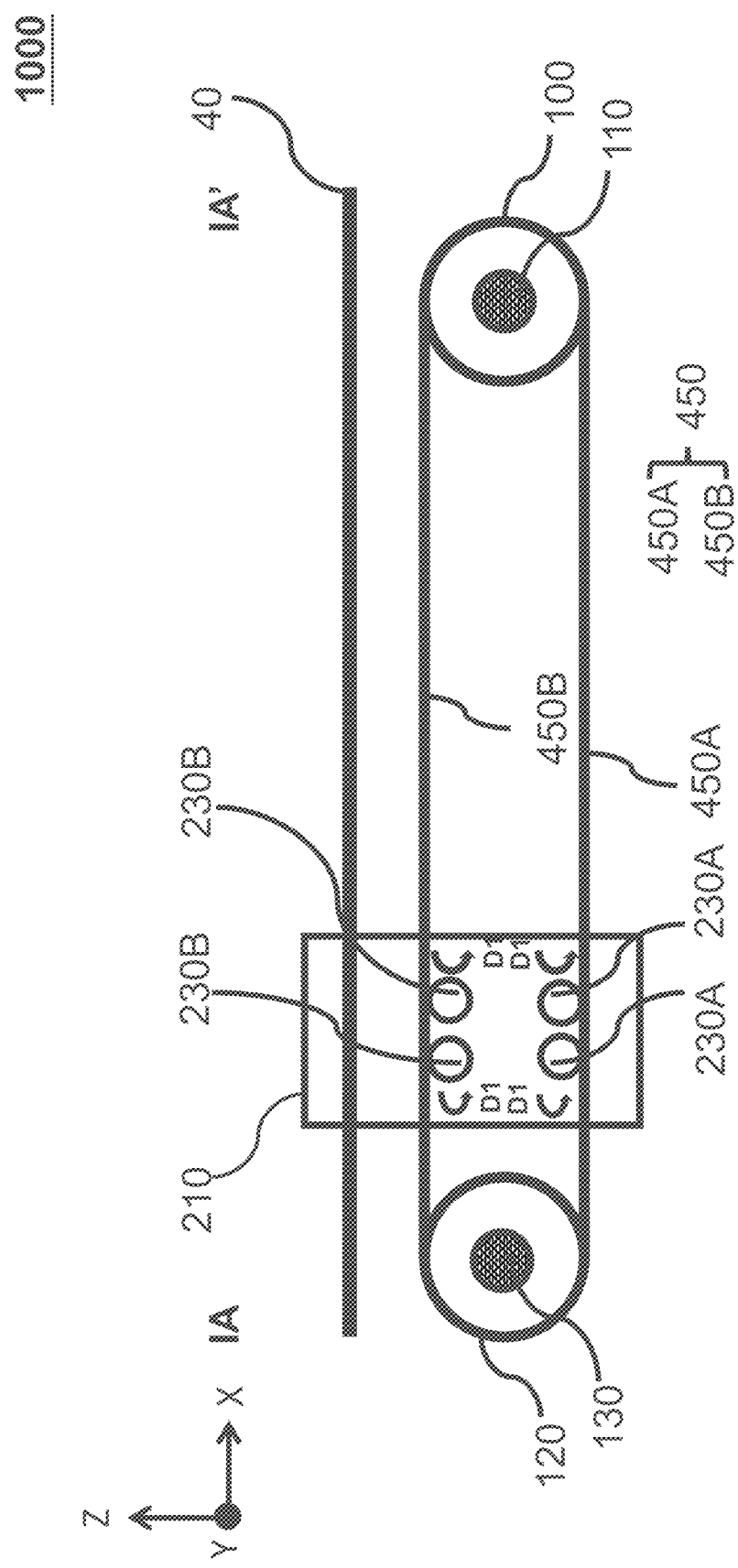
FIGS. 1B-1D are cross-sectional views along with cross-sectional line IA-IA' of FIG. 1A.

Please refer FIG. 1A and FIGS. 1B-1D. FIG. 1A is a top view illustrating the reciprocating linear prime mover 1000 according to Embodiment 1 of this invention. FIGS. 1B-0.1D are cross-sectional views along with cross-sectional line IA-IA' of FIG. 1A.

As shown in FIGS. 1A and 1B, a reciprocating linear prime mover 1000 according to this present Embodiment 1 is disclosed, wherein the reciprocating linear prime mover 1000 comprises a first roller 1000 disposed on a first driving axis 110 along with a second axis; a second roller 120 disposed on a second driving axis 130 along with the second axis; a closed first linear driving element 450 winded on the first roller 100 and the second roller 120, wherein the closed first linear driving element 450 comprises a first linear part 450A and a second linear part 450B between the first roller 100 and the second roller 120, wherein the second linear part 450B is above the first linear part 450A along with a (+) third axis; a first part 210 disposed between the first roller 100 and the second roller 120, wherein the first part 210 is reciprocatingly moved along with the first axis, and the first part 210 comprises at least a first one-way clutch 230A nearby the inner side of the first linear part 450A and contacting therewith, and at least a second one-way clutch 230B nearby the inner side of the second linear part 450B and contacting therewith, and the first one-way clutch 230A and the second one-way clutch 230B rotate along with a same first rotation direction D1; and a first forcing apparatus 300 fasten on the first part 210; wherein, the first axis and the second axis are perpendicular to each other, and the first axis and the third axis are perpendicular to each other. According to this present Embodiment 1, the first axis is X-axis, the second axis is Y-axis, and the third axis is Z-axis.

Figure 1C:
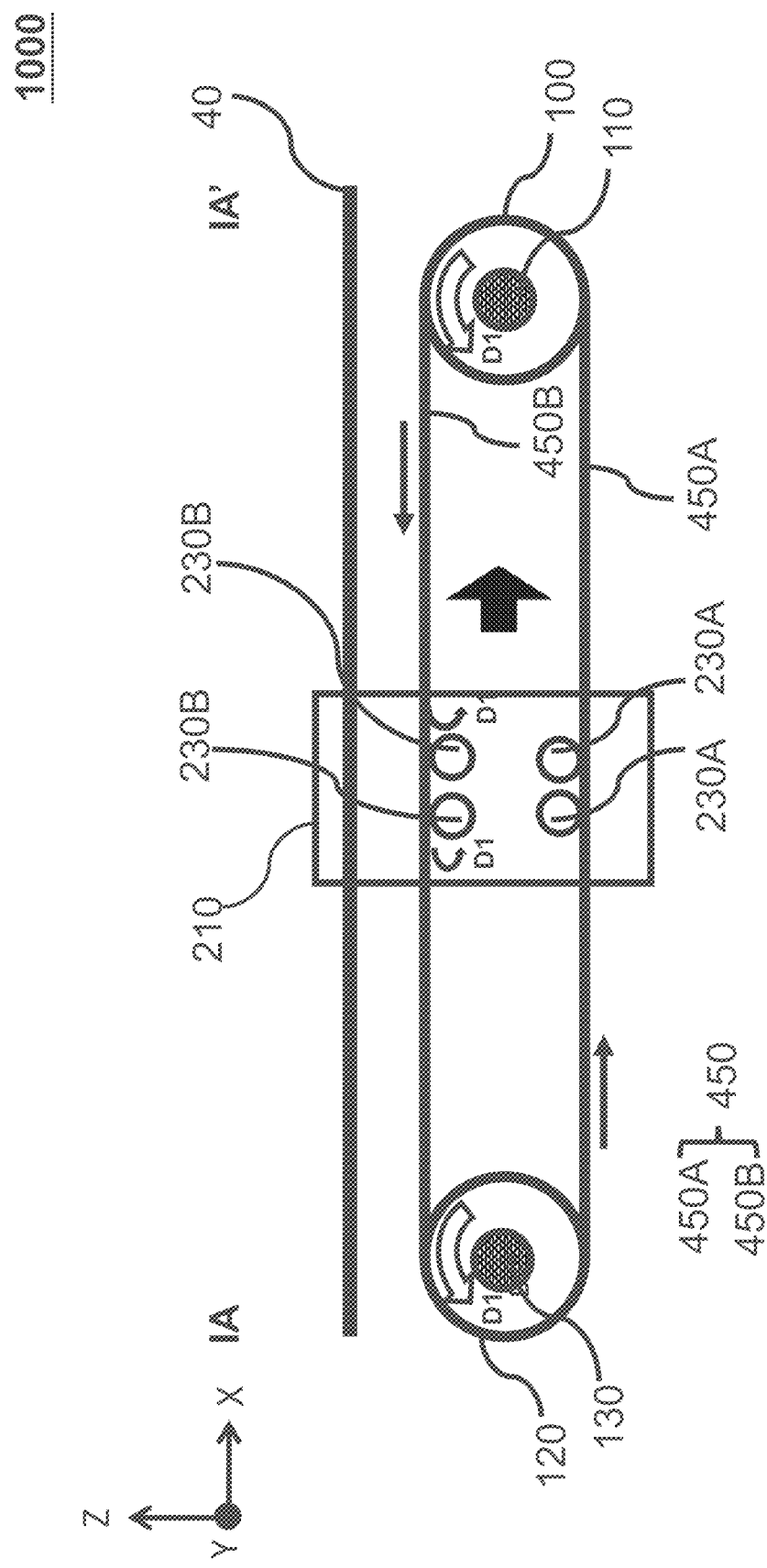

As shown in FIG. 1C, when the first forcing apparatus 300 is moved to carry the first part 210 to move along with (+) first axis, the second one-way clutch 230B is slipped along with the second linear part 450B without any linkage, and the first one-way clutch 230A is backstoppedly engaged with the first linear part 450A to carry the first linear part 450A to move forward toward (+) first axis and drive the first roller 100, the first driving axis 110, the second roller 120 and the second driving axis 130 to rotate along with the same first rotation direction D1.

Figure 1D:
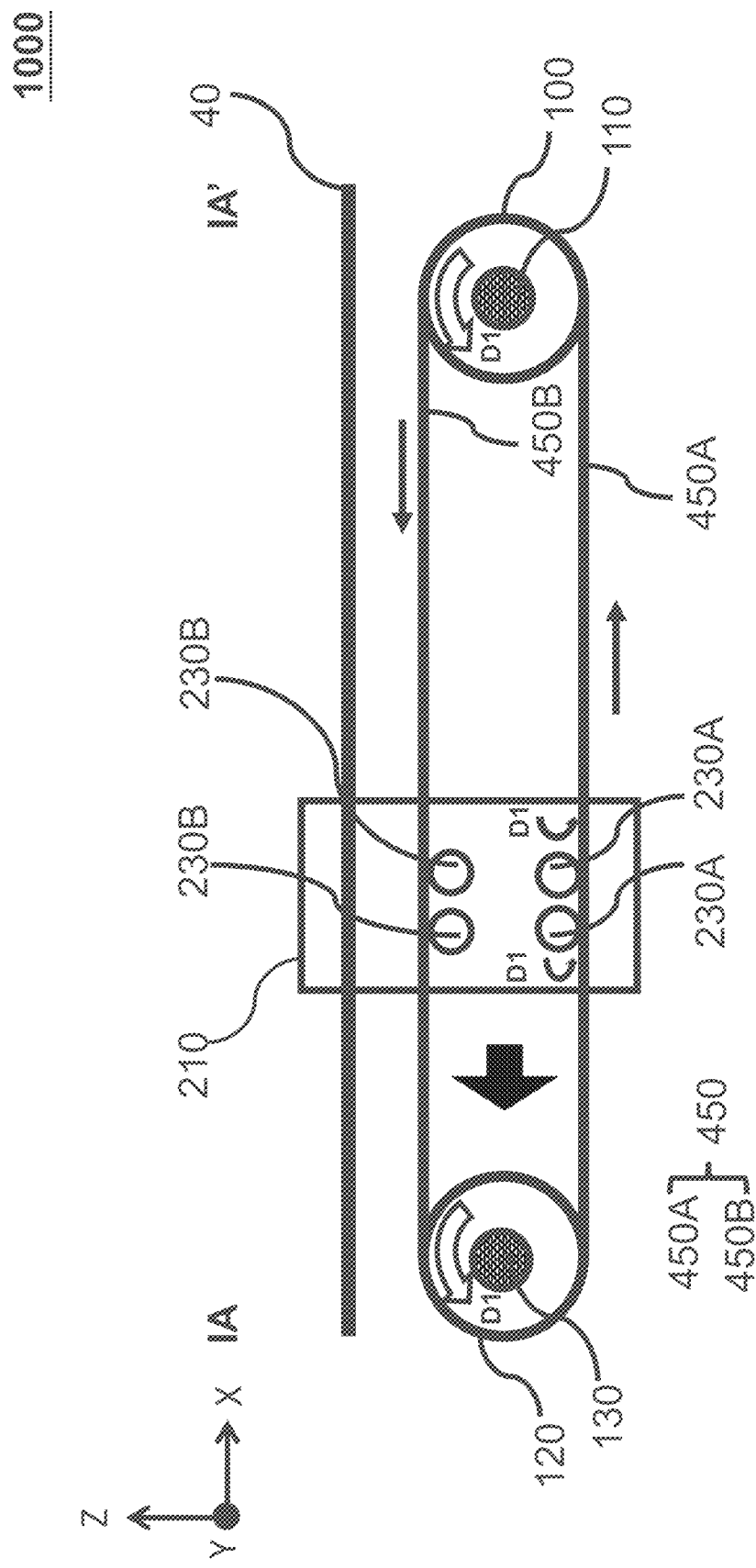

As shown in FIG. 1D, when the first forcing apparatus 300 is moved to carry the first part 210 to move along with (+) first axis, the first one-way clutch 230A is slipped along with the first linear part 450A without any linkage, and the second one-way clutch 230B is backstoppedly engaged with the second linear part 450B to carry the second linear part 450B to move forward toward (−) first axis and drive the first roller 100, the first driving axis 110, the second roller 120 and the second driving axis 130 to rotate along with the same first rotation direction D1.

Furthermore, according to other embodiment of this invention, the reciprocating linear prime mover 1000 can optionally comprises a guiding mechanism 40, for example but not limited to a guiding rail or a cable line, and the first part 210 can be guided by the guiding mechanism 40 to reciprocatingly move along with the first axis.

Embodiment 2

Figure 2A:
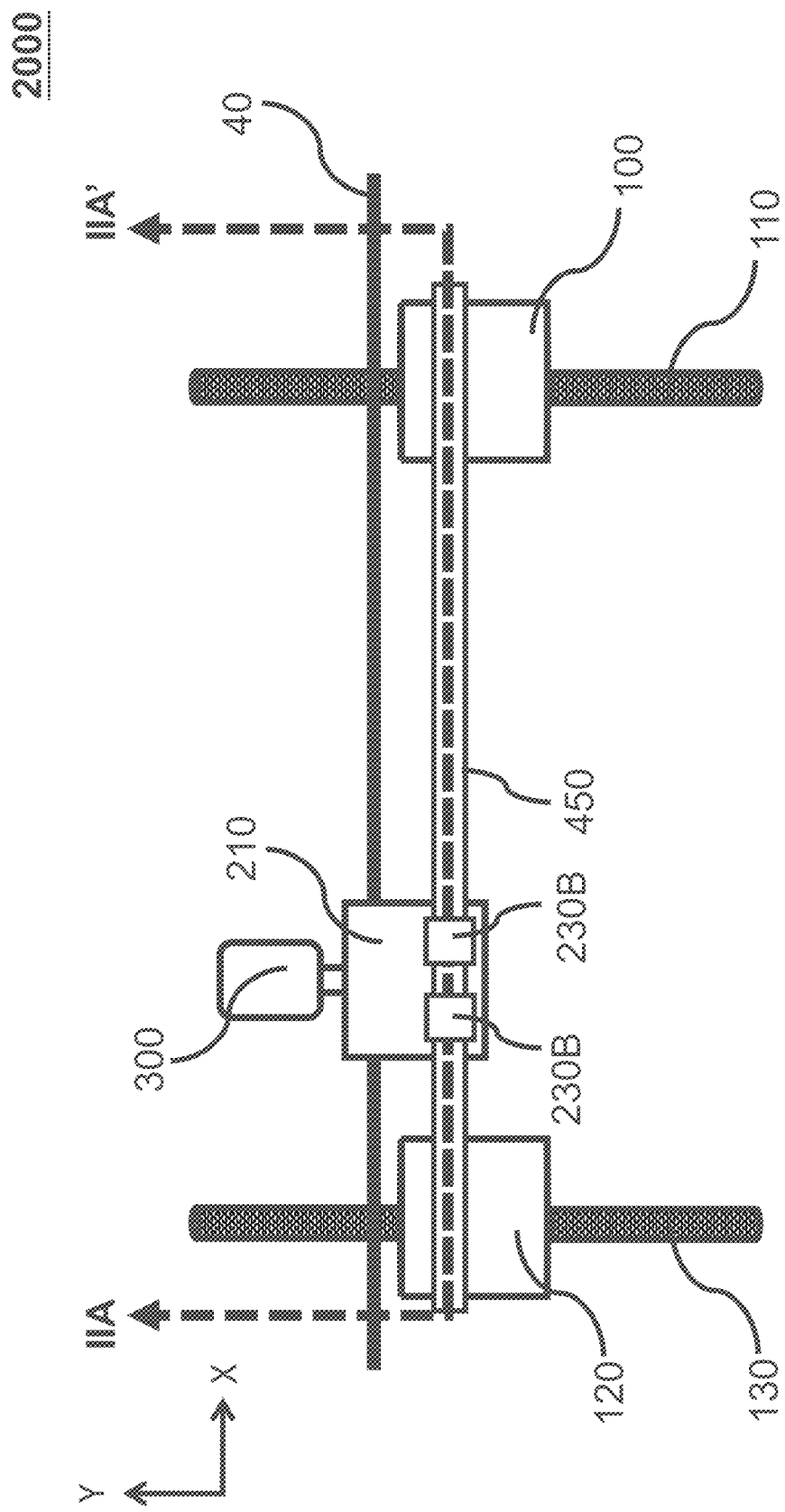
FIG. 2A is a top view illustrating the reciprocating linear prime mover 2000 according to Embodiment 2 of this invention.
Figure 2B:
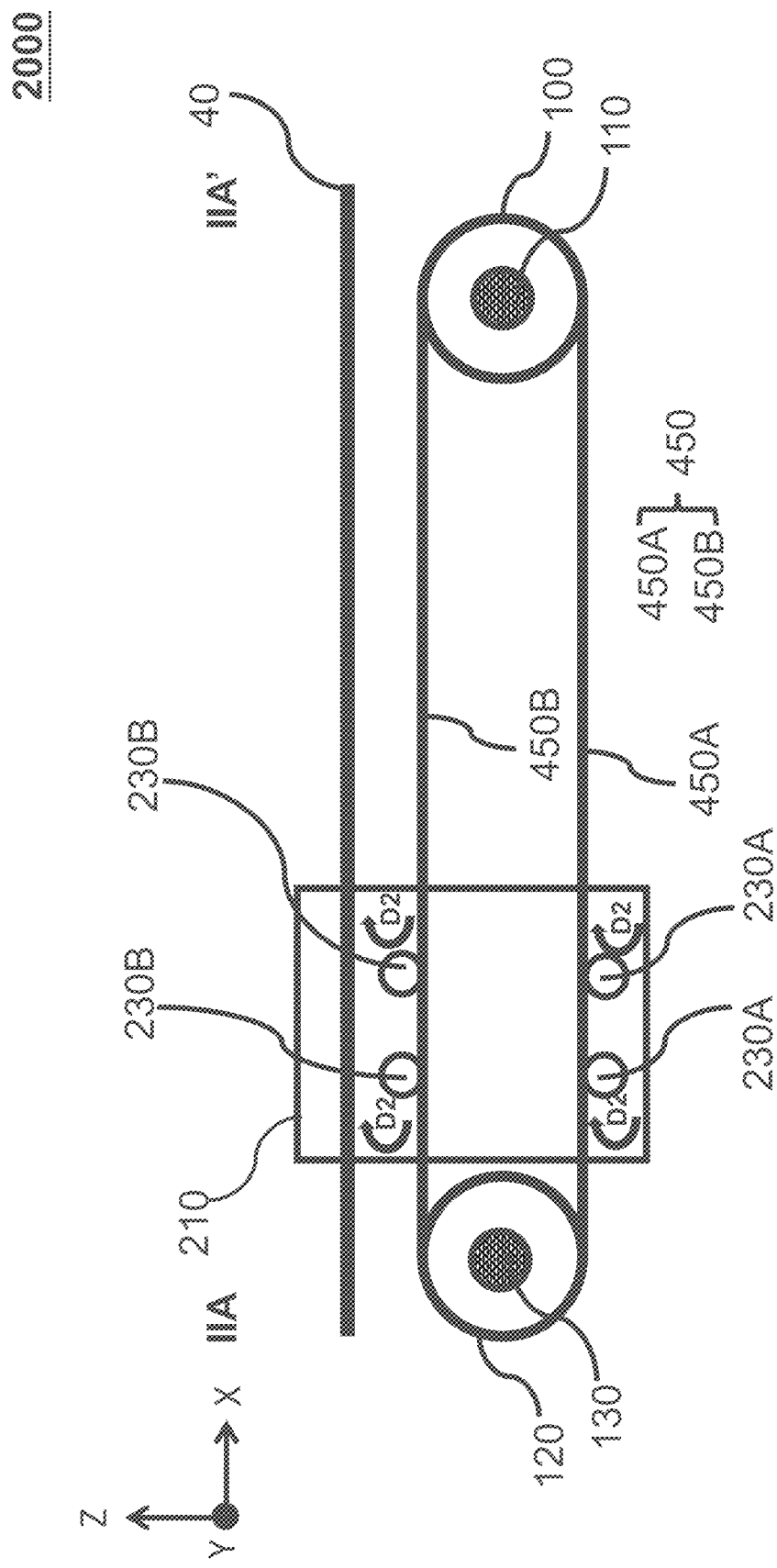
FIGS. 2B-2D are cross-sectional views along with cross-sectional line IIA-IIA' of FIG. 2A.
Figure 2C:
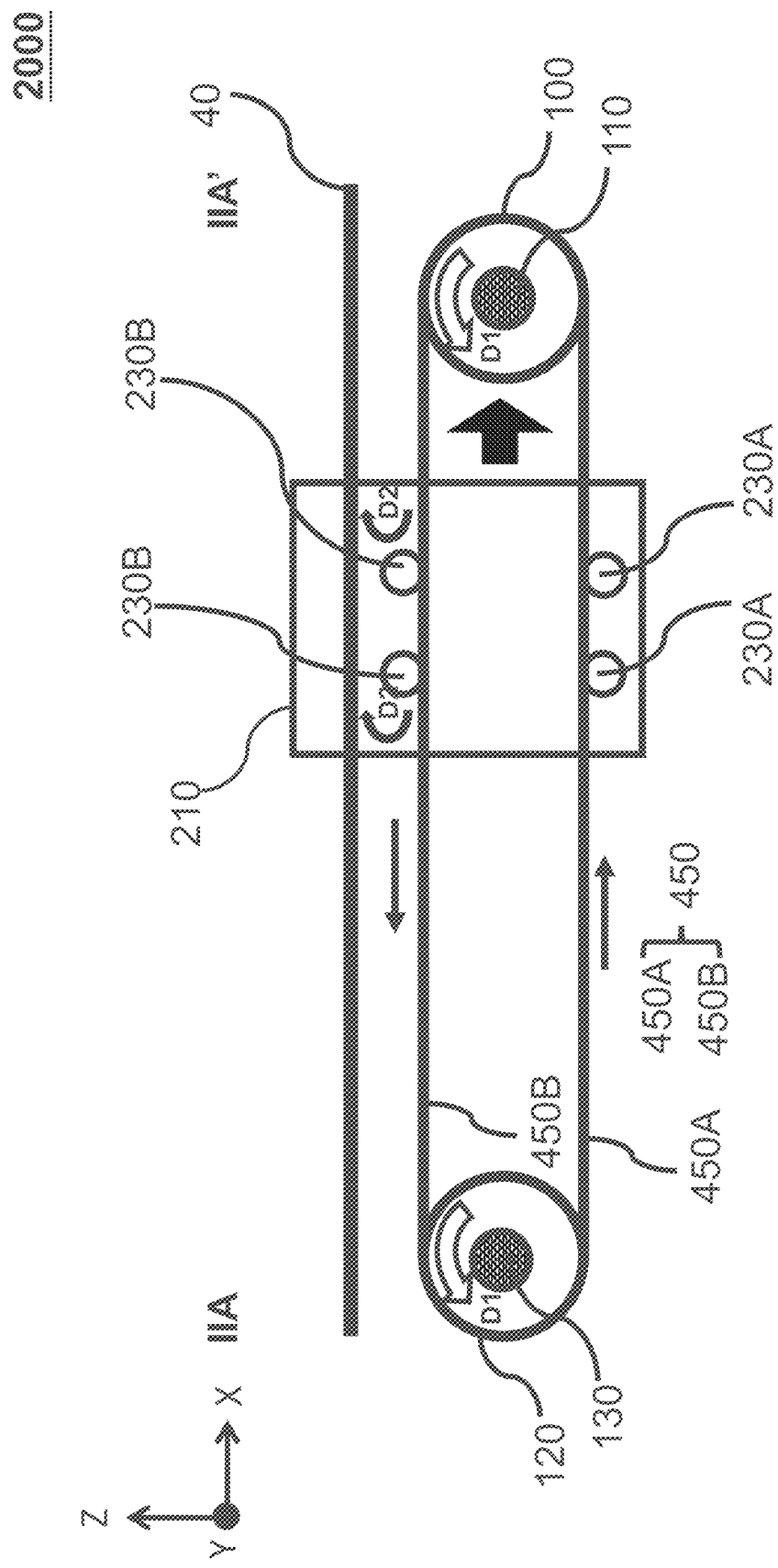
Figure 2D:
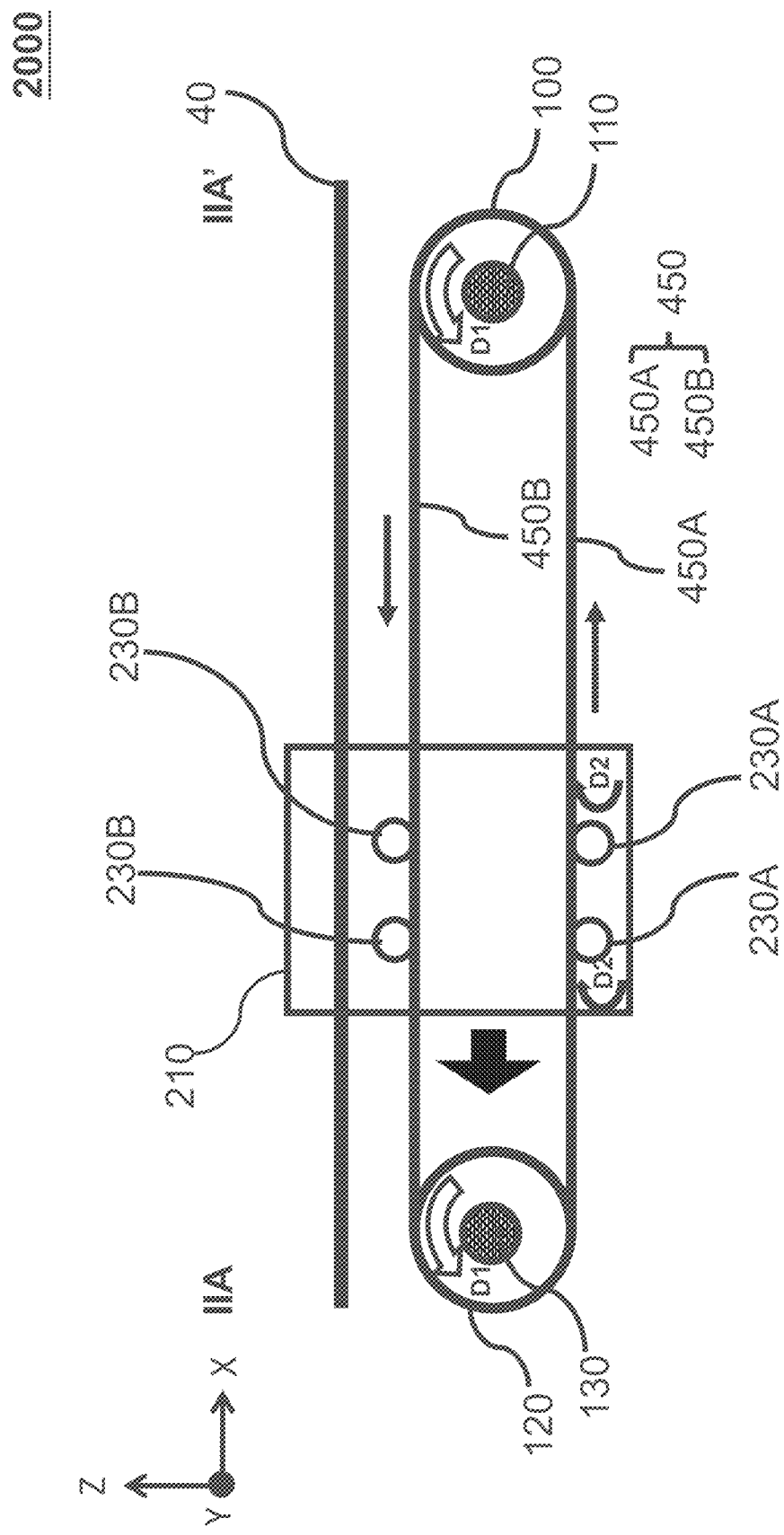

Please refer FIG. 2A and FIGS. 2B-2D. FIG. 2A is a top view illustrating the reciprocating linear prime mover 2000 according to Embodiment 2 of this invention. FIGS. 2B-2D are cross-sectional views along with cross-sectional line IIA-IIA' of FIG. 2A.

As shown in FIGS. 2A and 2B, a reciprocating linear prime mover 2000 according to this present Embodiment 2 is disclosed, wherein the reciprocating linear prime mover 2000 comprises a first roller 1000 disposed on a first driving axis 110 along with a second axis; a second roller 120 disposed on a second driving axis 130 along with the second axis; a closed first linear driving element 450 winded on the first roller 100 and the second roller 120, wherein the closed first linear driving element 450 comprises a first linear part 450A and a second linear part 450B between the first roller 100 and the second roller 120, wherein the second linear part 450B is above the first linear part 450A along with a (+) third axis; a first part 210 disposed between the first roller 100 and the second roller 120, wherein the first part 210 is reciprocatingly moved along with the first axis, and the first part 210 comprises at least a first one-way clutch 230A nearby the outer side of the first linear part 450A and contacting therewith, and at least a second one-way clutch 230B nearby the outer side of the second linear part 450B and contacting therewith, and the first one-way clutch 230A and the second one-way clutch 230B rotate along with a same first rotation direction D1; and a first forcing apparatus 300 fasten on the first part 210; wherein, the first axis and the second axis are perpendicular to each other, and the first axis and the third axis are perpendicular to each other. According to this present Embodiment 1, the first axis is X-axis, the second axis is Y-axis, and the third axis is Z-axis.

As shown in FIG. 2C, when the first forcing apparatus 300 is moved to carry the first part 210 to move along with (+) first axis, the second one-way clutch 230B is slipped along with the second linear part 450B without any linkage, and the first one-way clutch 230A is backstoppedly engaged with the first linear part 450A to carry the first linear part 450A to move forward toward (+) first axis and drive the first roller 100, the first driving axis 110, the second roller 120 and the second driving axis 130 to rotate along with the same first rotation direction D1.

As shown in FIG. 2D, when the first forcing apparatus 300 is moved to carry the first part 210 to move along with (+)

first axis, the first one-way clutch 230A is slipped along with the first linear part 450A without any linkage, and the second one-way clutch 230B is backstoppedly engaged with the second linear part 450B to carry the second linear part 450B to move forward toward (−) first axis and drive the first roller 100, the first driving axis 110, the second roller 120 and the second driving axis 130 to rotate along with the same first rotation direction D1.

Furthermore, according to other embodiment of this invention, the reciprocating linear prime mover 2000 can optionally comprises a first guiding mechanism 40, for example but not limited to a guiding rail or a cable line, and the first part 210 can be guided by the first guiding mechanism 40 to reciprocatingly move along with the first axis.

Embodiment 3

Figure 3A:
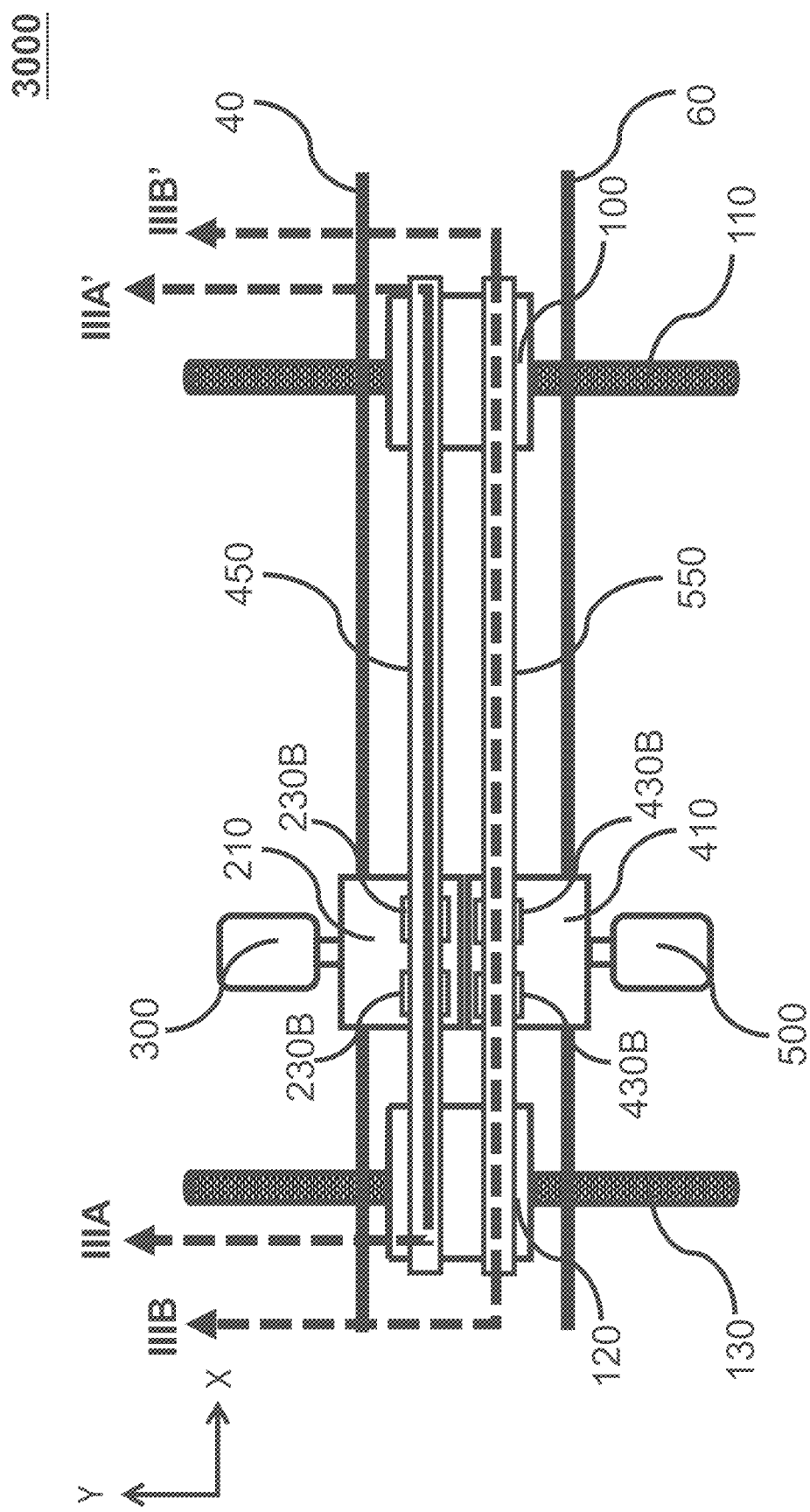
FIG. 3A is a top view illustrating the reciprocating linear prime mover 3000 according to Embodiment 3 of this invention.
Figure 3B:
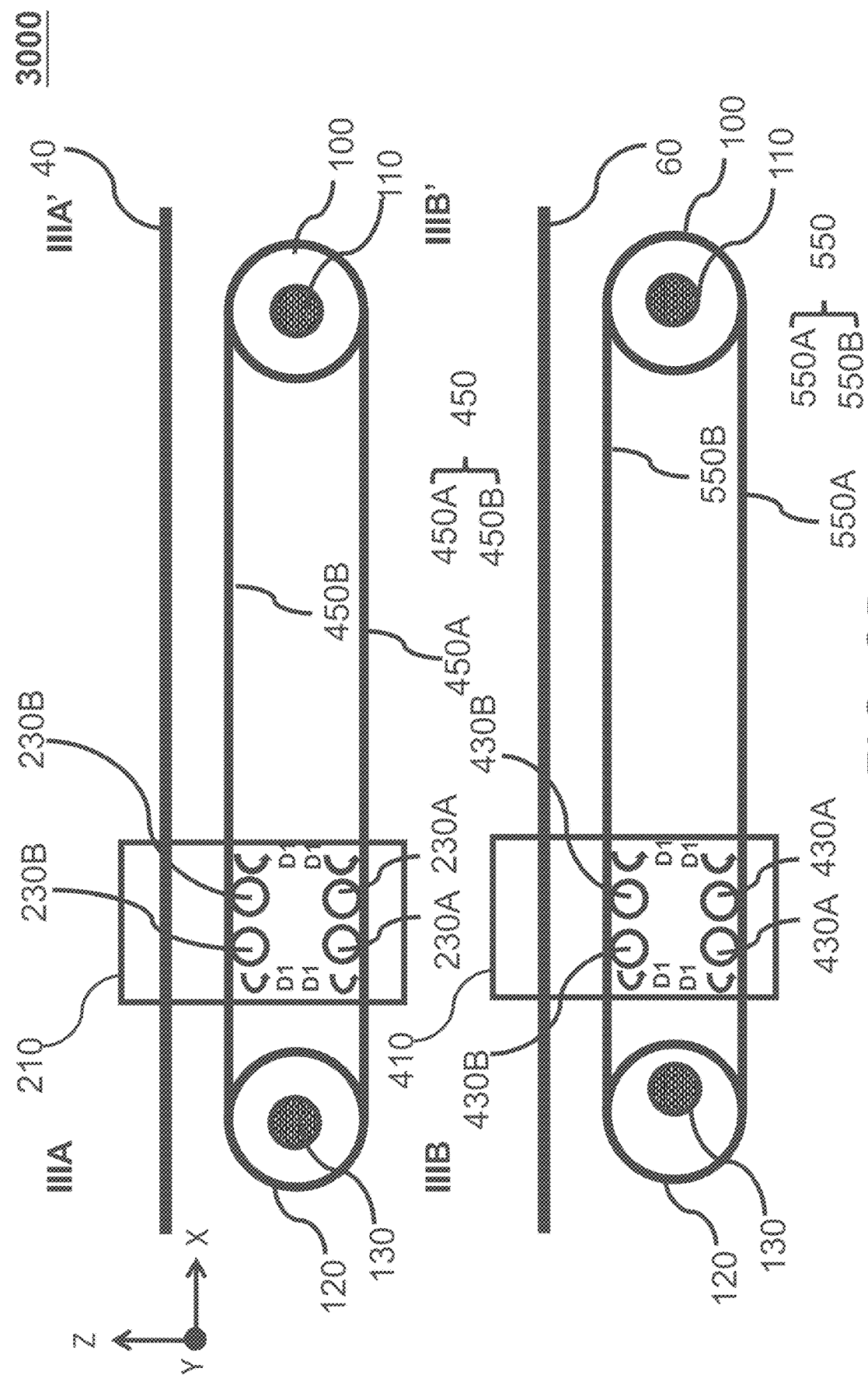
FIGS. 3B-3D are cross-sectional views along with cross-sectional lines and IIIB=IIIB' of FIG. 3A.
Figure 3C:
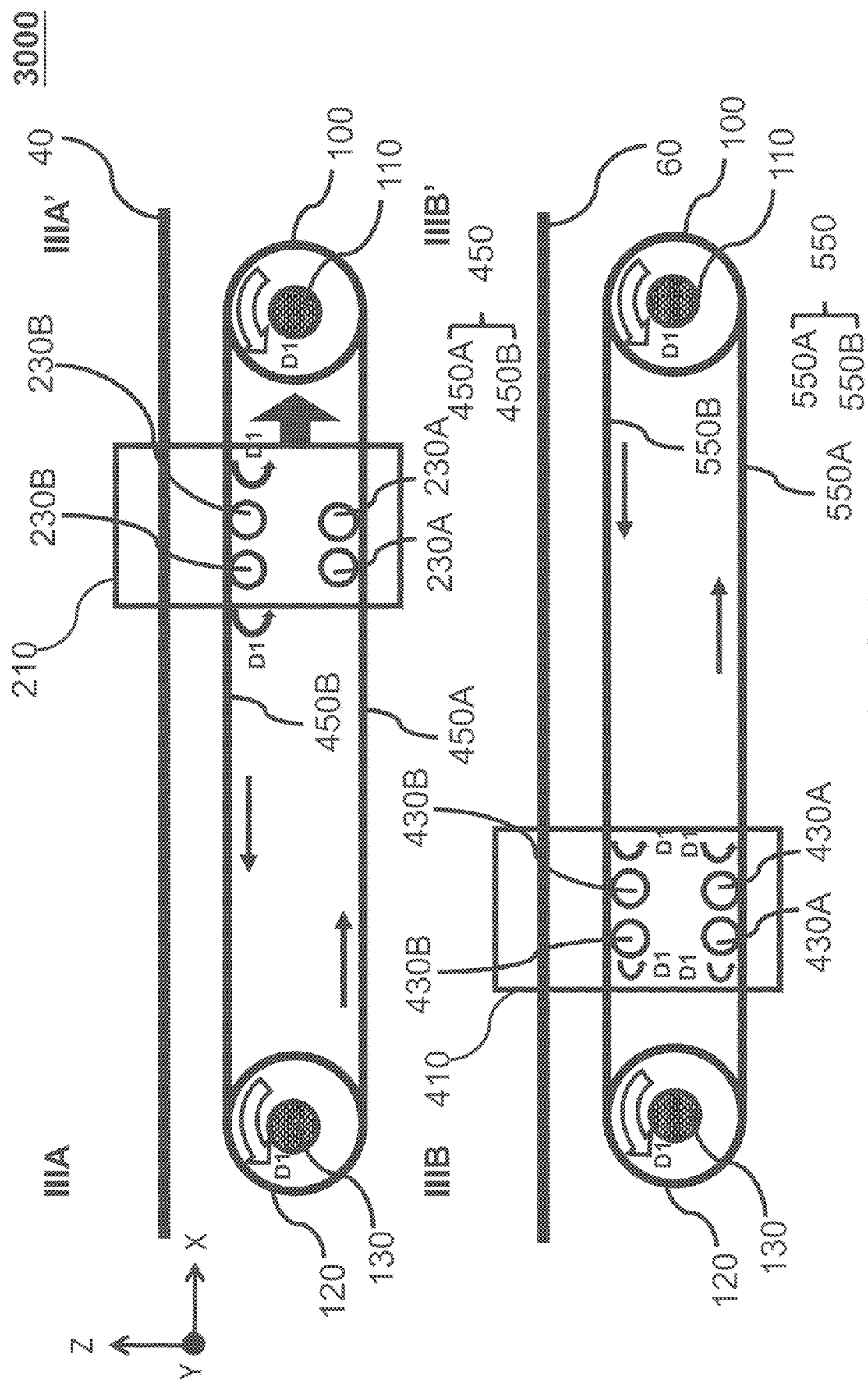
Figure 3D:
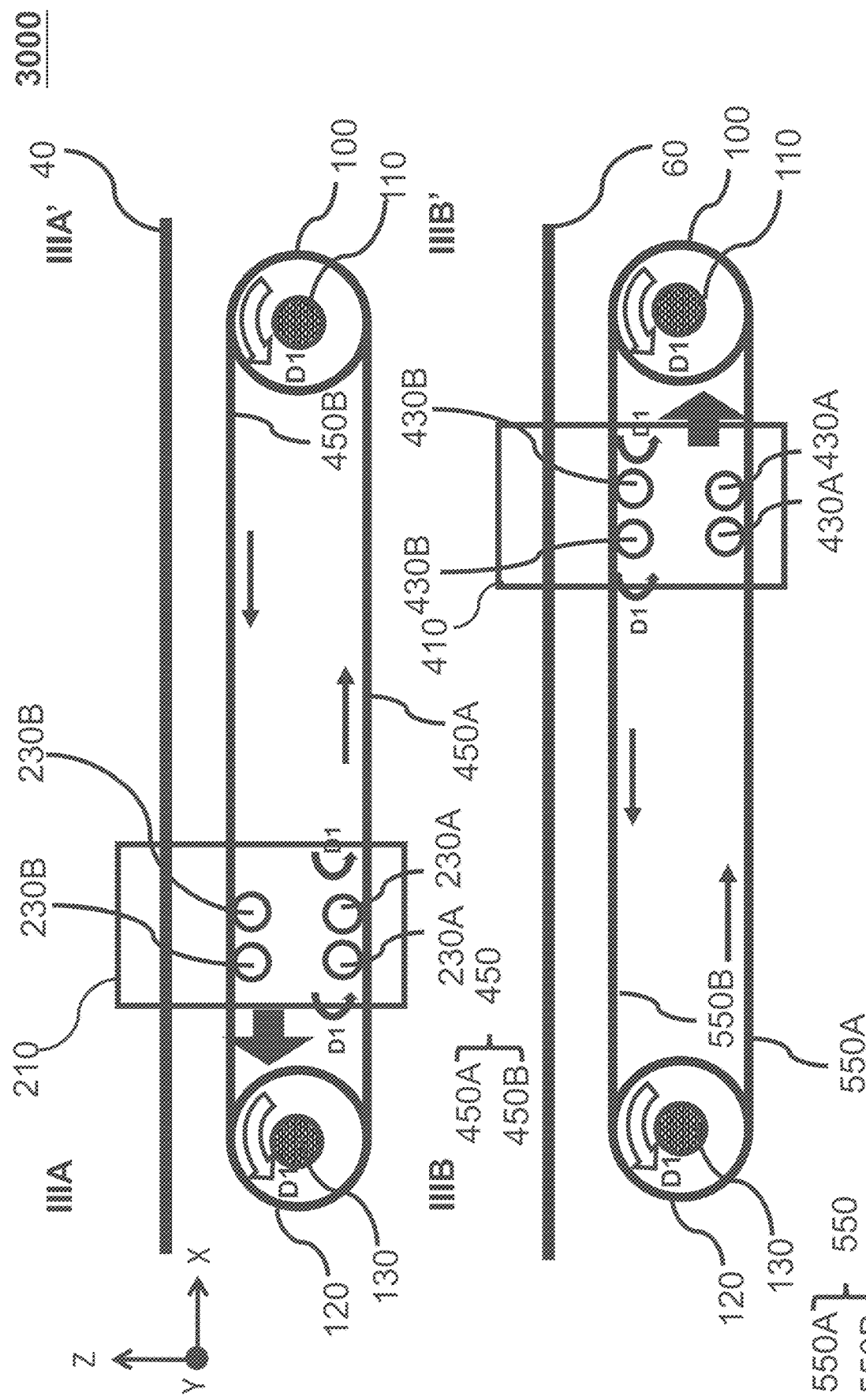

Please refer FIG. 3A and FIGS. 3B-3D. FIG. 3A is a top view illustrating the reciprocating linear prime mover 3000 according to Embodiment 3 of this invention. FIGS. 3B-3D are cross-sectional views along with cross-sectional lines IIIA-IIIA' and IIIB-IIIB' of FIG. 3A.

As shown in FIGS. 3A and 3B, a reciprocating linear prime mover 3000 according to this present Embodiment 3 is disclosed, and the reciprocating linear prime mover 3000 is similar to the reciprocating linear prime mover 1000, except the reciprocating linear prime mover 3000 further comprises a closed first linear driving element 550 winded on the first roller 100 and the second roller 120, and the closed first linear driving element 550 comprises a third linear part 550A and a fourth linear part 550B between the first roller 100 and the second roller 120, wherein the fourth linear part 550B is above the third linear part 550A along with a (+) third axis, and the first linear part 450A is adjacent to the third linear part 550A, and the second linear part 450B is adjacent to the fourth linear part 550B; a second part 410 disposed between the first roller 100 and the second roller 120, wherein the second part 410 is reciprocatingly moved along with the first axis, and the second part 410 comprises at least a third one-way clutch 430A nearby the inner side of the third linear part 550A and contacting therewith, and at least a fourth one-way clutch 430B nearby the inner side of the fourth linear part 550B and contacting therewith, and the third one-way clutch 430A and the fourth one-way clutch 430B rotate along with the same first rotation direction D1 as the first one-way clutch 230A and the second one-way clutch 230B; and a second forcing apparatus 500 fasten on the second part 410; wherein, the first axis and the second axis are perpendicular to each other, and the first axis and the third axis are perpendicular to each other. According to this present Embodiment 3, the first axis is X-axis, the second axis is Y-axis, and the third axis is Z-axis.

As shown in FIG. 3C, when the first forcing apparatus 300 is moved to carry the first part 210 to move along with (+) first axis, the second one-way clutch 230B is slipped along with the second linear part 450B without any linkage, and the first one-way clutch 230A is backstoppedly engaged with the first linear part 450A to carry the first linear part 450A to move forward toward (+) first axis and drive the first roller 100, the first driving axis 110, the second roller 120 and the second driving axis 130 to rotate along with the same first rotation direction D1.

As shown in FIG. 3D, when the first forcing apparatus 300 is moved to carry the first part 210 to move along with (−) first axis, the first one-way clutch 230A is slipped along with the first linear part 450A without any linkage, and the second one-way clutch 230B is backstoppedly engaged with the second linear part 450B to carry the second linear part 450B to move forward toward (+) first axis and drive the first roller 100, the first driving axis 110, the second roller 120 and the second driving axis 130 to rotate along with the same first rotation direction D1. When the second forcing apparatus 500 is moved to carry the second part 410 to move along with (+) first axis, the fourth one-way clutch 430B is slipped along with the fourth linear part 550B without any linkage, and the third one-way clutch 430A is backstoppedly engaged with the third linear part 550A to carry the third linear part 550A to move forward toward (+) first axis and drive the first roller 100, the first driving axis 110, the second roller 120 and the second driving axis 130 to rotate along with the same first rotation direction D1. Similarly, when the second forcing apparatus 500 is moved to carry the second part 410 to move along with (−) first axis, the third one-way clutch 430A is slipped along with the third linear part 550A without any linkage, and the fourth one-way clutch 430B is backstoppedly engaged with the fourth linear part 550B to carry the fourth linear part 550B to move forward toward (−) first axis and drive the first roller 100, the first driving axis 110, the second roller 120 and the second driving axis 130 to rotate along with the same first rotation direction D1.

The first closed driving element 450 and the second closed driving element 550 of the reciprocating linear prime mover 3000 can optionally be integrated as a whole, and the first linear part 450A and the third linear part 550A are integrated as a whole, and the second linear part 450B and the fourth linear part 550B are integrated as a whole.

Furthermore, according to other embodiment of this invention, the reciprocating linear prime mover 3000 can optionally comprises a first guiding mechanism 40 and a second guiding mechanism 60, for example but not limited to guiding rails or cable lines, and the first part 210 and the second part 410 can respectively be guided by the first guiding mechanism 40 and the second guiding mechanism 60 to reciprocatingly move along with the first axis.

Embodiment 4

Figure 4A:
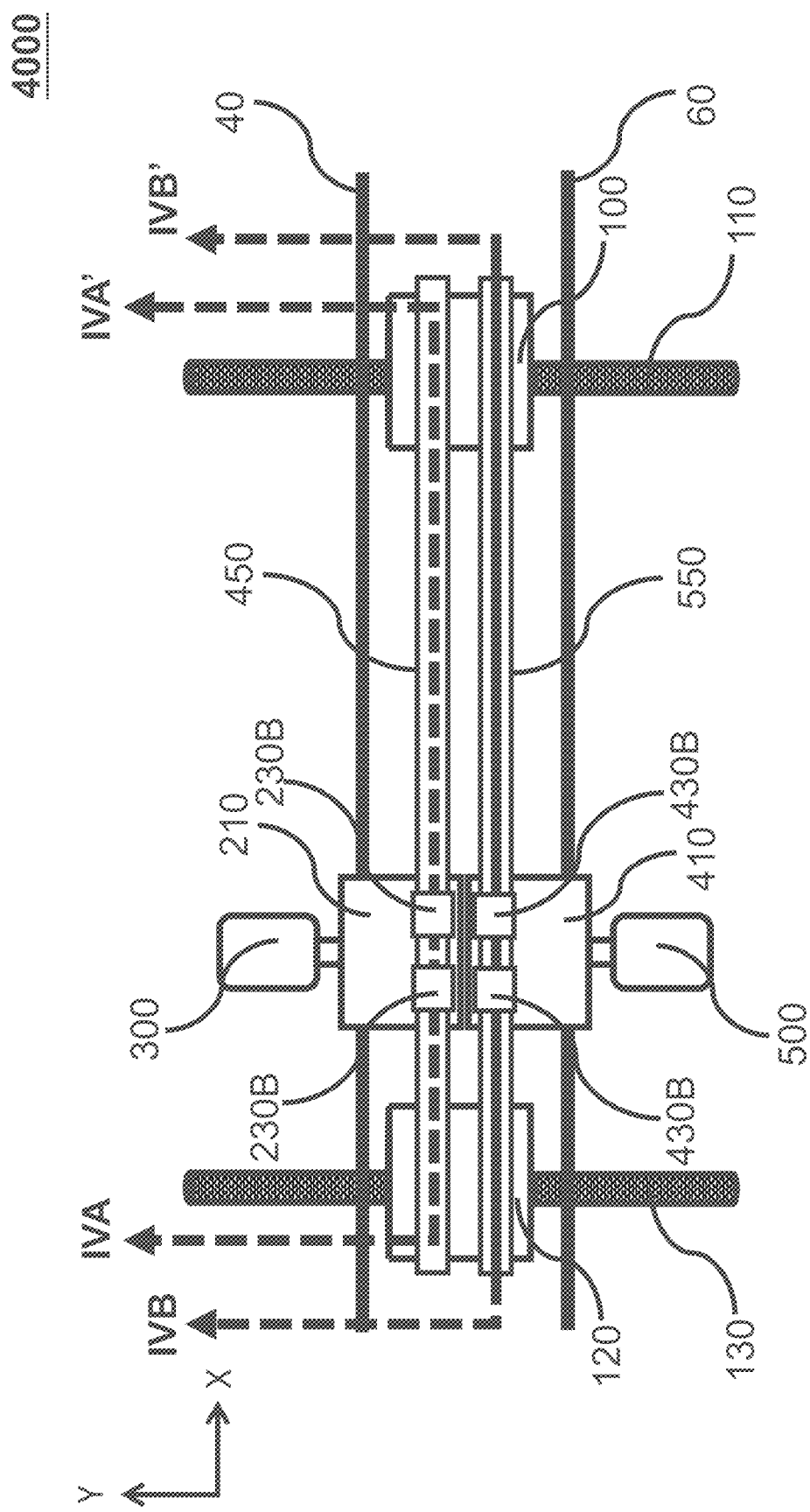
FIG. 4A is a top view illustrating the reciprocating linear prime mover 4000 according to Embodiment 4 of this invention.
Figure 4B:
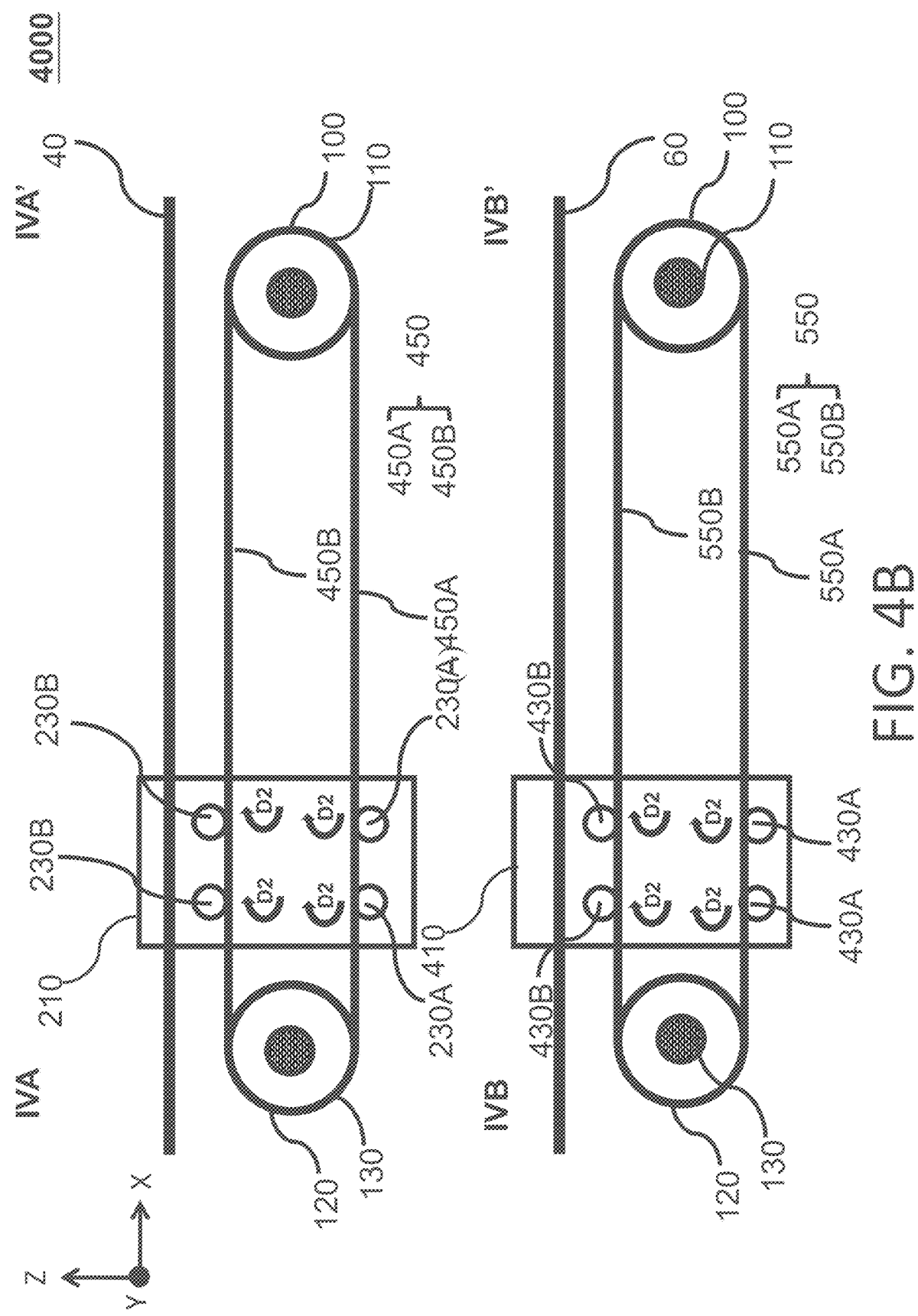
FIGS. 4B-4D are cross-sectional views along with cross-sectional lines IVA-IVA' and IVB-IVB' of FIG. 4A.
Figure 4C:
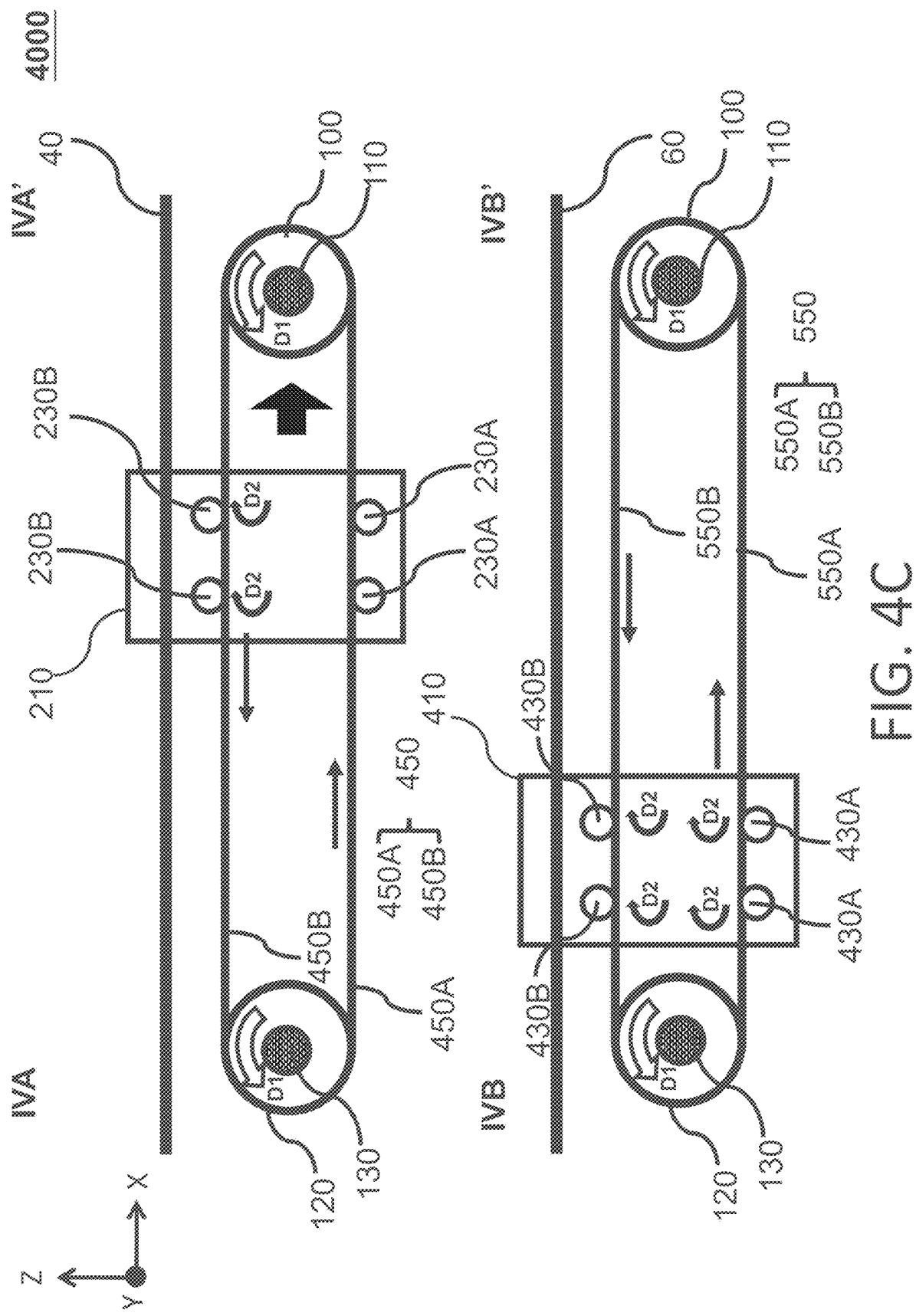
Figure 4D:
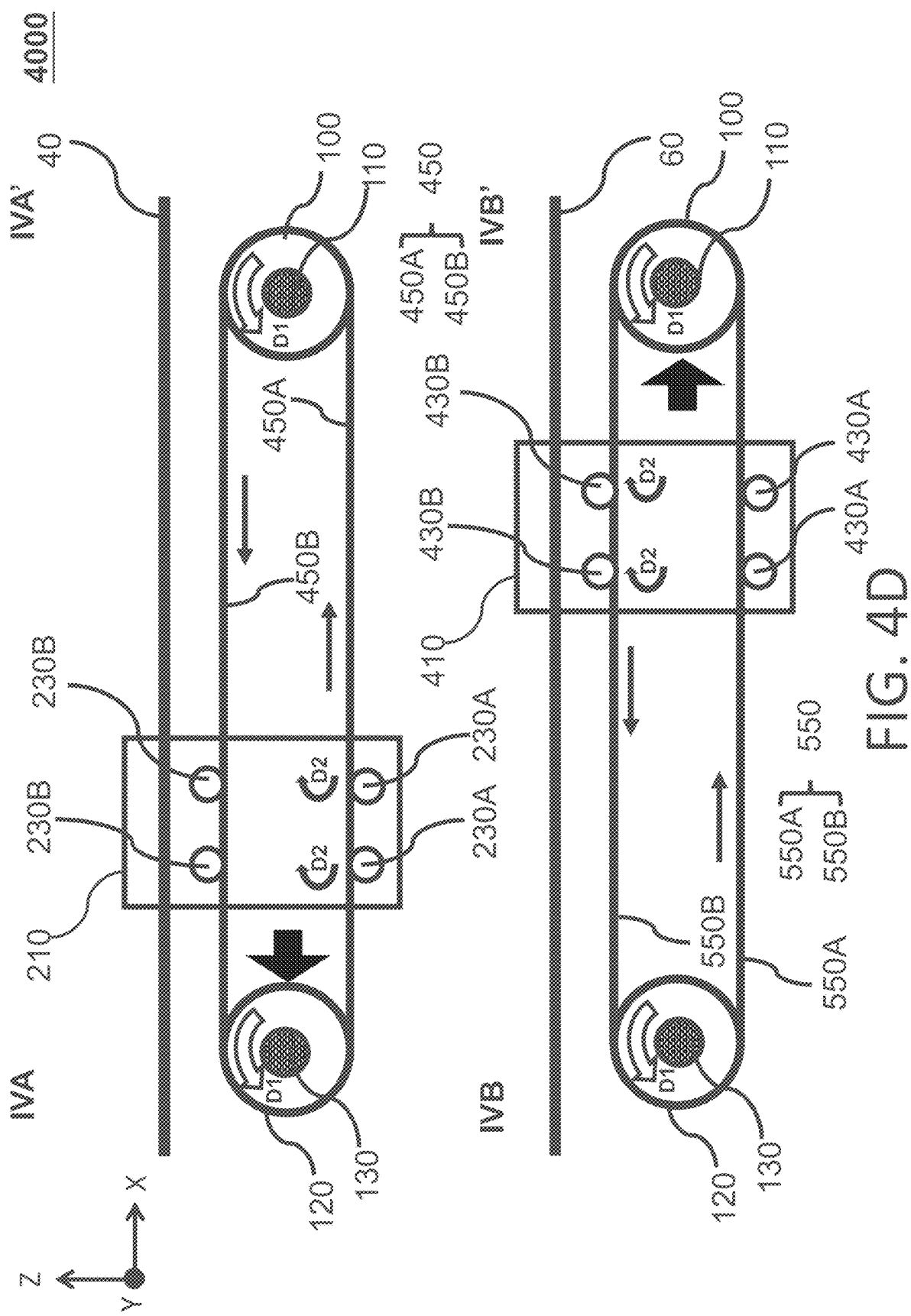

Please refer FIG. 4A and FIGS. 4B-4D. FIG. 4A is a top view illustrating the reciprocating linear prime mover 4000 according to Embodiment 4 of this invention. FIGS. 4B-4D are cross-sectional views along with cross-sectional lines IVA-IVA' and IVB-IVB' of FIG. 4A.

As shown in FIGS. 4A and 4B, a reciprocating linear prime mover 4000 according to this present Embodiment 4 is disclosed, and the reciprocating linear prime mover 4000 is similar to the reciprocating linear prime mover 2000, except the reciprocating linear prime mover 4000 further comprises a closed first linear driving element 550 winded on the first roller 100 and the second roller 120, and the closed first linear driving element 550 comprises a third linear part 550A and a fourth linear part 550B between the first roller 100 and the second roller 120, wherein the fourth linear part 550B is above the third linear part 550A along with a (+) third axis, and the first linear part 450A is adjacent to the third linear part 550A, and the second linear part 450B is adjacent to the fourth linear part 550B; a second part 410 disposed between the first roller 100 and the second roller 120, wherein the second part 410 is reciprocatingly moved along with the first axis, and the second part 410 comprises at least a third one-way clutch 430A nearby the outer side of the third linear part 550A and contacting therewith, and at least a fourth one-way clutch 430B nearby the outer side of the fourth linear part 550B and contacting therewith, and the third one-way clutch 430A and the fourth one-way clutch 430B rotate along with the same first rotation direction D1 as the first one-way clutch 230A and the second one-way clutch 230B; and a second forcing apparatus 500 fasten on the second part 410; wherein, the first axis and the second axis are perpendicular to each other, and the first axis and the third axis are perpendicular to each other. According to this present Embodiment 3, the first axis is X-axis, the second axis is Y-axis, and the third axis is Z-axis.

As shown in FIG. 4C, when the first forcing apparatus 400 is moved to carry the first part 210 to move along with (+) first axis, the second one-way clutch 230B is slipped along with the second linear part 450B without any linkage, and the first one-way clutch 230A is backstoppedly engaged with the first linear part 450A to carry the first linear part 450A to move forward toward (+) first axis and drive the first roller 100, the first driving axis 110, the second roller 120 and the second driving axis 130 to rotate along with the same first rotation direction D1.

As shown in FIG. 4D, when the first forcing apparatus 300 is moved to carry the first part 210 to move along with (−) first axis, the first one-way clutch 230A is slipped along with the first linear part 450A without any linkage, and the second one-way clutch 230B is backstoppedly engaged with the second linear part 450B to carry the second linear part 450B to move forward toward (+) first axis and drive the first roller 100, the first driving axis 110, the second roller 120 and the second driving axis 130 to rotate along with the same first rotation direction D1. When the second forcing apparatus 500 is moved to carry the second part 410 to move along with (+) first axis, the fourth one-way clutch 430B is slipped along with the fourth linear part 550B without any linkage, and the third one-way clutch 430A is backstoppedly engaged with the third linear part 550A to carry the third linear part 550A to move forward toward (+) first axis and drive the first roller 100, the first driving axis 110, the second roller 120 and the second driving axis 130 to rotate along with the same first rotation direction D1. Similarly, when the second forcing apparatus 500 is moved to carry the second part 410 to move along with (−) first axis, the third one-way clutch 430A is slipped along with the third linear part 550A without any linkage, and the fourth one-way clutch 430B is backstoppedly engaged with the fourth linear part 550B to carry the fourth linear part 550B to move forward toward (−) first axis and drive the first roller 100, the first driving axis 110, the second roller 120 and the second driving axis 130 to rotate along with the same first rotation direction D1.

The first closed driving element 450 and the second closed driving element 550 of the reciprocating linear prime mover 4000 can optionally be integrated as a whole, and the first linear part 450A and the third linear part 550A are integrated as a whole, and the second linear part 450B and the fourth linear part 550B are integrated as a whole.

Furthermore, according to other embodiment of this invention, the reciprocating linear prime mover 4000 can optionally comprises a first guiding mechanism 40 and a second guiding mechanism 60, for example but not limited to guiding rails or cable lines, and the first part 210 and the second part 410 can respectively be guided by the first guiding mechanism 40 and the second guiding mechanism 60 to reciprocatingly move along with the first axis.

Embodiment 5

Figure 5A:
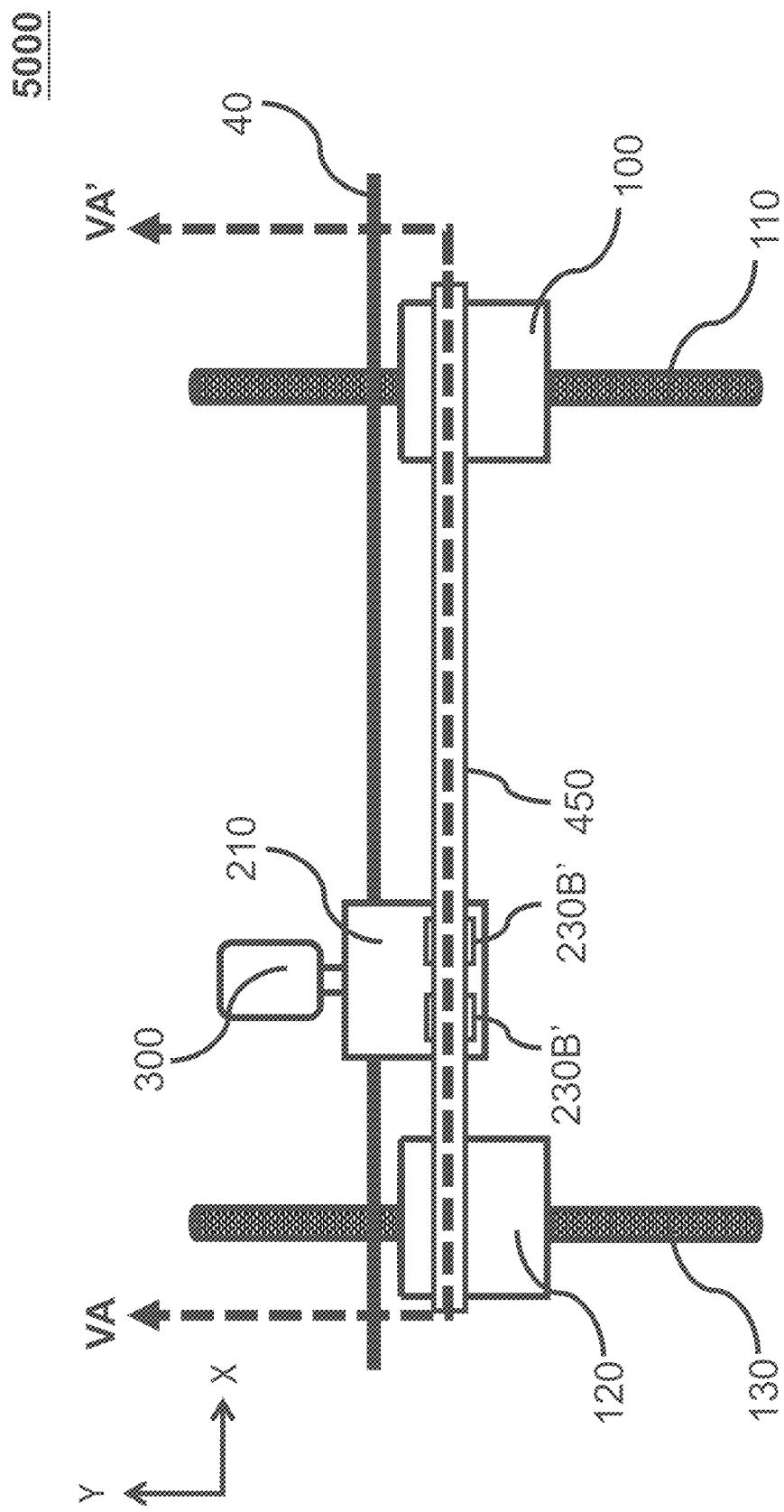
FIG. 5A is a top view illustrating the reciprocating linear prime mover 5000 according to Embodiment 5 of this invention.

Please refer FIG. 5A and FIGS. 5B-5H. FIG. 5A is a top view illustrating the reciprocating linear prime mover 5000 according to Embodiment 5 of this invention. FIGS. 5B-5H are cross-sectional views along with cross-sectional line VA-VA' of FIG. 5A.

Figure 5B:
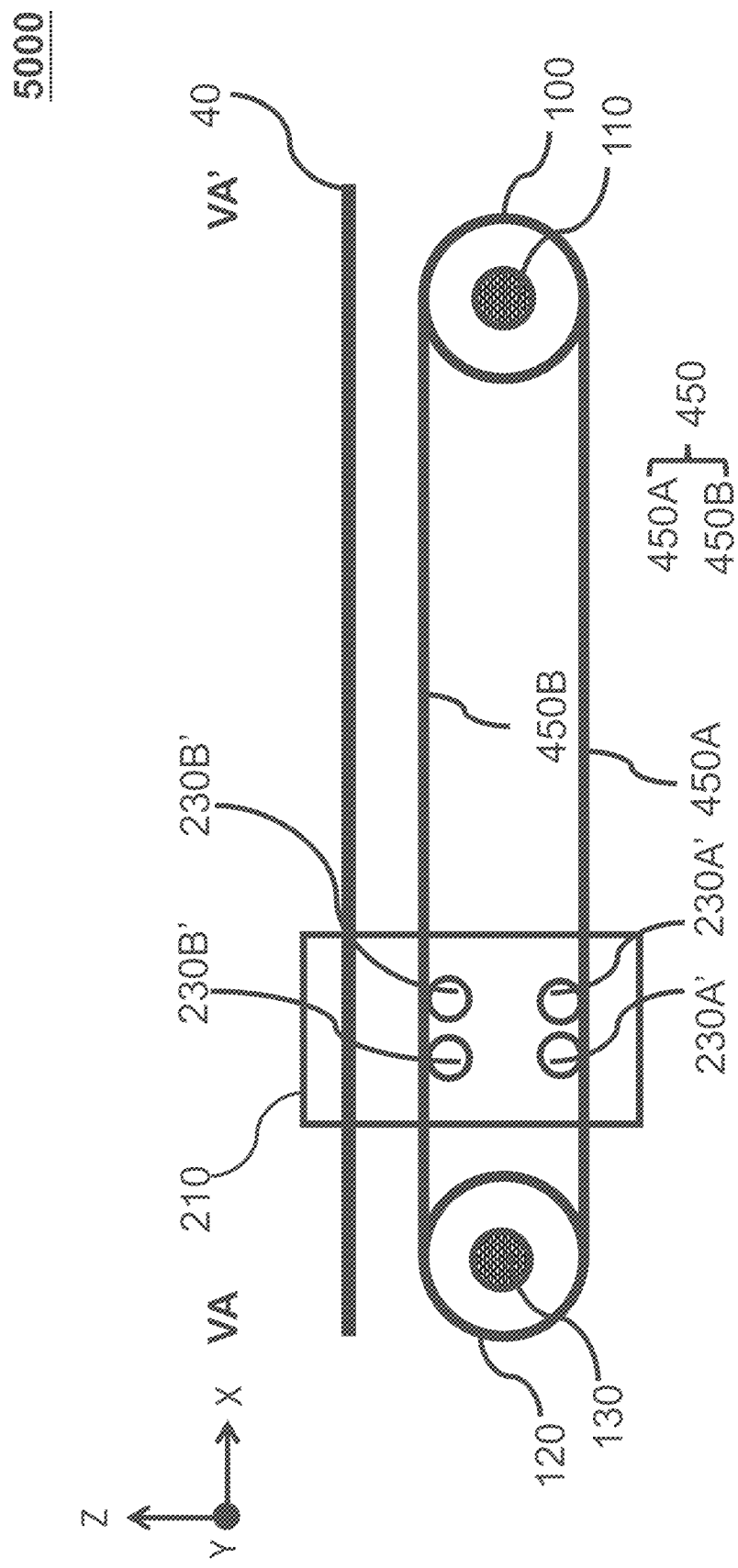
FIGS. 5B-5D are cross-sectional views along with cross-sectional line VA-VA' of FIG. 5A.

As shown in FIGS. 5A and 5B, a reciprocating linear prime mover 5000 according to this present Embodiment 5 is disclosed, wherein the reciprocating linear prime mover 5000 comprises a first roller 1000 disposed on a first driving axis 110 along with a second axis; a second roller 120 disposed on a second driving axis 130 along with the second axis; a closed first linear driving element 450 winded on the first roller 100 and the second roller 120, wherein the closed first linear driving element 450 comprises a first linear part 450A and a second linear part 450B between the first roller 100 and the second roller 120, wherein the second linear part 450B is above the first linear part 450A along with a (+) third axis; a first part 210 disposed between the first roller 100 and the second roller 120, wherein the first part 210 is reciprocatingly moved along with the first axis, and the first part 210 comprises at least a first two-ways clutch 230A' nearby the inner side of the first linear part 450A and contacting therewith, and at least a second two-ways clutch 230B' nearby the inner side of the second linear part 450B and contacting therewith, and the first two-ways clutch 230A' and the second two-ways clutch 230B' rotate along with a same first rotation direction D1 or a same second rotation direction D2; and a first forcing apparatus 300 fasten on the first part 210; wherein, the first axis and the second axis are perpendicular to each other, and the first axis and the third axis are perpendicular to each other. According to this present Embodiment 1, the first axis is X-axis, the second axis is Y-axis, and the third axis is Z-axis.

Figure 5C:
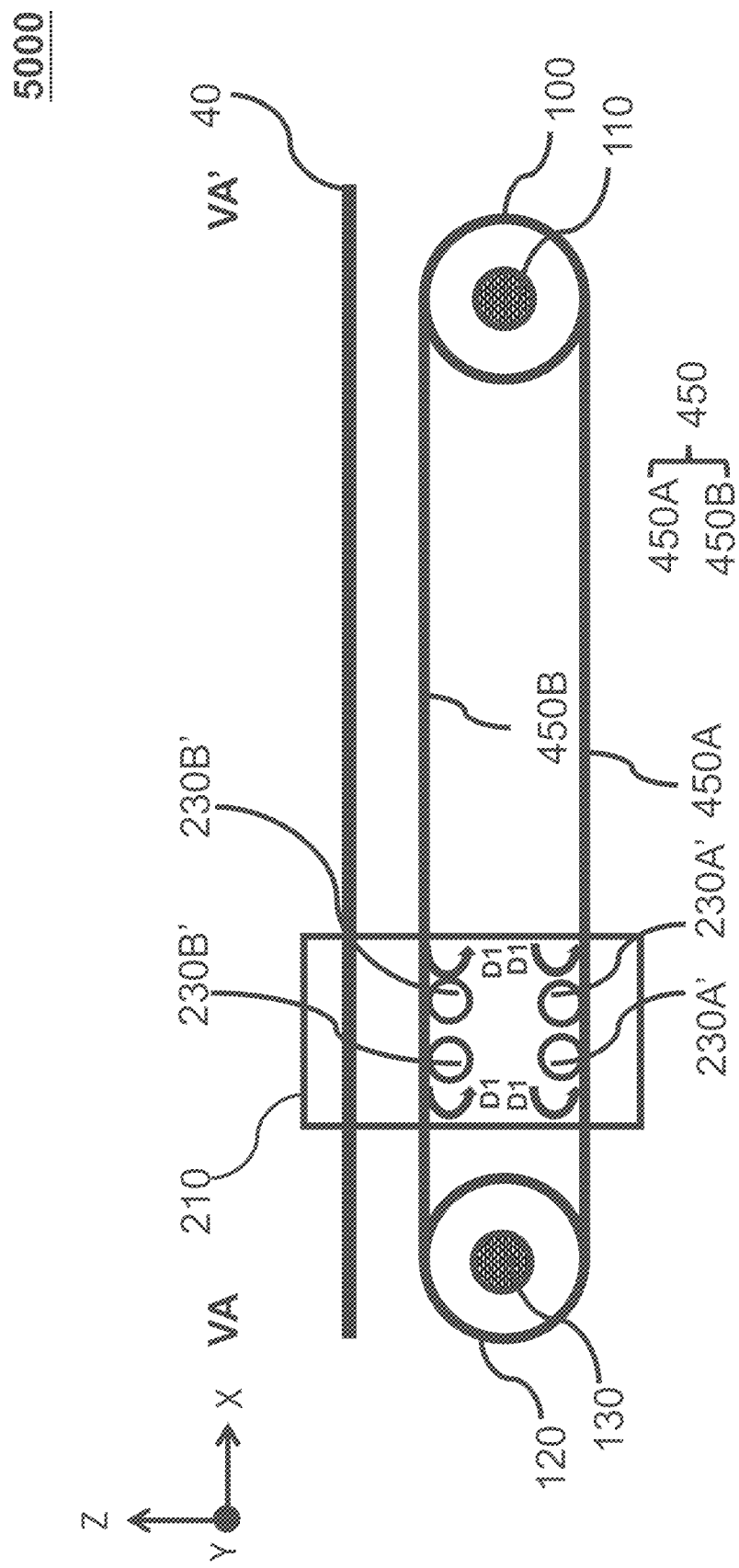
Figure 5D:
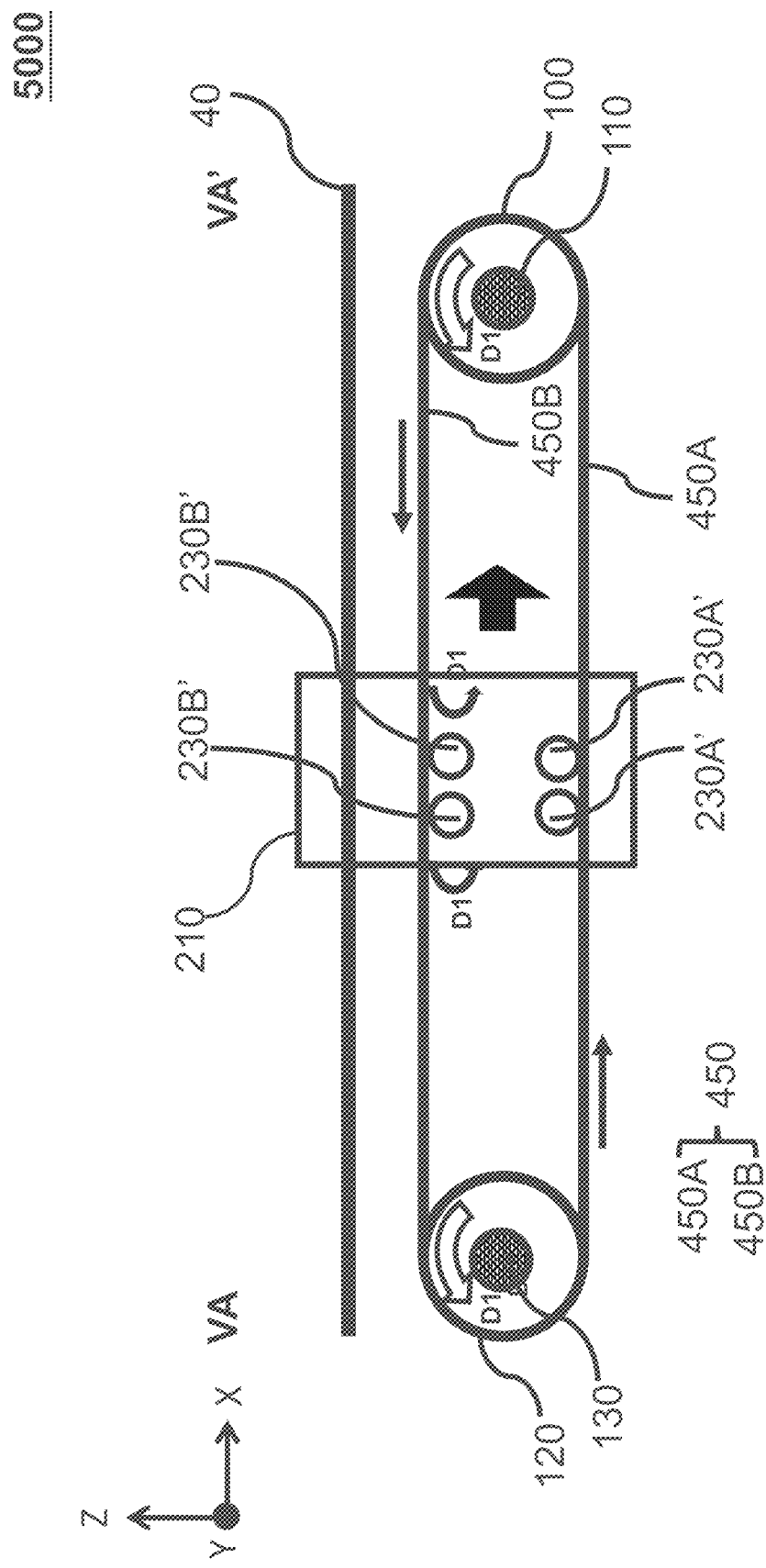
Figure 5E:
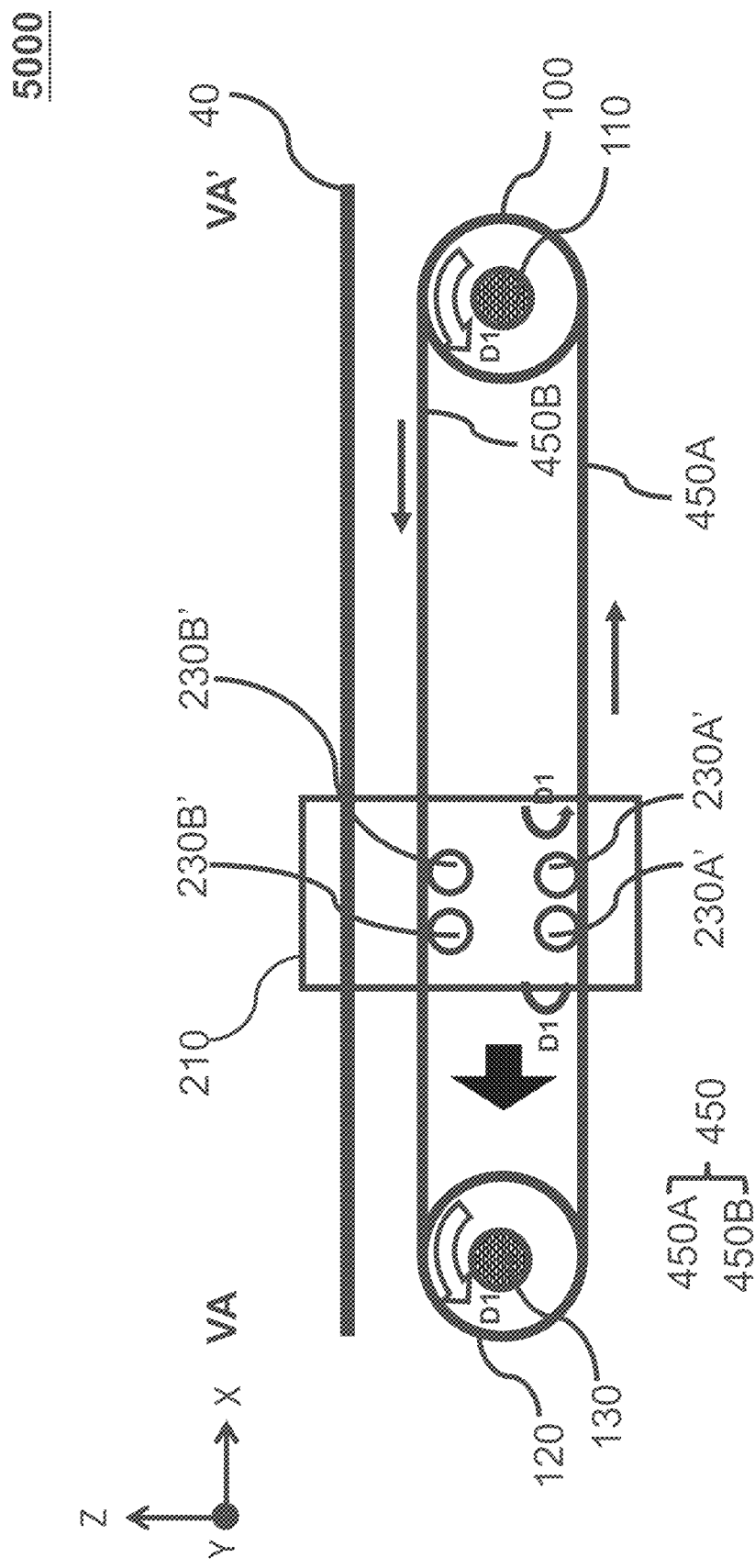

Next, please refer to FIGS. 5C-5E. When the first two-ways clutch 230A' and the second two-ways clutch 230B' are controlled to rotate along with same first rotation direction D1 as shown in FIG. 5C, and the first forcing apparatus 300 is moved to carry the first part 210 to move along with (+) first axis as shown in FIG. 5D, the second two-ways clutch 230B' is slipped along with the second linear part 450B without any linkage, and the first two-ways clutch 230A' is backstoppedly engaged with the first linear part 450A to carry the first linear part 450A to move forward toward (+) first axis and drive the first roller 100, the first driving axis 110, the second roller 120 and the second driving axis 130 to rotate along with the same first rotation direction D1. When the first two-ways clutch 230A' and the second two-ways clutch 230B' are controlled to rotate along with same first rotation direction D1 as shown in FIG. 5C, and the first forcing apparatus 300 is moved to carry the first part 210 to move along with (−) first axis as shown in FIG. 5E, the first two-ways clutch 230A' is slipped along with the first linear part 450A without any linkage, and the second two-ways clutch 230B' is backstoppedly engaged with the second linear part 450B to carry the second linear part 450B to move forward toward (+) first axis and drive the first roller 100, the first driving axis 110, the second roller 120 and the second driving axis 130 to rotate along with the same first rotation direction D1

Figure 5F:
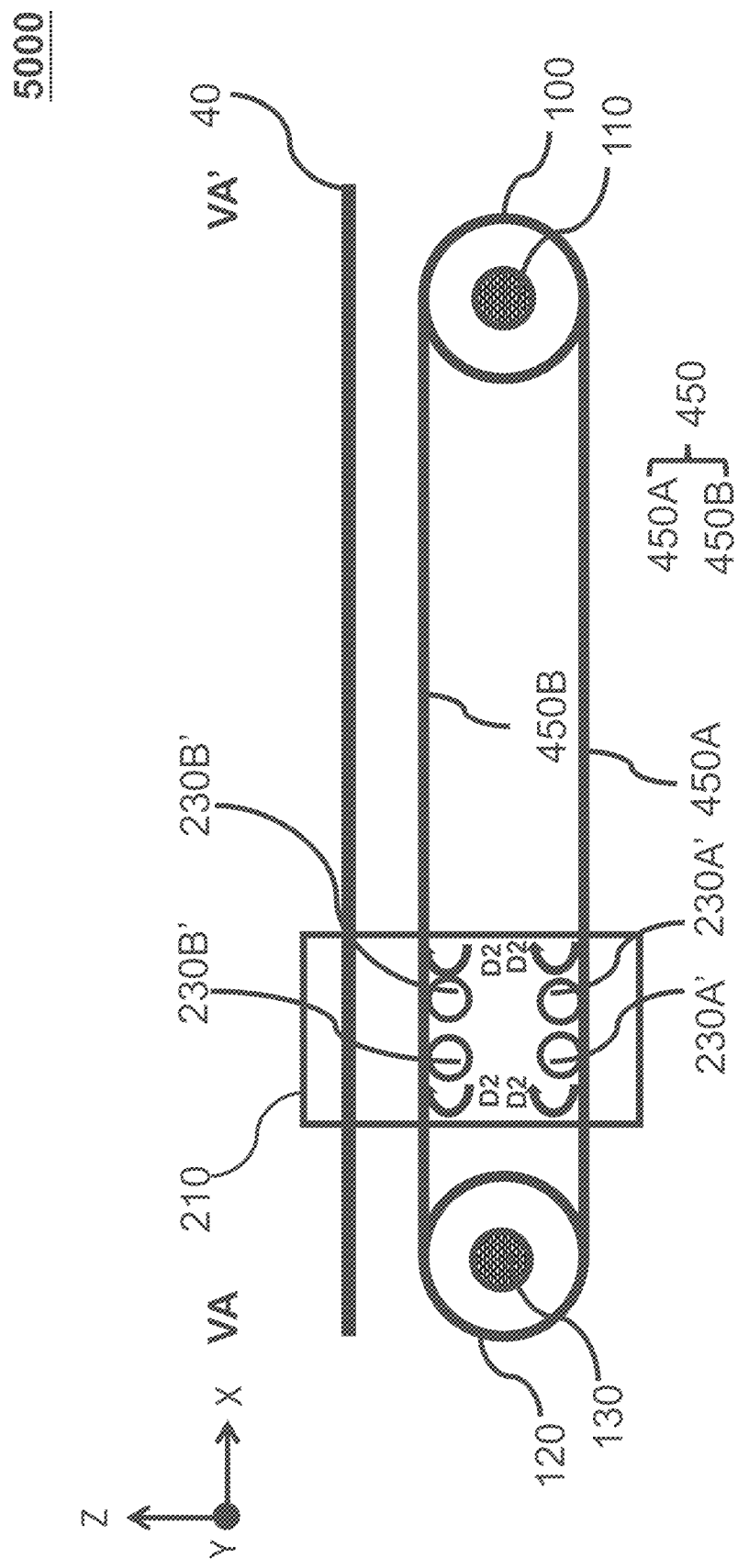
Figure 5G:
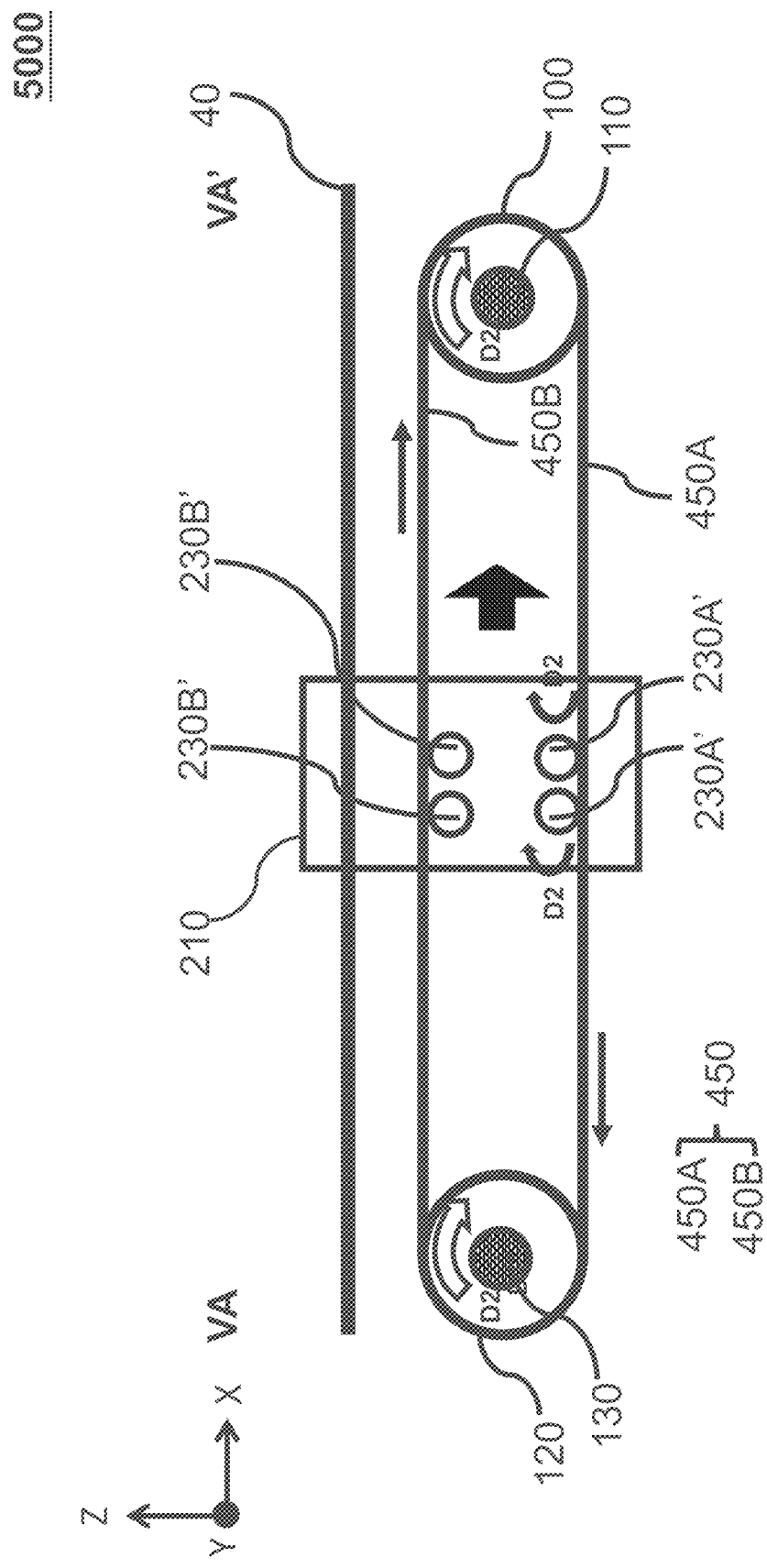
Figure 5H:
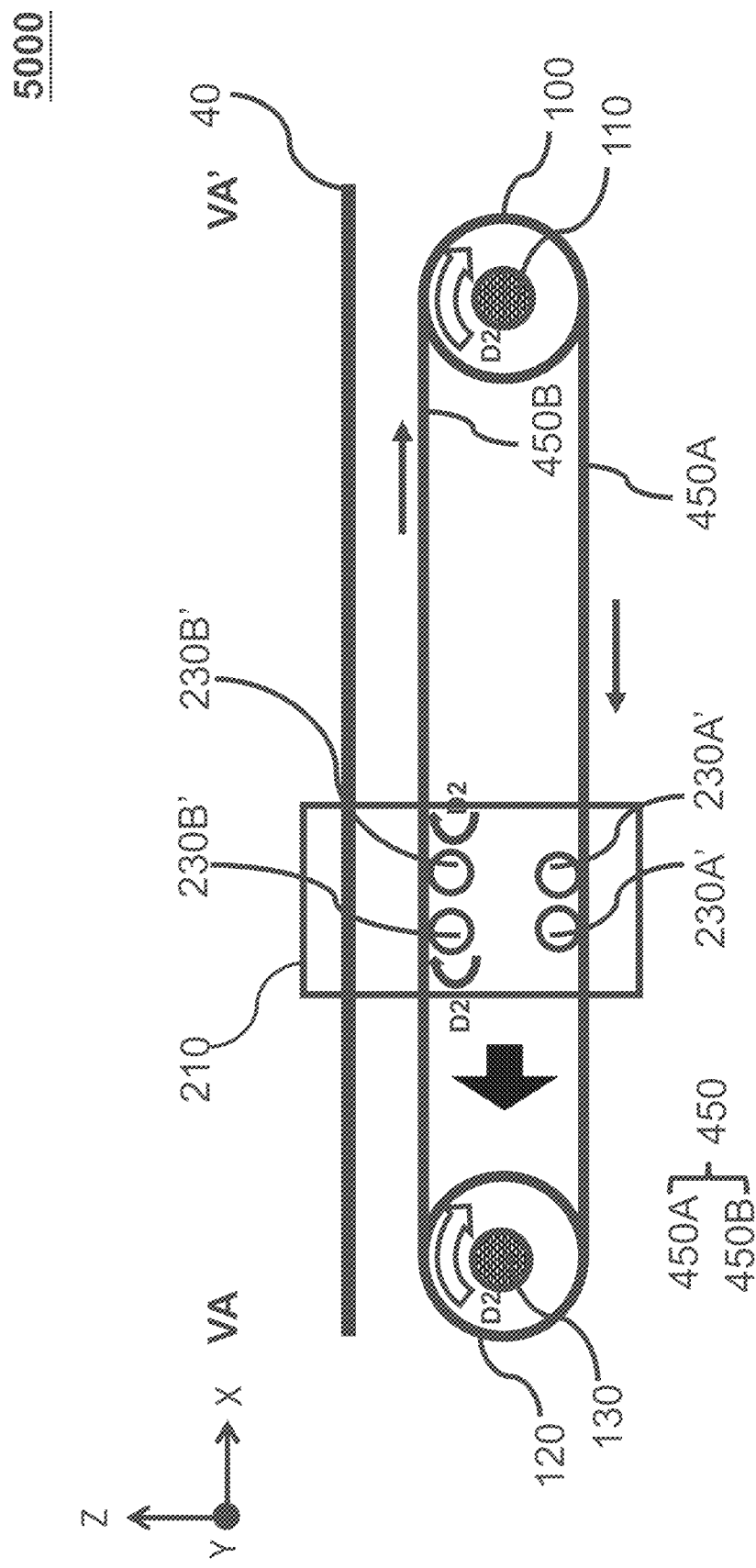

Next, please refer to FIGS. 5F-5H. When the first two-ways clutch 230A' and the second two-ways clutch 230B' are controlled to rotate along with same second rotation direction D2 as shown in FIG. 5F, and the first forcing apparatus 300 is moved to carry the first part 210 to move along with (+) first axis as shown in FIG. 5G, the first two-ways clutch 230A' is slipped along with the first linear part 450A without any linkage, and the second two-ways clutch 230B' is backstoppedly engaged with the second linear part 450B to carry the first linear part 450A to move forward toward (+) first axis and drive the first roller 100, the first driving axis 110, the second roller 120 and the second driving axis 130 to rotate along with the same second rotation direction D2. When the first two-ways clutch 230A' and the second two-ways clutch 230B' are controlled to rotate along with same second rotation direction D2 as shown in FIG. 5F, and the first forcing apparatus 300 is moved to carry the first part 210 to move along with (−) first axis as shown in FIG. 5H, the second two-ways clutch 230B' is slipped along with the second linear part 450B without any linkage, and the first two-ways clutch 230A' is backstoppedly engaged with the first linear part 450A to carry the first linear part 450A to move forward toward (+) first axis and drive the first roller 100, the first driving axis 110, the second roller 120 and the second driving axis 130 to rotate along with the same second rotation direction D2.

The rotation direction of the first roller 100 and the second roller 120 can be changed by controlling the first two-ways clutch 230A' and the second two-ways clutch 230B' to rotate along with the first rotation direction D1 or the second rotation direction D2.

Furthermore, according to other embodiment of this invention, the reciprocating linear prime mover 5000 can optionally comprises a guiding mechanism 40, for example but not limited to a guiding rail or a cable line, and the first part 210 can be guided by the guiding mechanism 40 to reciprocatingly move along with the first axis.

Embodiment 6

Figure 6A:
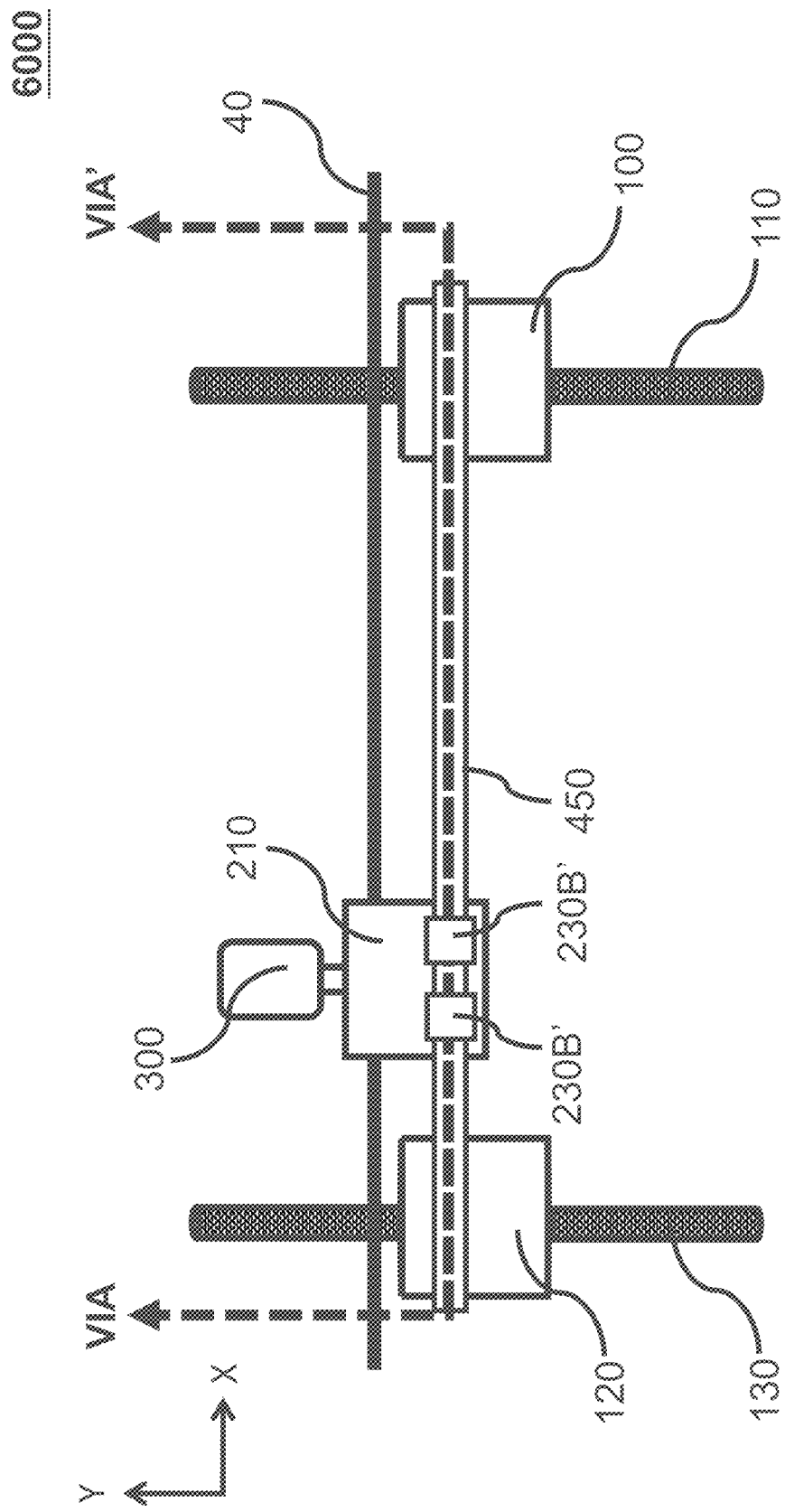
FIG. 6A is a top view illustrating the reciprocating linear prime mover 6000 according to Embodiment 6 of this invention.

Please refer FIG. 6A and FIGS. 6B-6H. FIG. 6A is a top view illustrating the reciprocating linear prime mover 6000 according to Embodiment 6 of this invention. FIGS. 6B-6H are cross-sectional views along with cross-sectional line VIA-VIA' of FIG. 6A.

Figure 6B:
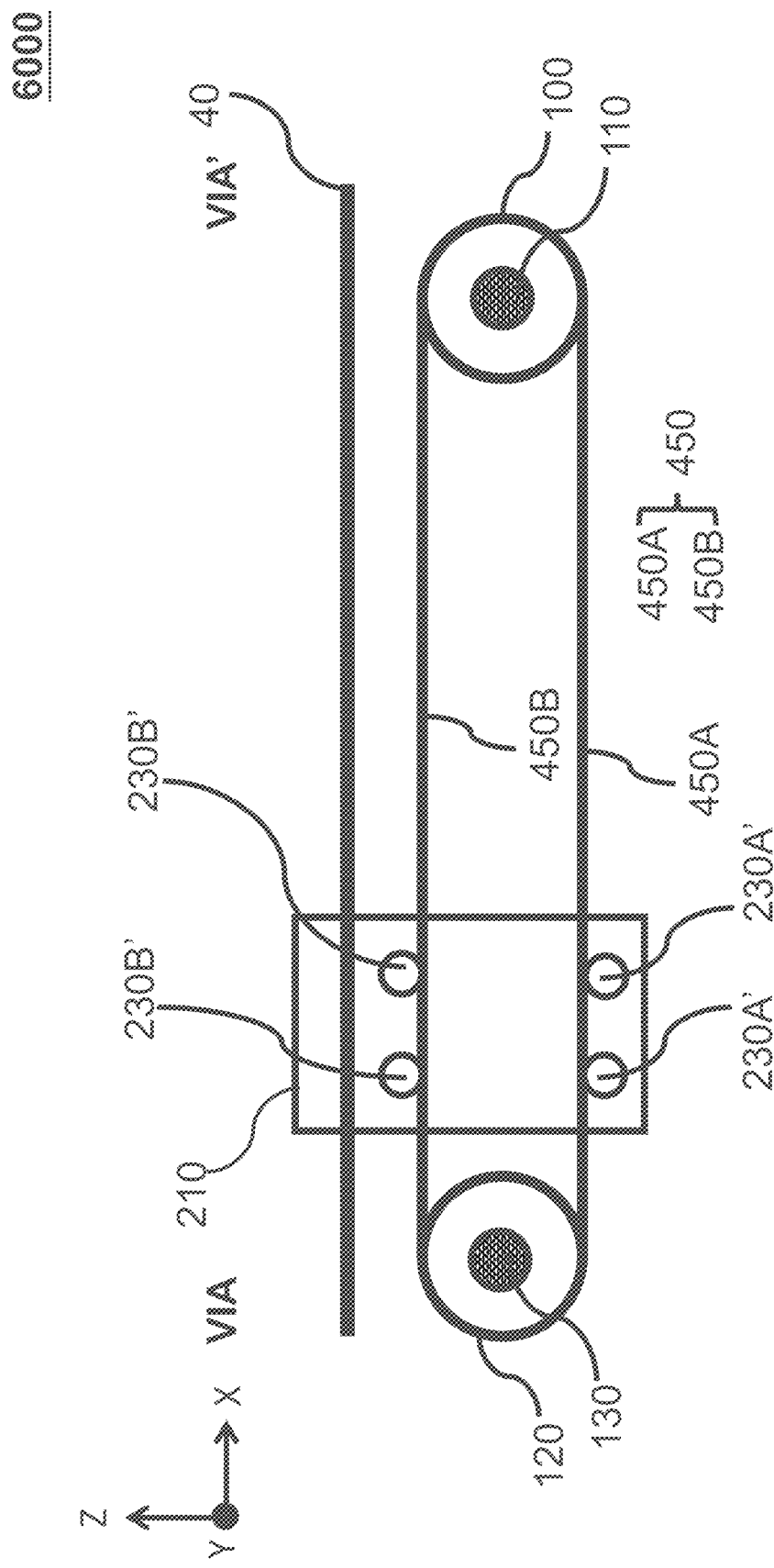
FIGS. 6B-6H are cross-sectional views along with cross-sectional line VIA-VIA' of FIG. 6A.

As shown in FIGS. 6A and 6B, a reciprocating linear prime mover 6000 according to this present Embodiment 6 is disclosed, wherein the reciprocating linear prime mover 6000 comprises a first roller 1000 disposed on a first driving axis 110 along with a second axis; a second roller 120 disposed on a second driving axis 130 along with the second axis; a closed first linear driving element 450 winded on the first roller 100 and the second roller 120, wherein the closed first linear driving element 450 comprises a first linear part 450A and a second linear part 450B between the first roller 100 and the second roller 120, wherein the second linear part 450B is above the first linear part 450A along with a (+) third axis; a first part 210 disposed between the first roller 100 and the second roller 120, wherein the first part 210 is reciprocatingly moved along with the first axis, and the first part 210 comprises at least a first two-ways clutch 230A' nearby the outer side of the first linear part 450A and contacting therewith, and at least a second two-ways clutch 230B' nearby the outer side of the second linear part 450B and contacting therewith, and the first two-ways clutch 230A' and the second two-ways clutch 230B' rotate along with a same first rotation direction D1 or a same second rotation direction D2; and a first forcing apparatus 300 fasten on the first part 210; wherein, the first axis and the second axis are perpendicular to each other, and the first axis and the third axis are perpendicular to each other. According to this present Embodiment 1, the first axis is X-axis, the second axis is Y-axis, and the third axis is Z-axis.

Figure 6C:
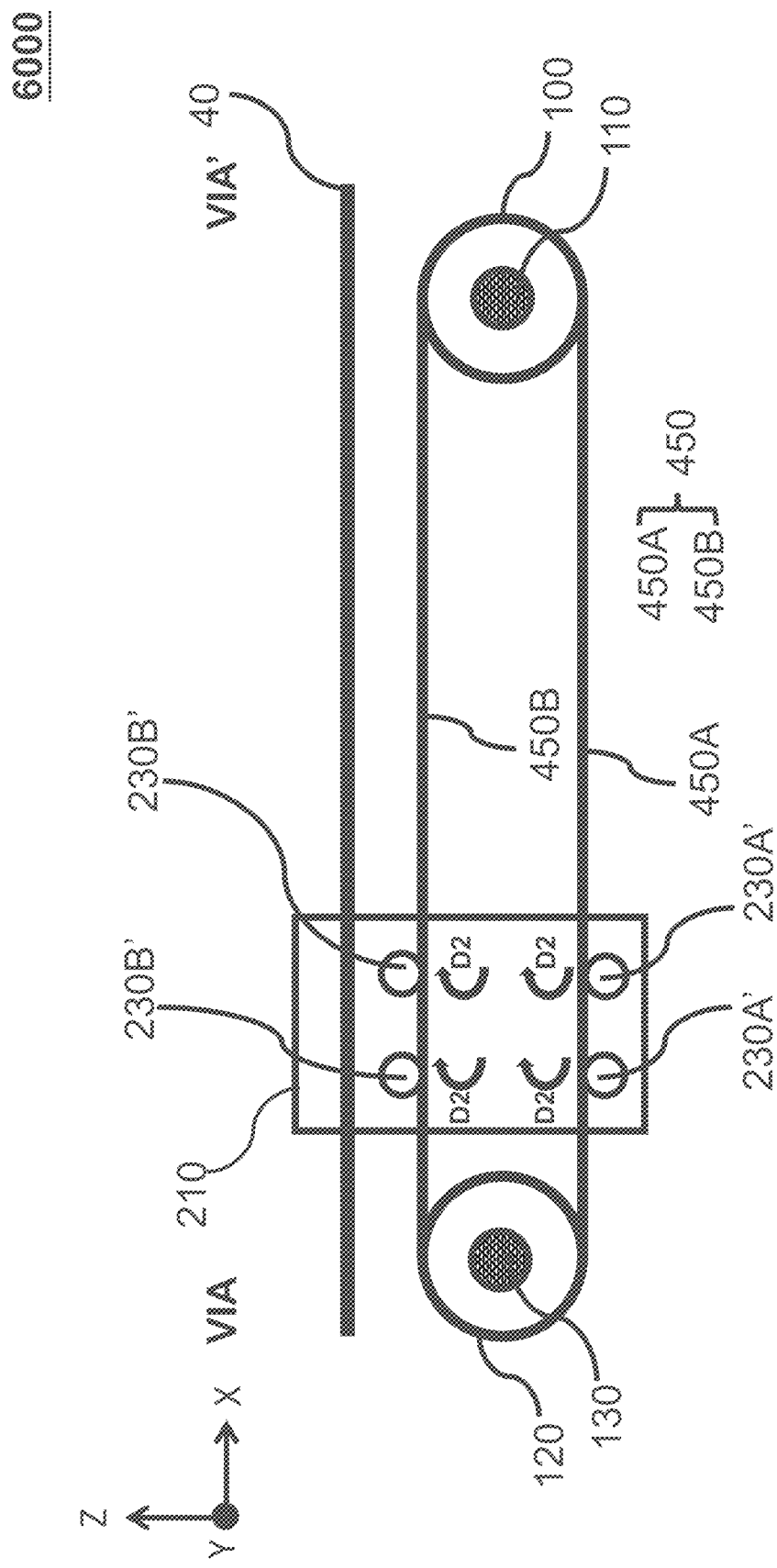
Figure 6D:
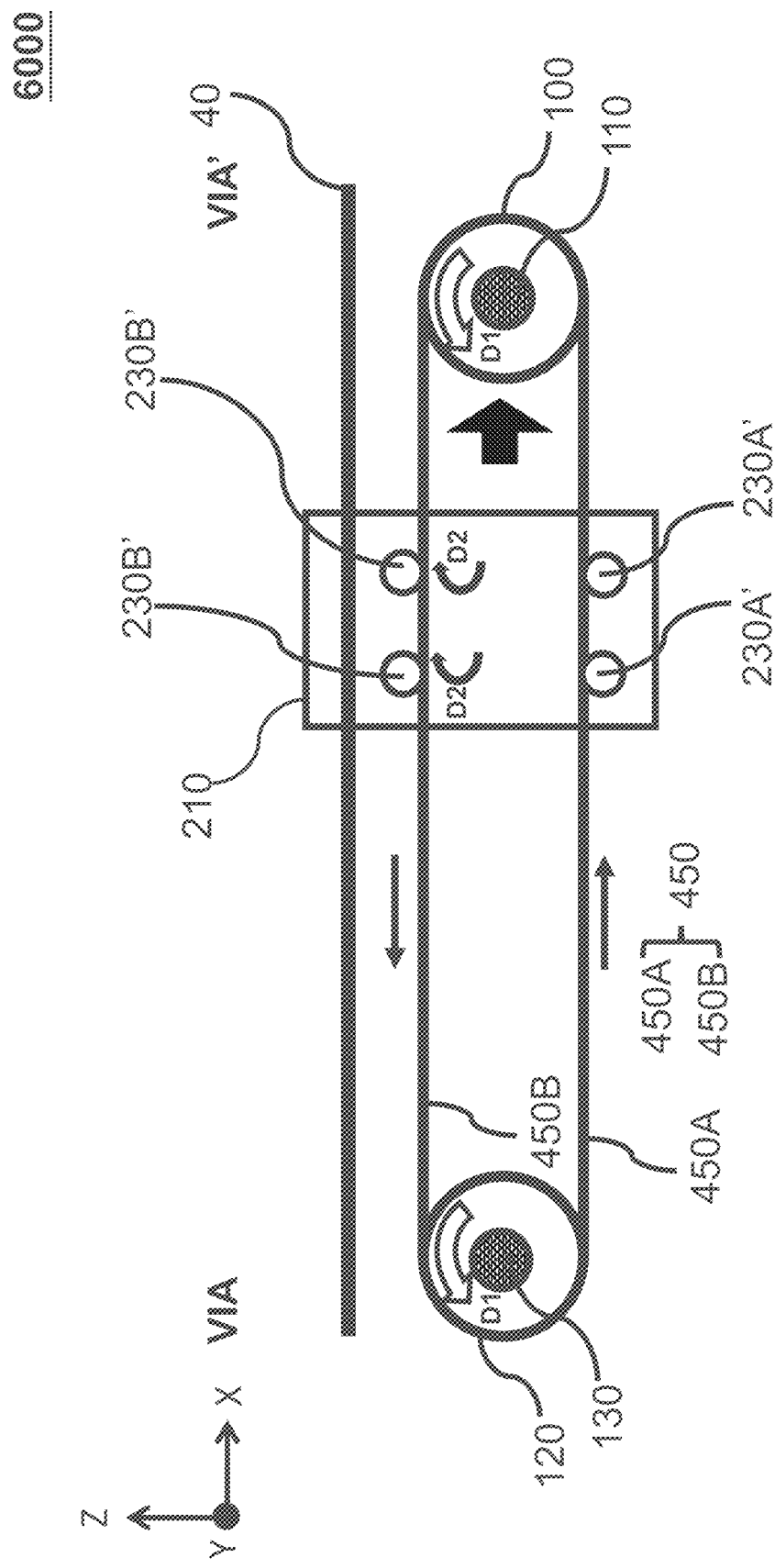
Figure 6E:
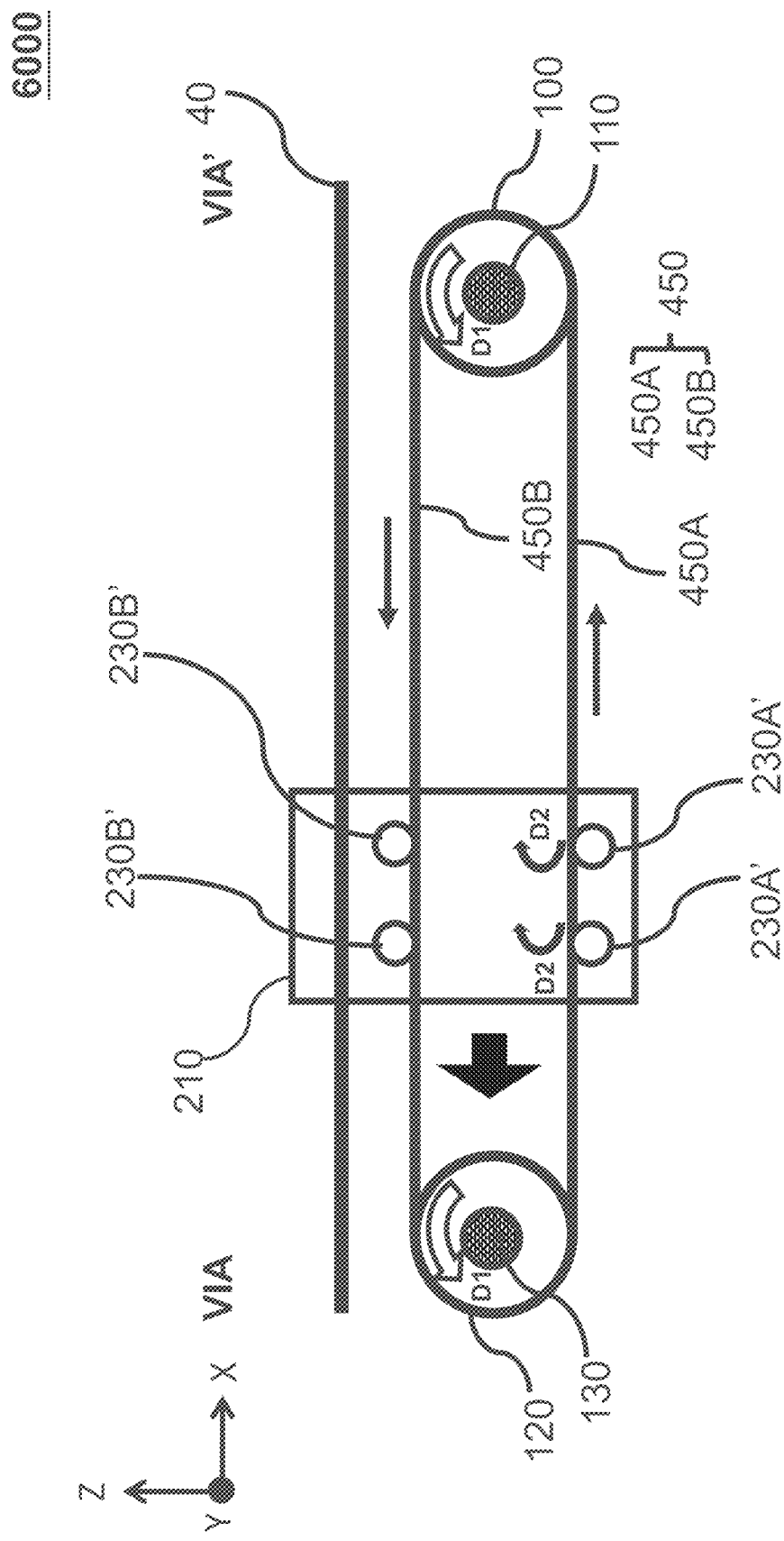

Next, please refer to FIGS. 6C-6E. When the first two-ways clutch 230A' and the second two-ways clutch 230B' are controlled to rotate along with same second rotation direction D2 as shown in FIG. 6C, and the first forcing apparatus 300 is moved to carry the first part 210 to move along with (+) first axis as shown in FIG. 6D, the second two-ways clutch 230B' is slipped along with the second linear part 450B without any linkage, and the first two-ways clutch 230A' is backstoppedly engaged with the first linear part 450A to carry the first linear part 450A to move forward toward (+) first axis and drive the first roller 100, the first driving axis 110, the second roller 120 and the second driving axis 130 to rotate along with the same first rotation direction D1. When the first two-ways clutch 230A' and the second two-ways clutch 230B' are controlled to rotate along with same second rotation direction D2 as shown in FIG. 6C, and the first forcing apparatus 300 is moved to carry the first part 210 to move along with (−) first axis as shown in FIG. 5E, the first two-ways clutch 230A' is slipped along with the first linear part 450A without any linkage, and the second two-ways clutch 230B' is backstoppedly engaged with the second linear part 450B to carry the second linear part 450B to move forward toward (+) first axis and drive the first roller 100, the first driving axis 110, the second roller 120 and the second driving axis 130 to rotate along with the same first rotation direction D1

Figure 6F:
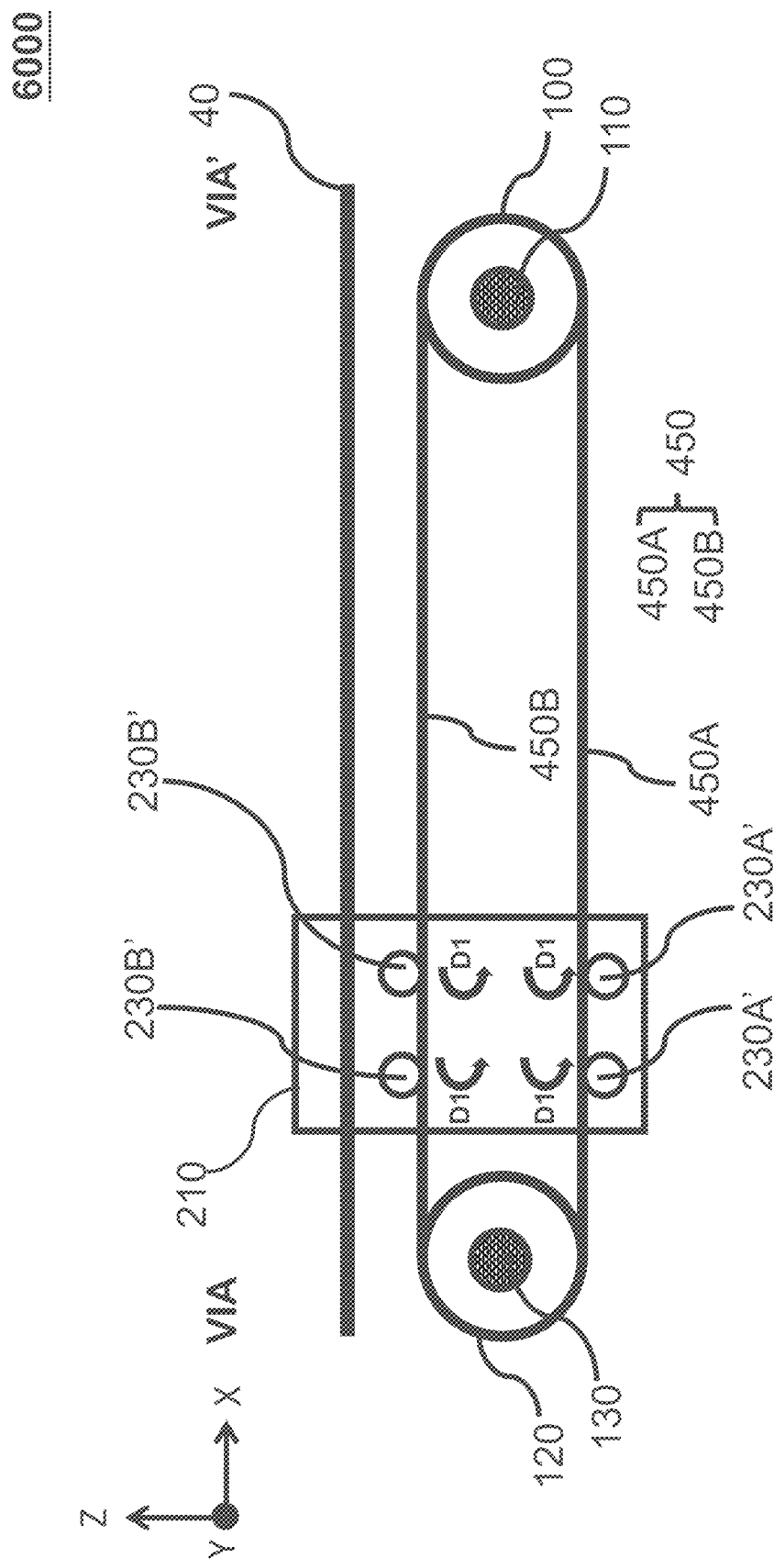
Figure 6G:
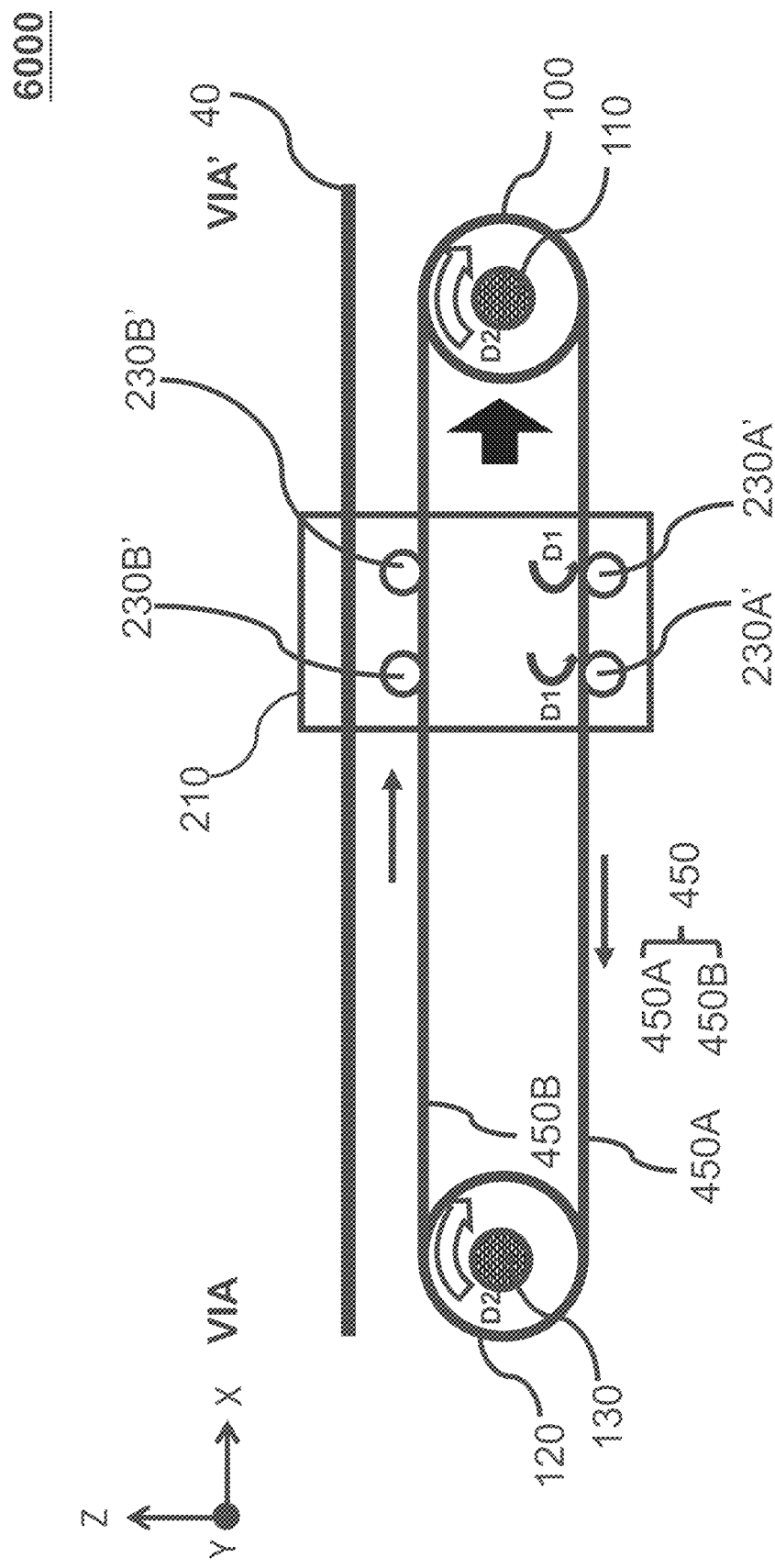
Figure 6H:
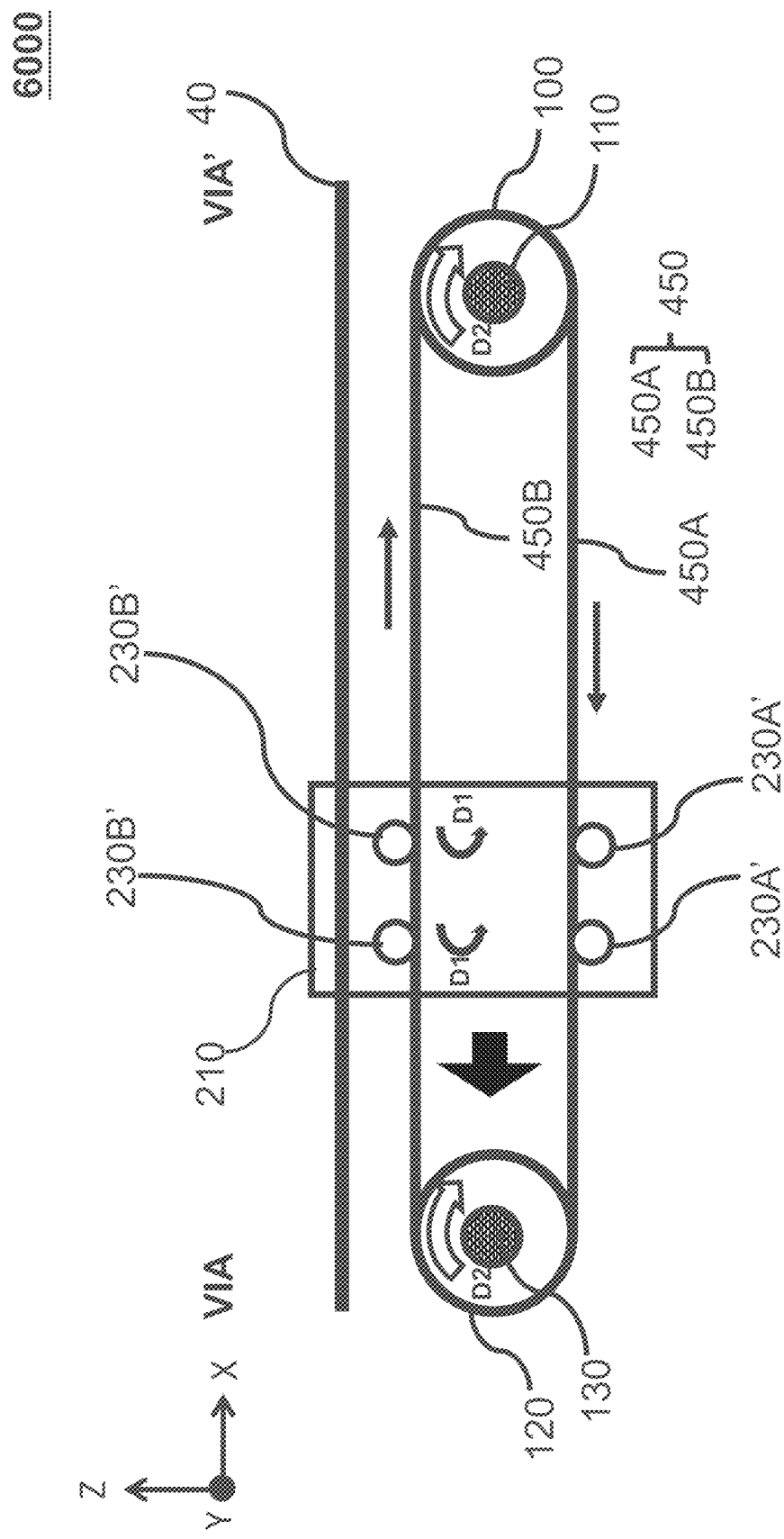

Next, please refer to FIGS. 6F-6H. When the first two-ways clutch 230A' and the second two-ways clutch 230B' are controlled to rotate along with same first rotation direction D1 as shown in FIG. 6F, and the first forcing apparatus 300 is moved to carry the first part 210 to move along with (+) first axis as shown in FIG. 6G, the first two-ways clutch 230A' is slipped along with the first linear part 450A without any linkage, and the second two-ways clutch 230B' is backstoppedly engaged with the second linear part 450B to carry the first linear part 450A to move forward toward (+) first axis and drive the first roller 100, the first driving axis 110, the second roller 120 and the second driving axis 130 to rotate along with the same second rotation direction D2. When the first two-ways clutch 230A' and the second two-ways clutch 230B' are controlled to rotate along with same first rotation direction D1 as shown in FIG. 6F, and the first forcing apparatus 300 is moved to carry the first part 210 to move along with (−) first axis as shown in FIG. 6H, the second two-ways clutch 230B' is slipped along with the second linear part 450B without any linkage, and the first two-ways clutch 230A' is backstoppedly engaged with the first linear part 450A to carry the first linear part 450A to move forward toward (+) first axis and drive the first roller 100, the first driving axis 110, the second roller 120 and the second driving axis 130 to rotate along with the same second rotation direction D2.

The rotation direction of the first roller 100 and the second roller 120 can be changed by controlling the first two-ways clutch 230A' and the second two-ways clutch 230B' to rotate along with the first rotation direction D1 or the second rotation direction D2.

Furthermore, according to other embodiment of this invention, the reciprocating linear prime mover 6000 can optionally comprises a guiding mechanism 40, for example but not limited to a guiding rail or a cable line, and the first part 210 can be guided by the guiding mechanism 40 to reciprocatingly move along with the first axis.

Embodiment 7

Figure 7A:
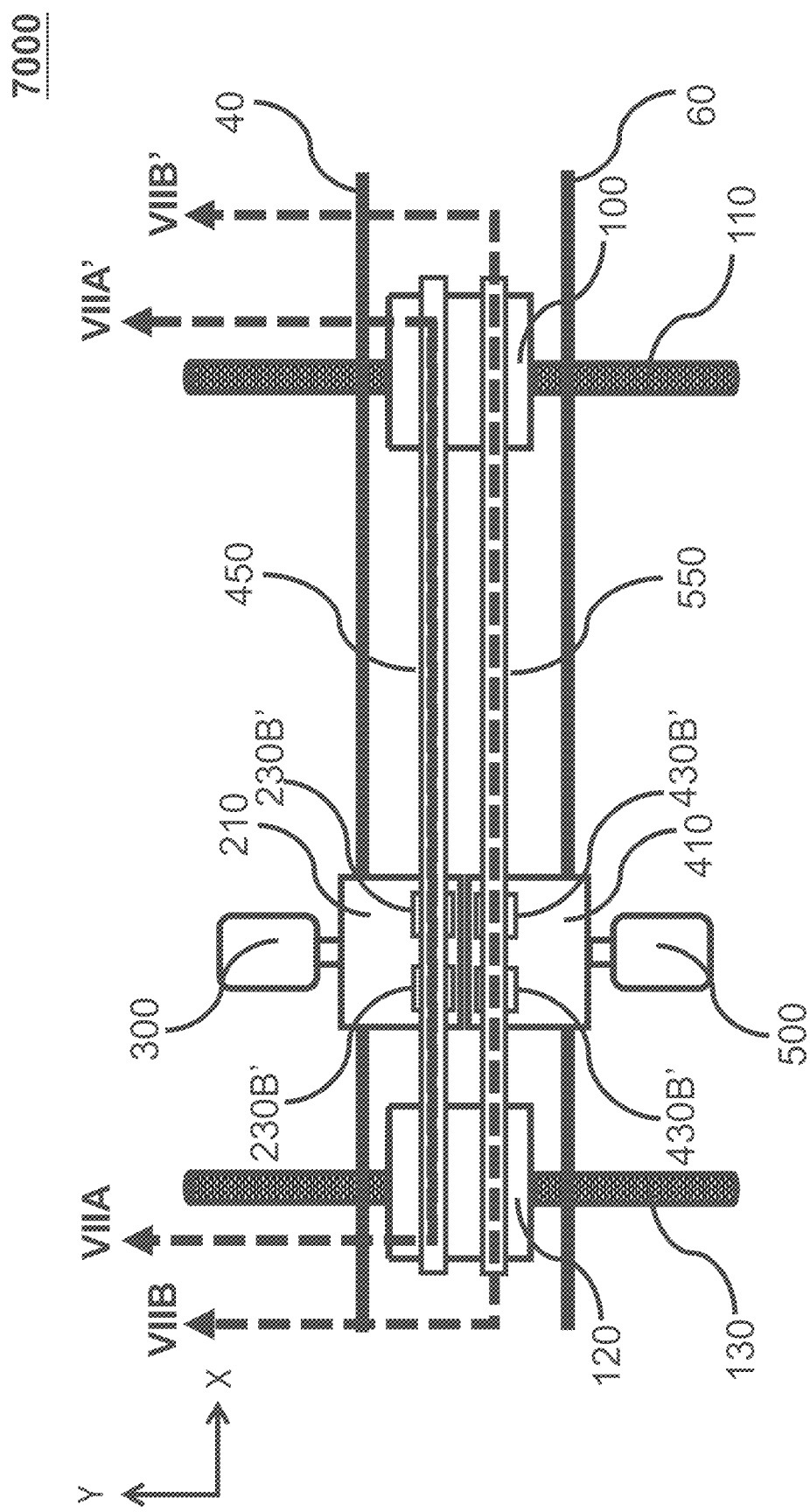
FIG. 7A is a top view illustrating the reciprocating linear prime mover 7000 according to Embodiment 7 of this invention.

Please refer FIG. 7A and FIGS. 7B-7H. FIG. 7A is a top view illustrating the reciprocating linear prime mover 7000 according to Embodiment 7 of this invention. FIGS. 7B-7H are cross-sectional views along with cross-sectional lines VIIA-VIIA' and VIIB-VIIB' of FIG. 7A.

Figure 7B:
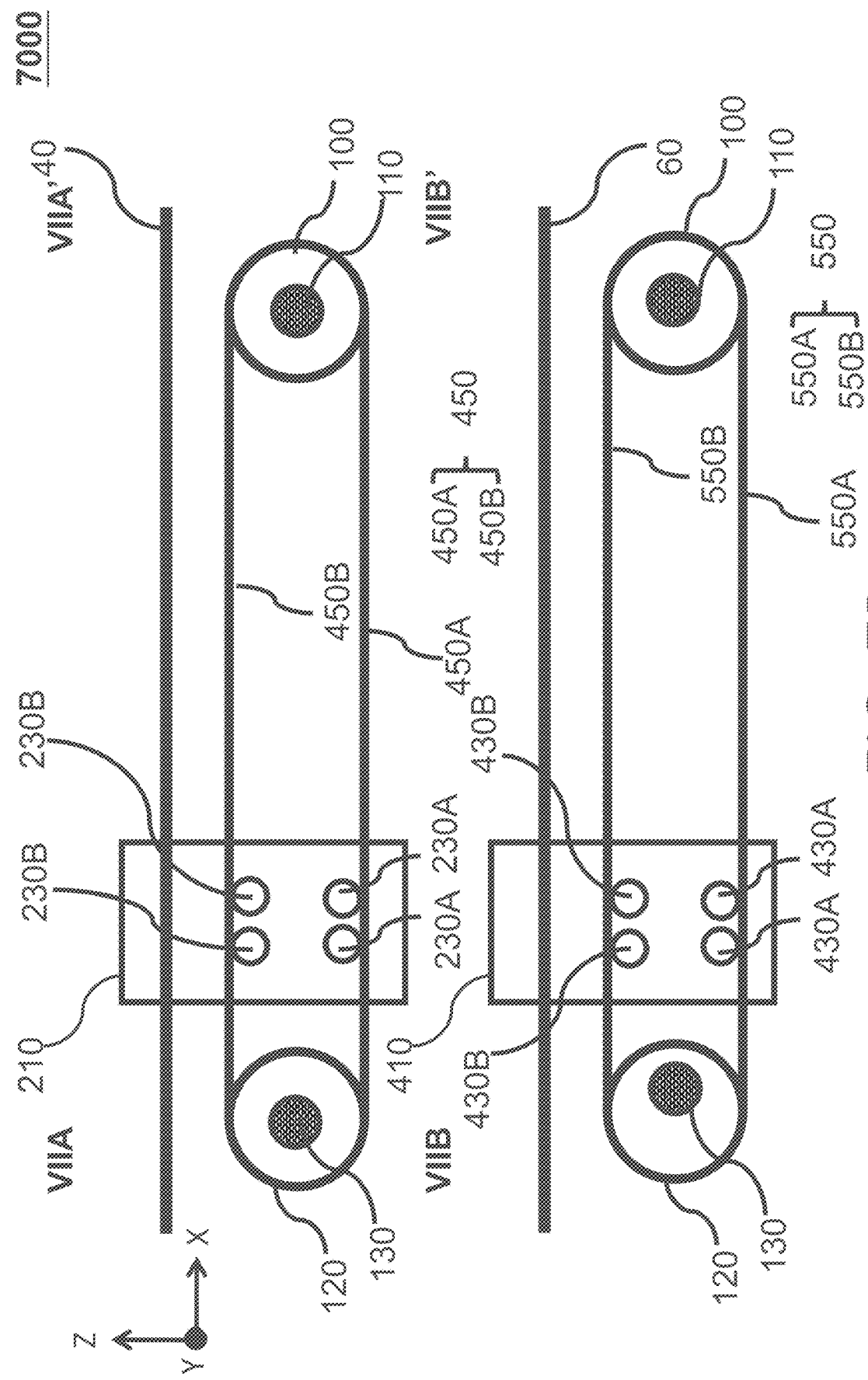
FIGS. 7B-7H are cross-sectional views along with cross-sectional lines VIIA-VIIA' and VIIB-VIIB' of FIG. 7A.

As shown in FIGS. 7A and 7B, a reciprocating linear prime mover 7000 according to this present Embodiment 7 is disclosed, and the reciprocating linear prime mover 7000 is similar to the reciprocating linear prime mover 5000, except the reciprocating linear prime mover 7000 further comprises a closed first linear driving element 550 winded on the first roller 100 and the second roller 120, and the closed first linear driving element 550 comprises a third linear part 550A and a fourth linear part 550B between the first roller 100 and the second roller 120, wherein the fourth linear part 550B is above the third linear part 550A along with a (+) third axis, and the first linear part 450A is adjacent to the third linear part 550A, and the second linear part 450B is adjacent to the fourth linear part 550B; a second part 410 disposed between the first roller 100 and the second roller 120, wherein the second part 410 is reciprocatingly moved along with the first axis, and the second part 410 comprises at least a third one-way clutch 430A' nearby the inner side of the third linear part 550A and contacting therewith, and at least a fourth one-way clutch 430B' nearby the inner side of the fourth linear part 550B and contacting therewith, and the third one-way clutch 430A' and the fourth one-way clutch 430B' rotate along with the same first rotation direction D1 or the same second rotation direction D2 as the first two-ways clutch 230A' and the second two-ways clutch 230B'; and a second forcing apparatus 500 fasten on the second part 410; wherein, the first axis and the second axis are perpendicular to each other, and the first axis and the third axis are perpendicular to each other. According to this present Embodiment 3, the first axis is X-axis, the second axis is Y-axis, and the third axis is Z-axis.

Figure 7C:
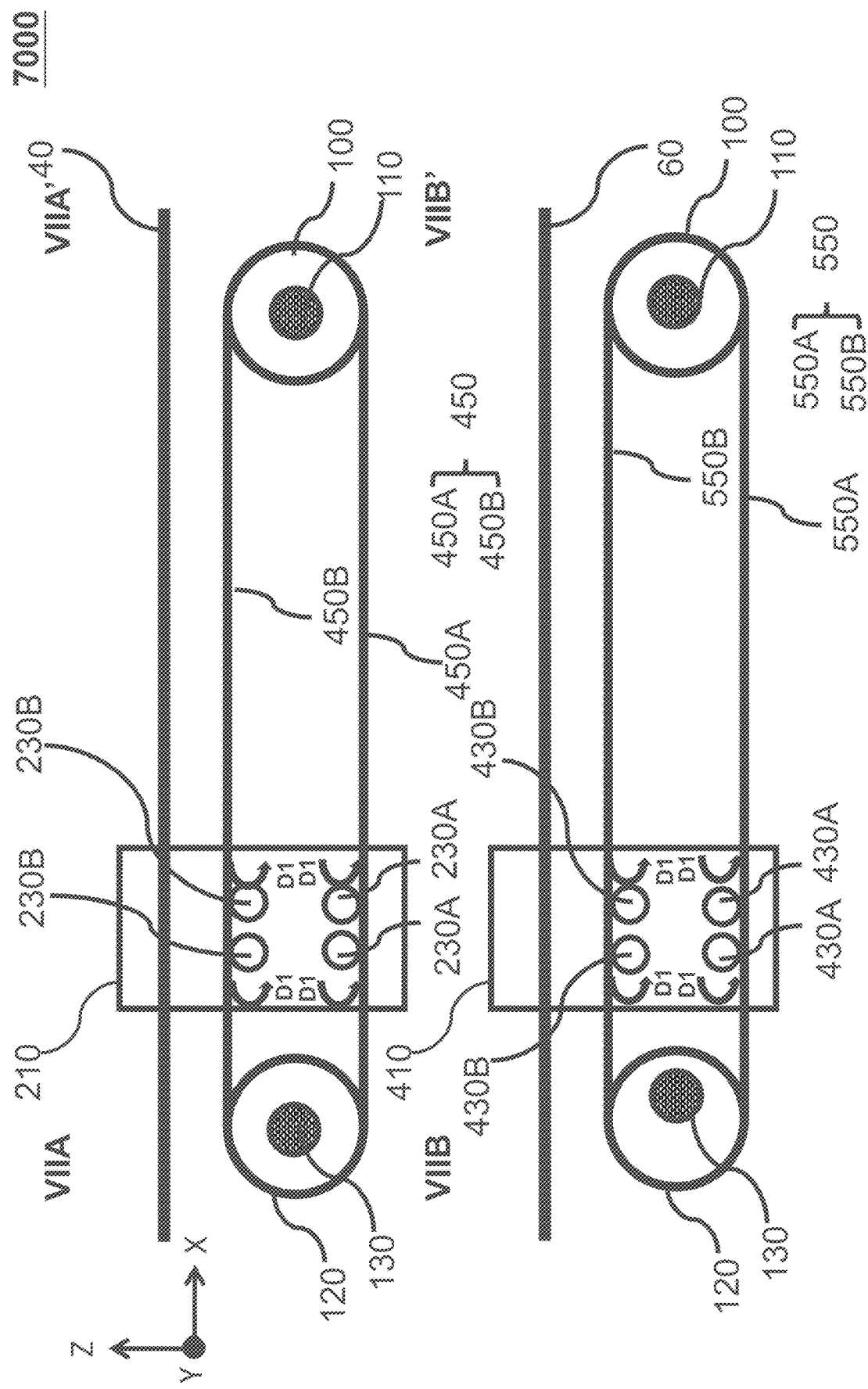
Figure 7D:
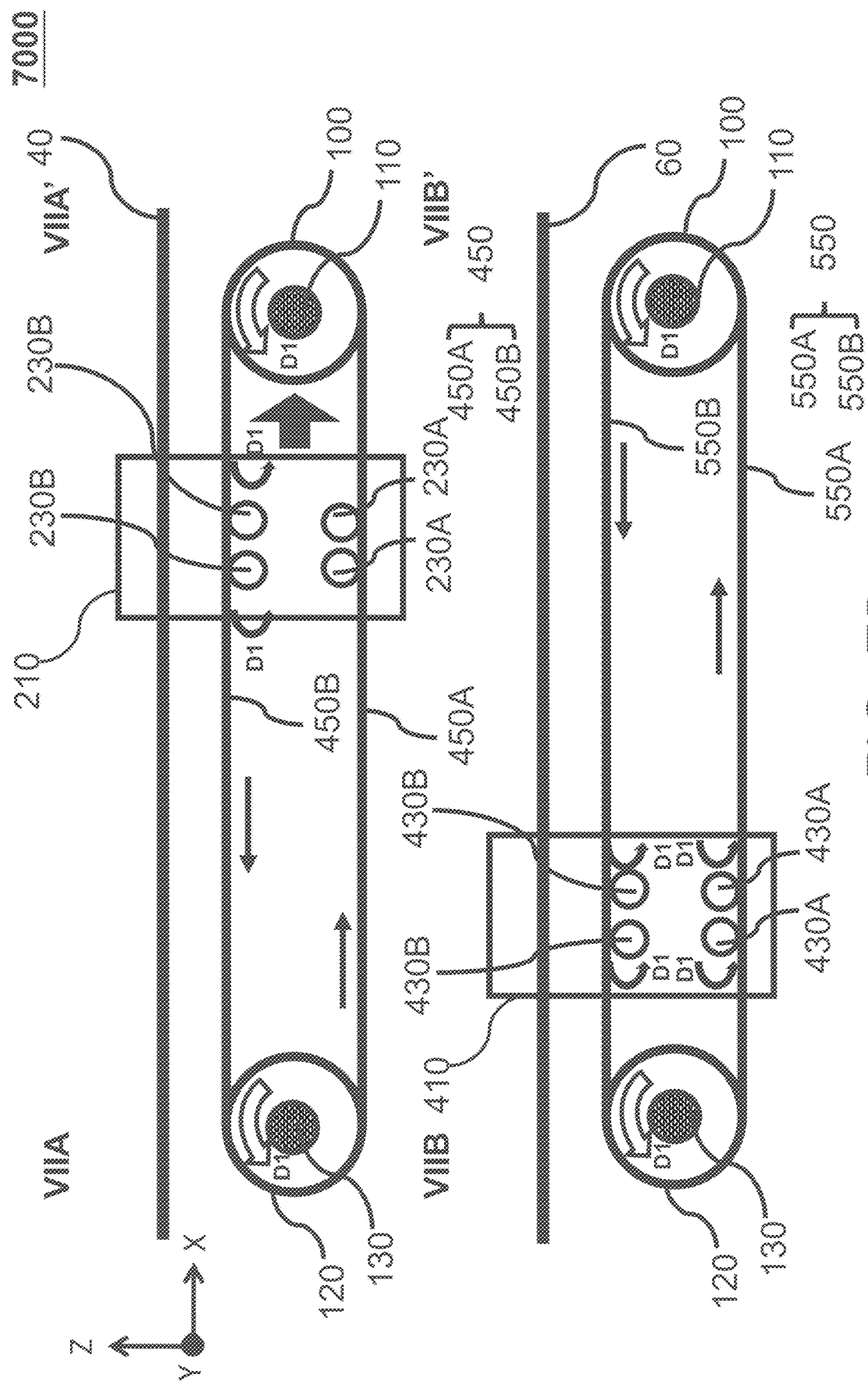
Figure 7E:
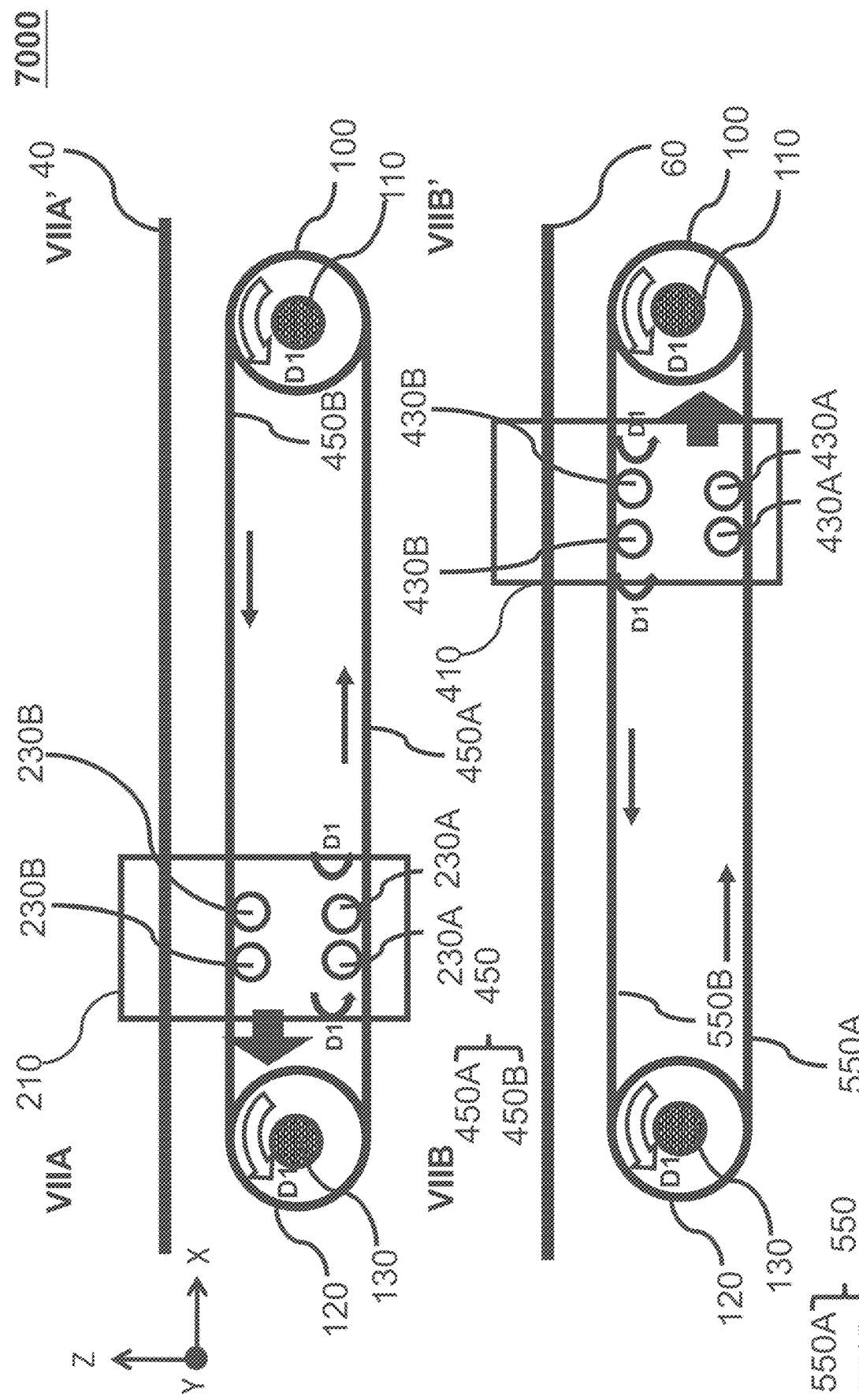

Next, please refer to FIGS. 7C-7E. When the first two-ways clutch 230A' and the second two-ways clutch 230B' are controlled to rotate along with same first rotation direction D1 as shown in FIG. 7C, and the first forcing apparatus 300 is moved to carry the first part 210 to move along with (+) first axis as shown in FIG. 7D, the second two-ways clutch 230B' is slipped along with the second linear part 450B without any linkage, and the first two-ways clutch 230A' is backstoppedly engaged with the first linear part 450A to carry the first linear part 450A to move forward toward (+) first axis and drive the first roller 100, the first driving axis 110, the second roller 120 and the second driving axis 130 to rotate along with the same first rotation direction D1. When the first two-ways clutch 230A' and the second two-ways clutch 230B' are controlled to rotate along with same first rotation direction D1 as shown in FIG. 7C, and the first forcing apparatus 300 is moved to carry the first part 210 to move along with (−) first axis as shown in FIG. 7E, the first two-ways clutch 230A' is slipped along with the first linear part 450A without any linkage, and the second two-ways clutch 230B' is backstoppedly engaged with the second linear part 450B to carry the second linear part 450B to move forward toward (+) first axis and drive the first roller 100, the first driving axis 110, the second roller 120 and the second driving axis 130 to rotate along with the same first rotation direction D1.

Next, please refer to FIGS. 7C-7E. When the third two-ways clutch 430A' and the fourth two-ways clutch 230B' are controlled to rotate along with same first rotation direction D1 as the first two-ways clutch 230A' and the second two-ways clutch 230B' as shown in FIG. 7C, and the second forcing apparatus 500 is moved to carry the second part 410 to move along with (+) first axis as shown in FIG. 7D, the fourth two-ways clutch 430B' is slipped along with the fourth linear part 550B without any linkage, and the third two-ways clutch 430A' is backstoppedly engaged with the third linear part 550A to carry the third linear part 550A to move forward toward (+) first axis and drive the first roller 100, the first driving axis 110, the second roller 120 and the second driving axis 130 to rotate along with the same first rotation direction D1. Similarly, when the third two-ways clutch 430A' and the fourth two-ways clutch 230B' are controlled to rotate along with same first rotation direction D1 as the first two-ways clutch 230A' and the second two-ways clutch 230B' as shown in FIG. 7C, and the second forcing apparatus 500 is moved to carry the second part 410 to move along with (−) first axis as shown in FIG. 7E, the third two-ways clutch 430A' is slipped along with the third linear part 550A without any linkage, and the fourth two-ways clutch 430B' is backstoppedly engaged with the fourth linear part 550B to carry the fourth linear part 550B to move forward toward (−) first axis and drive the first roller 100, the first driving axis 110, the second roller 120 and the second driving axis 130 to rotate along with the same first rotation direction D1.

Figure 7F:
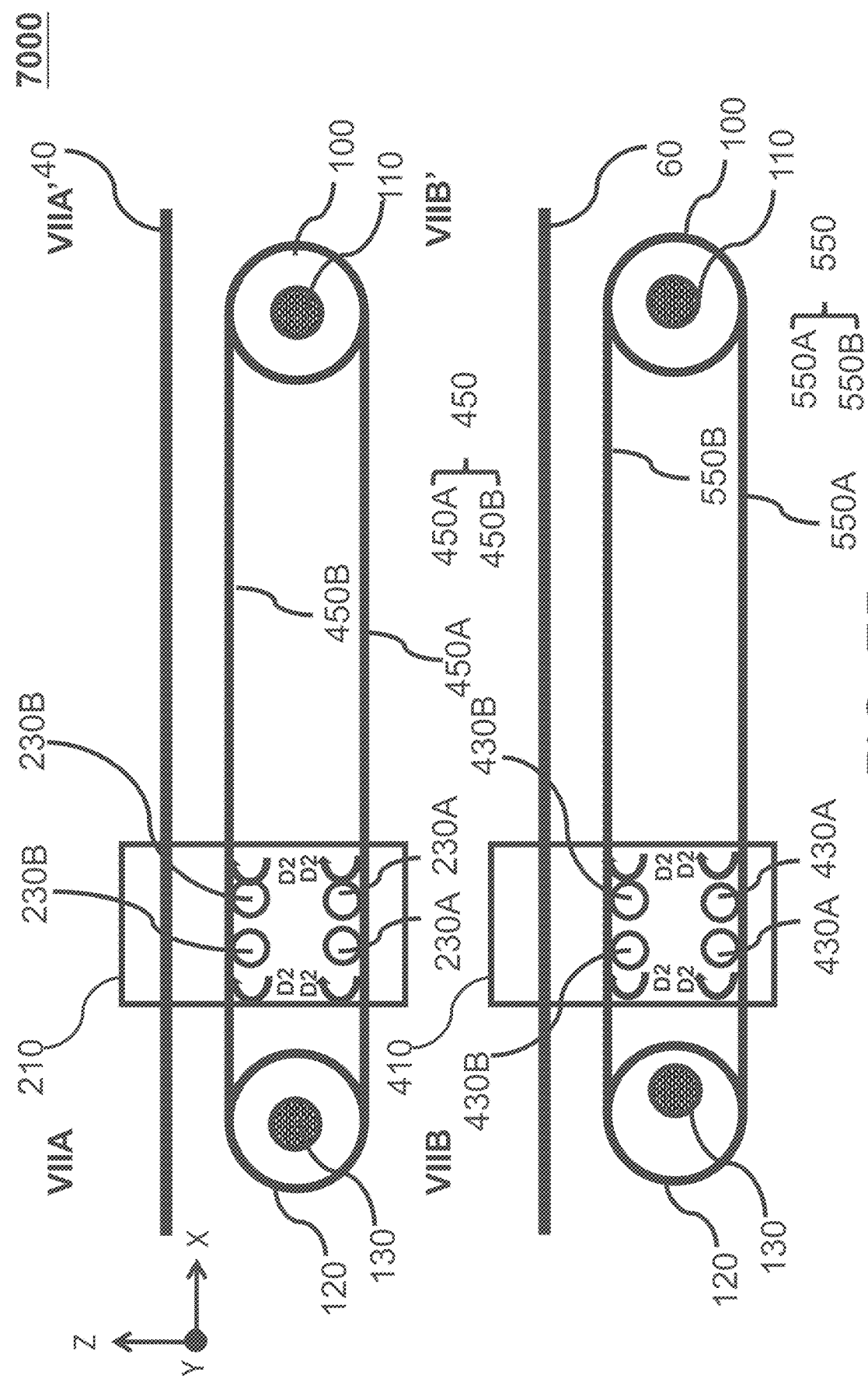
Figure 7G:
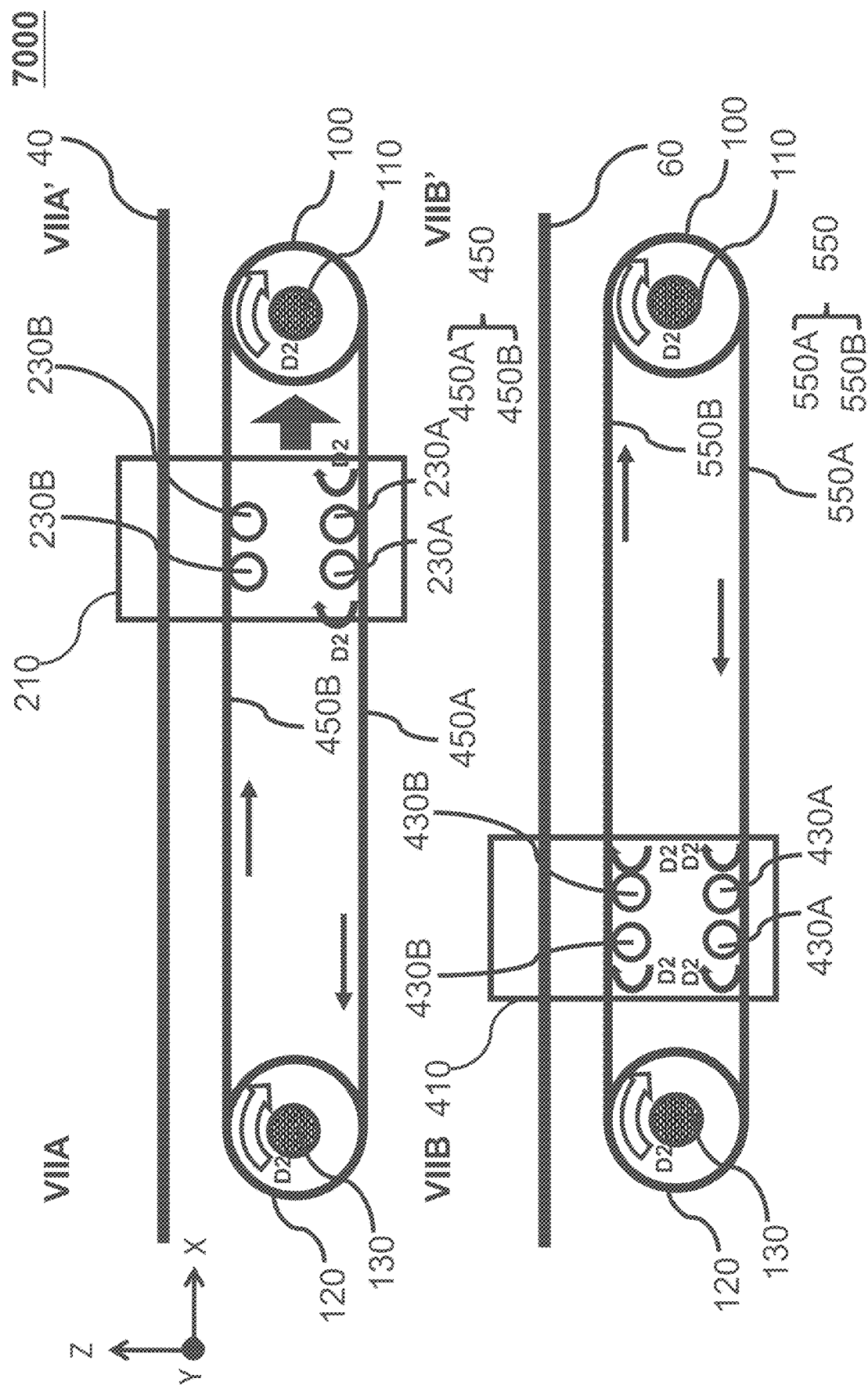
Figure 7H:
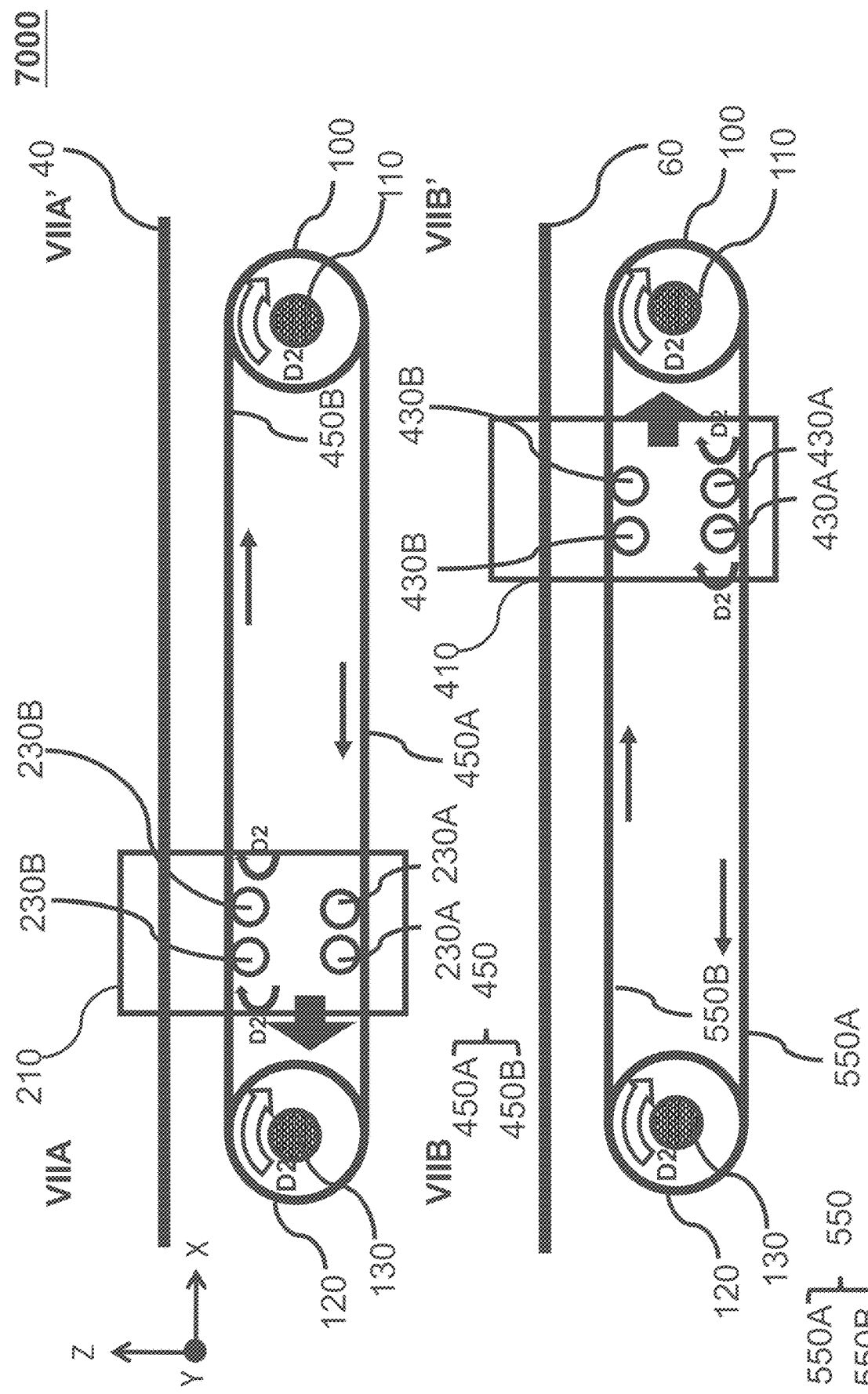

Next, please refer to FIGS. 7F-7H. When the first two-ways clutch 230A' and the second two-ways clutch 230B' are controlled to rotate along with same second rotation direction D2 as shown in FIG. 7F, and the first forcing apparatus 300 is moved to carry the first part 210 to move along with (+) first axis as shown in FIG. 7G, the first two-ways clutch 230A' is slipped along with the first linear part 450A without any linkage, and the second two-ways clutch 230B' is backstoppedly engaged with the second linear part 450B to carry the first linear part 450A to move forward toward (+) first axis and drive the first roller 100, the first driving axis 110, the second roller 120 and the second driving axis 130 to rotate along with the same second rotation direction D2. When the first two-ways clutch 230A' and the second two-ways clutch 230B' are controlled to rotate along with same second rotation direction D2 as shown in FIG. 7F, and the first forcing apparatus 300 is moved to carry the first part 210 to move along with (−) first axis as shown in FIG. 7H, the second two-ways clutch 230B' is slipped along with the second linear part 450B without any linkage, and the first two-ways clutch 230A' is backstoppedly engaged with the first linear part 450A to carry the first linear part 450A to move forward toward (+) first axis and drive the first roller 100, the first driving axis 110, the second roller 120 and the second driving axis 130 to rotate along with the same second rotation direction D2.

Next, please refer to FIGS. 7F-7H. When the third two-ways clutch 430A' and the fourth two-ways clutch 230B' are controlled to rotate along with same second rotation direction D2 as the first two-ways clutch 230A' and the second two-ways clutch 230B' as shown in FIG. 7F, and the second forcing apparatus 500 is moved to carry the second part 410 to move along with (+) first axis as shown in FIG. 7G, the third two-ways clutch 430A' is slipped along with the third linear part 550A without any linkage, and the fourth two-ways clutch 430B' is backstoppedly engaged with the fourth linear part 550B to carry the fourth linear part 550B to move forward toward (+) first axis and drive the first roller 100, the first driving axis 110, the second roller 120 and the second driving axis 130 to rotate along with the same second rotation direction D2. Similarly, when the third two-ways clutch 430A' and the fourth two-ways clutch 230B' are controlled to rotate along with same second rotation direction D2 as the first two-ways clutch 230A' and the second two-ways clutch 230B' as shown in FIG. 7F, and the second forcing apparatus 500 is moved to carry the second part 410 to move along with (−) first axis as shown in FIG. 7H, the fourth two-ways clutch 430B' is slipped along with the fourth linear part 550B without any linkage, and the third two-ways clutch 430A' is backstoppedly engaged with the third linear part 550A to carry the third linear part 550A to move forward toward (−) first axis and drive the first roller 100, the first driving axis 110, the second roller 120 and the second driving axis 130 to rotate along with the same second rotation direction D2.

The rotation direction of the first roller 100 and the second roller 120 can be changed by controlling the first two-ways clutch 230A', the second two-ways clutch 230B', the third two-ways clutch 430A', and the fourth two-ways clutch 430B' to rotate along with the first rotation direction D1 or the second rotation direction D2.

Furthermore, according to other embodiment of this invention, the reciprocating linear prime mover 5000 can optionally comprises a guiding mechanism 40, for example but not limited to a guiding rail or a cable line, and the first part 210 can be guided by the guiding mechanism 40 to reciprocatingly move along with the first axis.

Embodiment 8

Figure 8A:
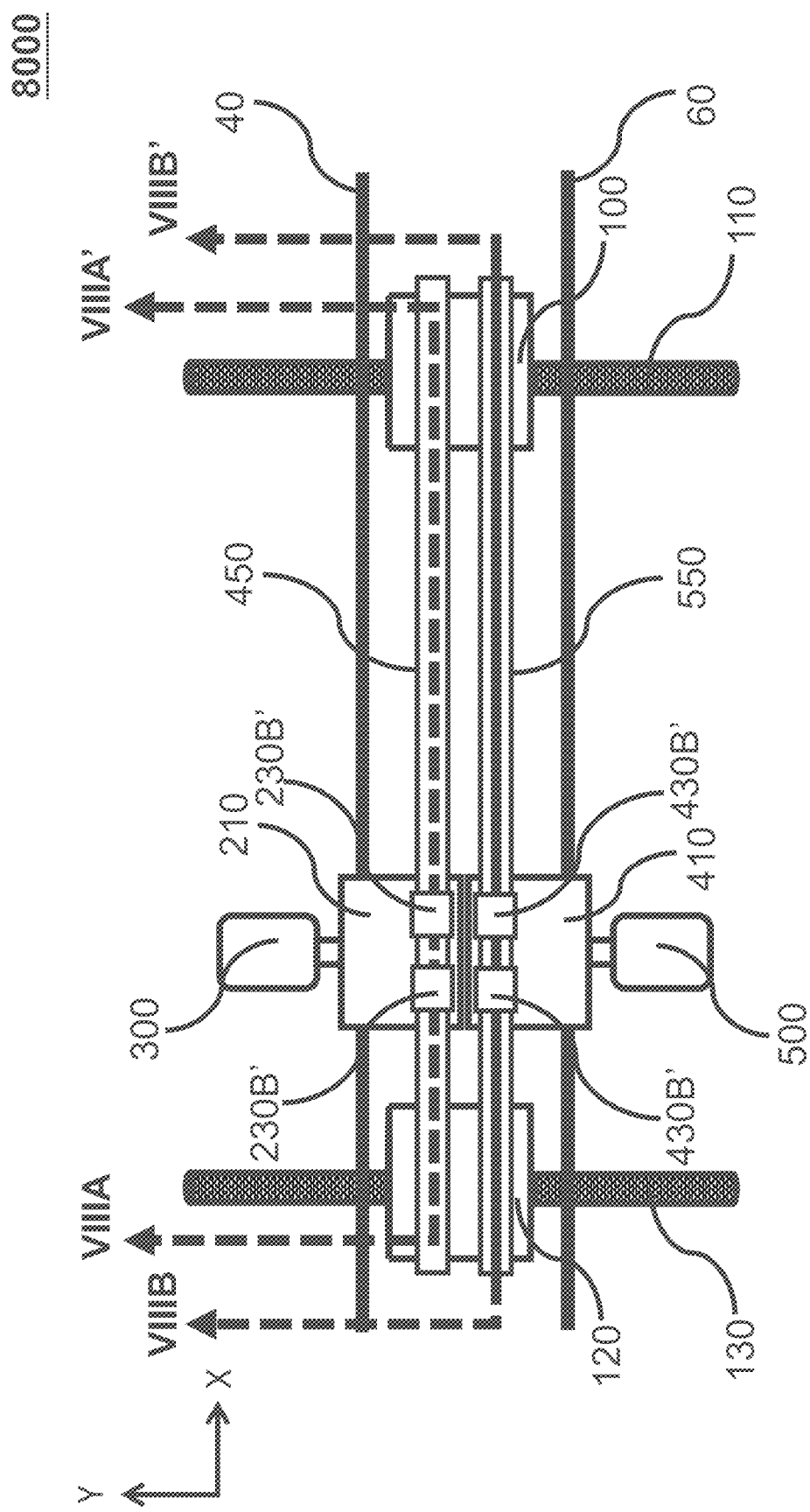
FIG. 8A is a top view illustrating the reciprocating linear prime mover 8000 according to Embodiment 8 of this invention.
Figure 8B:
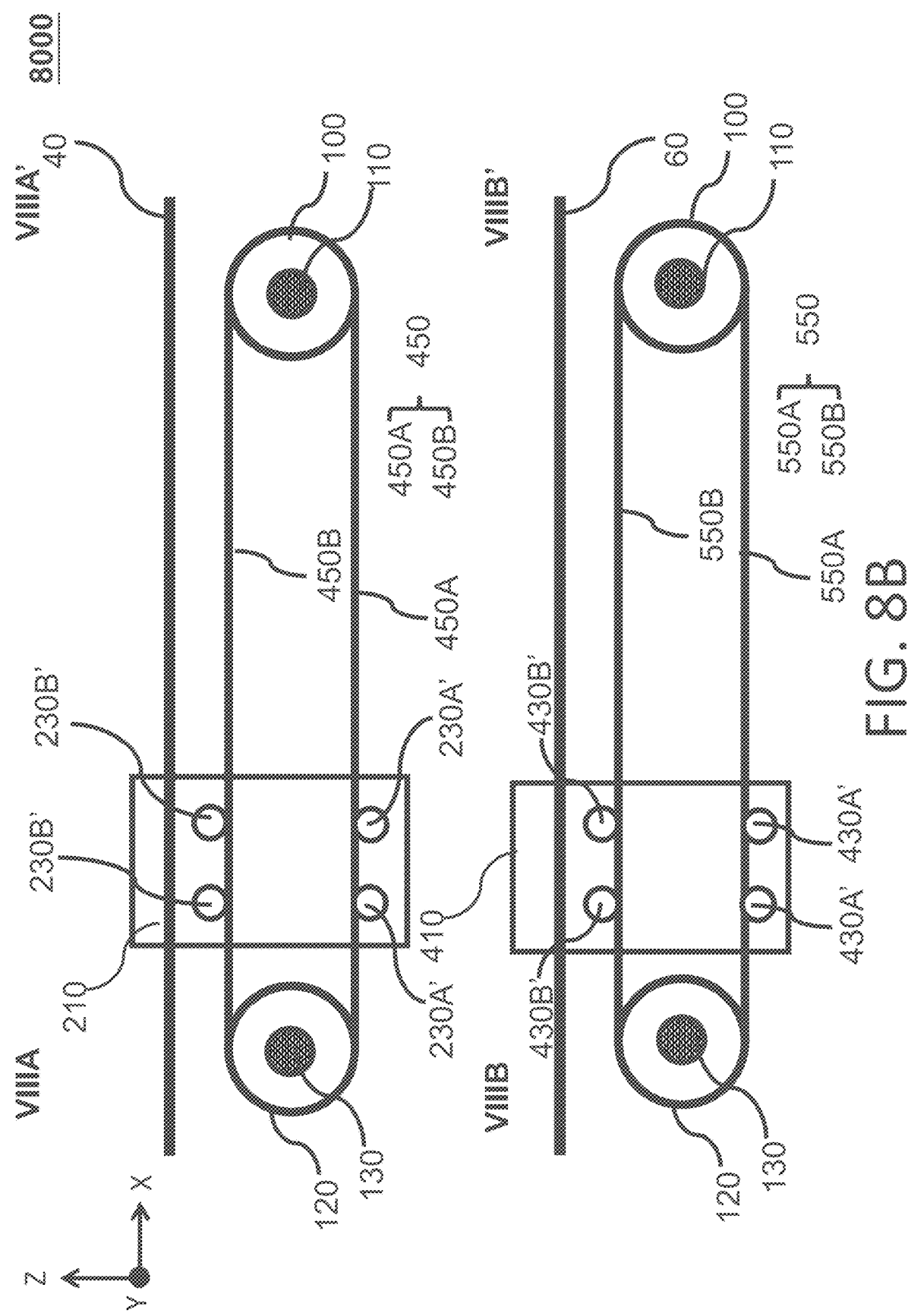

Please refer FIG. 8A and FIGS. 8B-8H. FIG. 8A is a top view illustrating the reciprocating linear prime mover 8000 according to Embodiment 8 of this invention. FIGS. 8B-0.8H are cross-sectional views along with cross-sectional lines VIIIA-VIIIA' and VIIIB-VIIIB' of FIG. 8A.

As shown in FIGS. 8A and 8B, a reciprocating linear prime mover 8000 according to this present Embodiment 8 is disclosed, and the reciprocating linear prime mover 8000 is similar to the reciprocating linear prime mover 6000, except the reciprocating linear prime mover 8000 further comprises a closed first linear driving element 550 winded on the first roller 100 and the second roller 120, and the closed first linear driving element 550 comprises a third linear part 550A and a fourth linear part 550B between the first roller 100 and the second roller 120, wherein the fourth linear part 550B is above the third linear part 550A along with a (+) third axis, and the first linear part 450A is adjacent to the third linear part 550A, and the second linear part 450B is adjacent to the fourth linear part 550B; a second part 410 disposed between the first roller 100 and the second roller 120, wherein the second part 410 is reciprocatingly moved along with the first axis, and the second part 410 comprises at least a third one-way clutch 430A' nearby the outer side of the third linear part 550A and contacting therewith, and at least a fourth one-way clutch 430B' nearby the outer side of the fourth linear part 550B and contacting therewith, and the third one-way clutch 430A' and the fourth one-way clutch 430B' rotate along with the same first rotation direction D1 or the same second rotation direction D2 as the first two-ways clutch 230A' and the second two-ways clutch 230B'; and a second forcing apparatus 500 fasten on the second part 410; wherein, the first axis and the second axis are perpendicular to each other, and the first axis and the third axis are perpendicular to each other. According to this present Embodiment 3, the first axis is X-axis, the second axis is Y-axis, and the third axis is Z-axis.

Figure 8C:
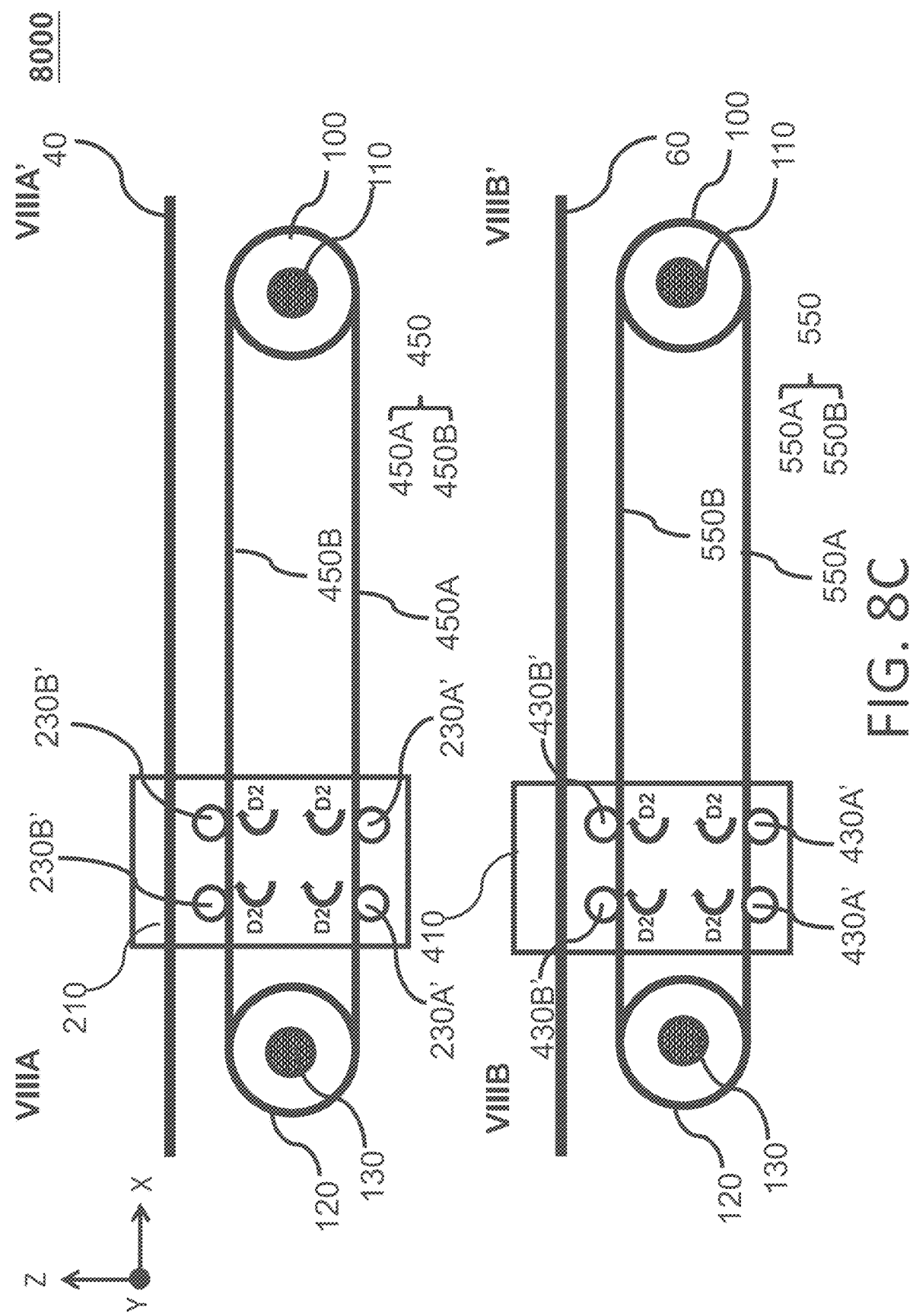
Figure 8D:
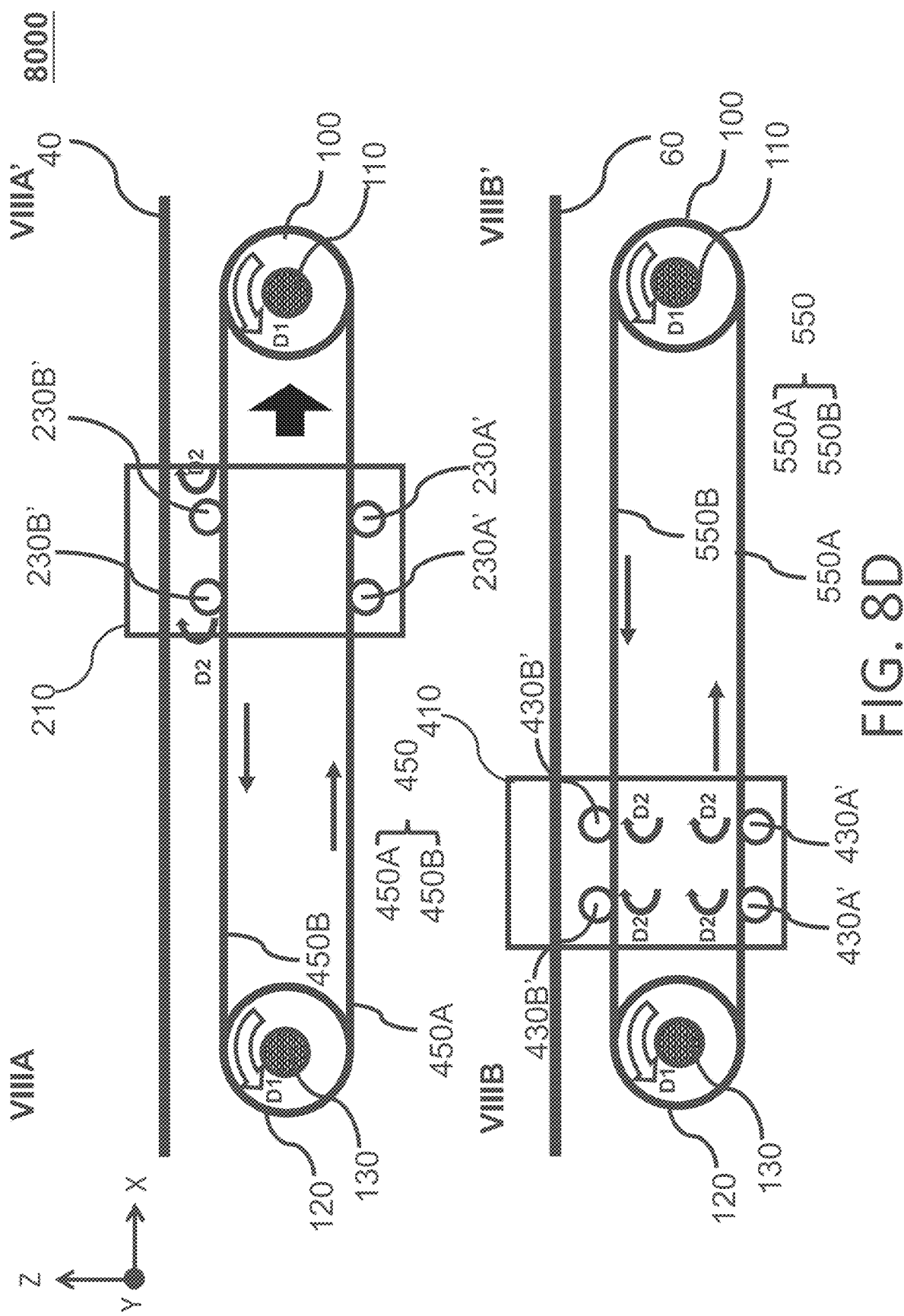
Figure 8E:
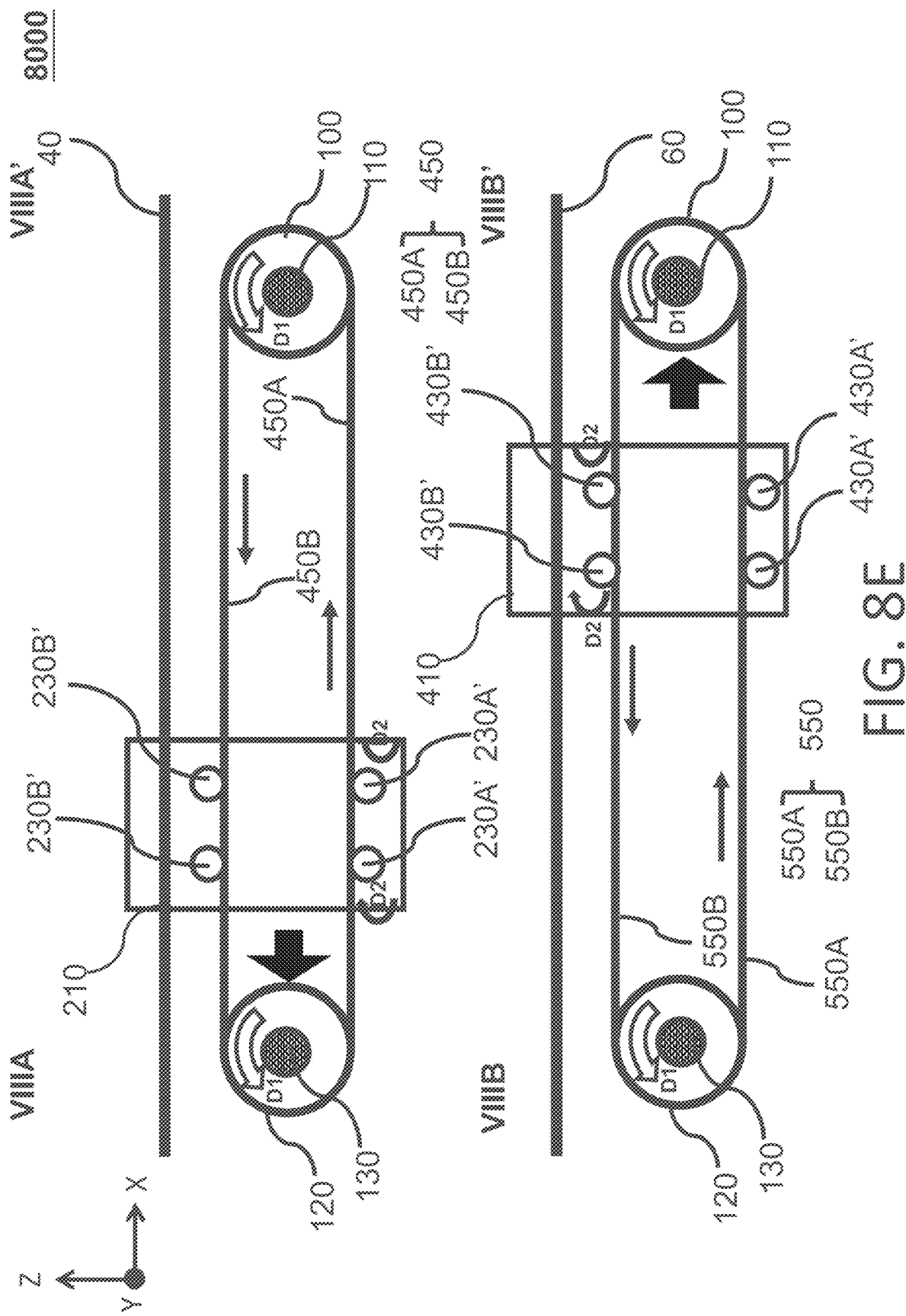

Next, please refer to FIGS. 8C-8E. When the first two-ways clutch 230A' and the second two-ways clutch 230B' are controlled to rotate along with same second rotation direction D2 as shown in FIG. 8C, and the first forcing apparatus 300 is moved to carry the first part 210 to move along with (+) first axis as shown in FIG. 8D, the second two-ways clutch 230B' is slipped along with the second linear part 450B without any linkage, and the first two-ways clutch 230A' is backstoppedly engaged with the first linear part 450A to carry the first linear part 450A to move forward toward (+) first axis and drive the first roller 100, the first driving axis 110, the second roller 120 and the second driving axis 130 to rotate along with the same first rotation direction D1. When the first two-ways clutch 230A' and the second two-ways clutch 230B' are controlled to rotate along with same first rotation direction D1 as shown in FIG. 8C, and the first forcing apparatus 300 is moved to carry the first part 210 to move along with (−) first axis as shown in FIG. 8E, the first two-ways clutch 230A' is slipped along with the first linear part 450A without any linkage, and the second two-ways clutch 230B' is backstoppedly engaged with the second linear part 450B to carry the second linear part 450B to move forward toward (−) first axis and drive the first roller 100, the first driving axis 110, the second roller 120 and the second driving axis 130 to rotate along with the same first rotation direction D1.

Next, please refer to FIGS. 8C-8E. When the third two-ways clutch 430A' and the fourth two-ways clutch 230B' are controlled to rotate along with same second rotation direction D2 as the first two-ways clutch 230A' and the second two-ways clutch 230B' as shown in FIG. 8C, and the second forcing apparatus 500 is moved to carry the second part 410 to move along with (+) first axis as shown in FIG. 8E, the fourth two-ways clutch 430B' is slipped along with the fourth linear part 550B without any linkage, and the third two-ways clutch 430A' is backstoppedly engaged with the third linear part 550A to carry the third linear part 550A to move forward toward (+) first axis and drive the first roller 100, the first driving axis 110, the second roller 120 and the second driving axis 130 to rotate along with the same first rotation direction D1. Similarly, when the third two-ways clutch 430A' and the fourth two-ways clutch 230B' are controlled to rotate along with same second rotation direction D2, and the second forcing apparatus 500 is moved to carry the second part 410 to move along with (−) first axis, the third two-ways clutch 430A' is slipped along with the third linear part 550A without any linkage, and the fourth two-ways clutch 430B' is backstoppedly engaged with the fourth linear part 550B to carry the fourth linear part 550B to move forward toward (−) first axis and drive the first roller 100, the first driving axis 110, the second roller 120 and the second driving axis 130 to rotate along with the same first rotation direction D1.

Figure 8G:
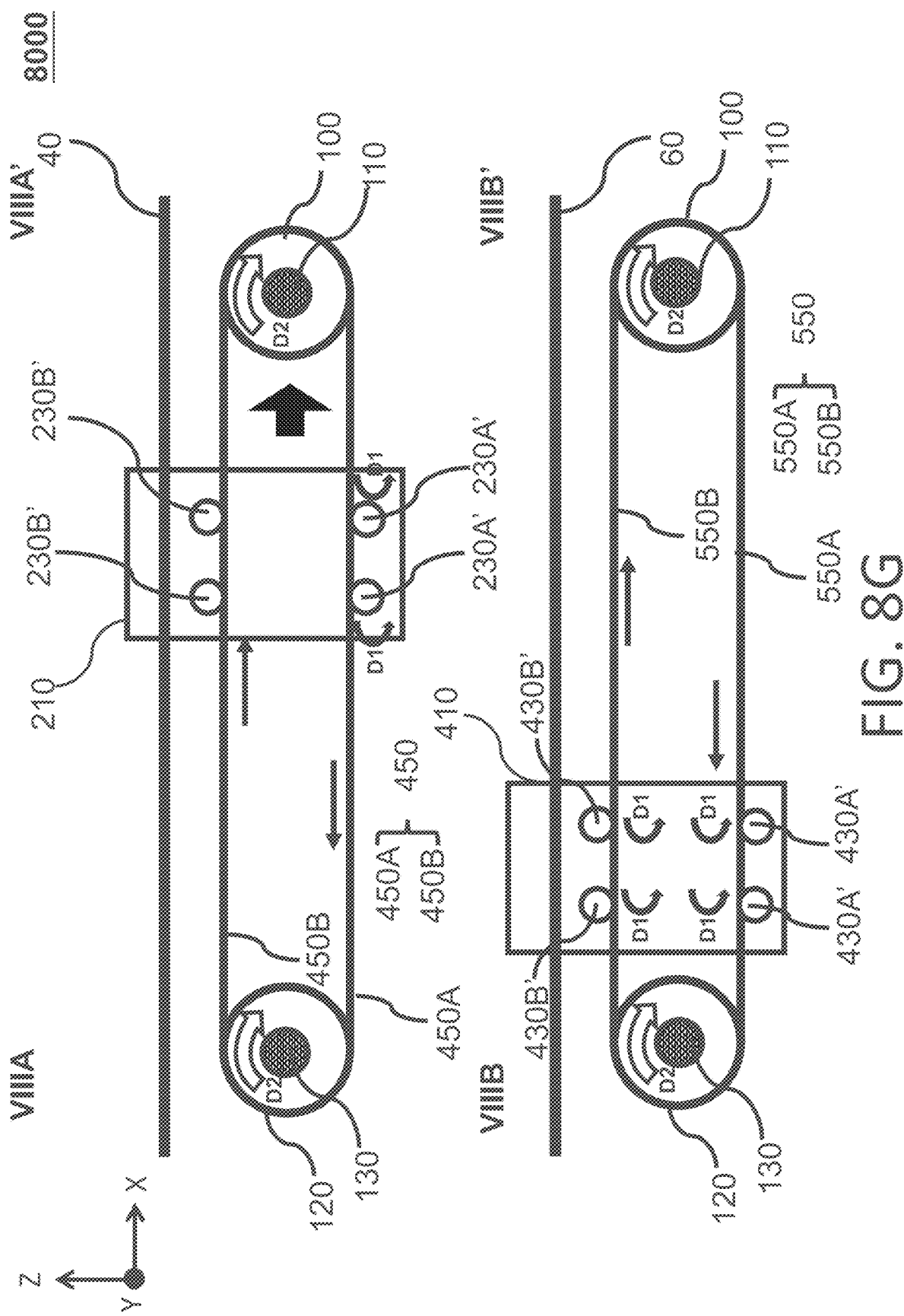
Figure 8H:
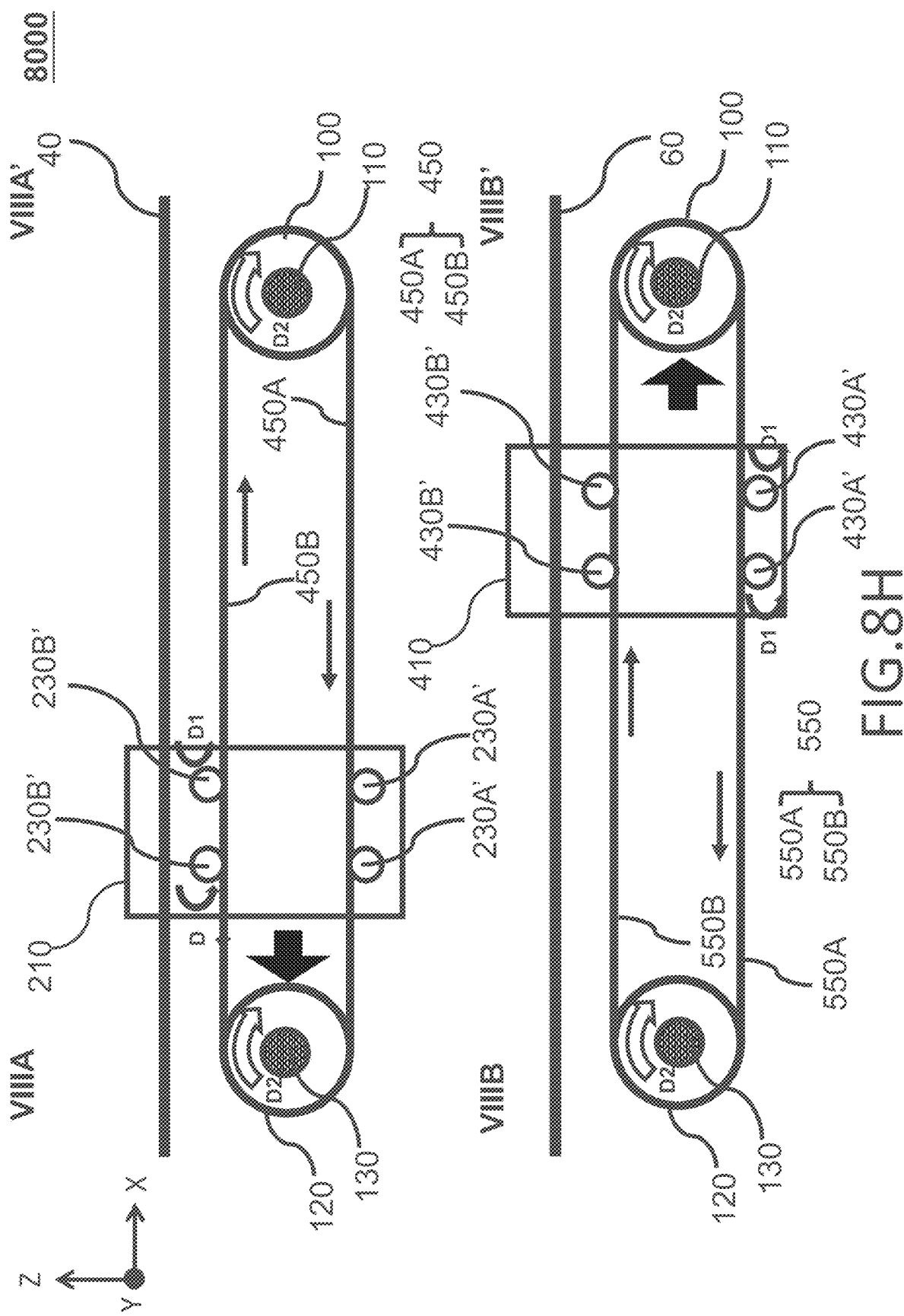
Figure 9A:
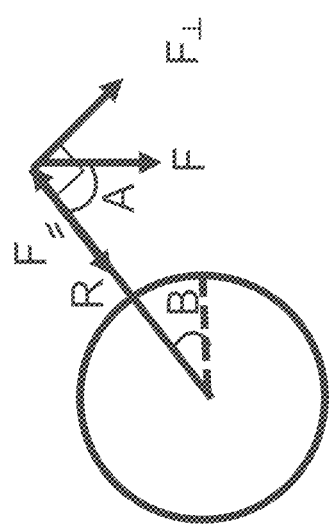
FIG. 9A-9C are schematic diagrams showing a conventional rotary prime mover at different pedaling angles.
Figure 9B:
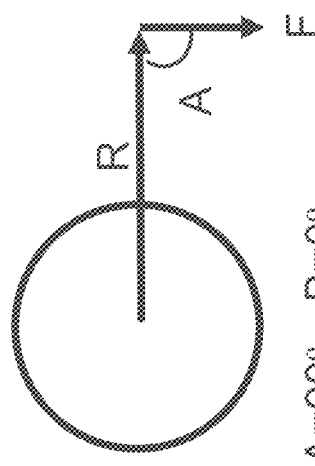
Figure 9C:
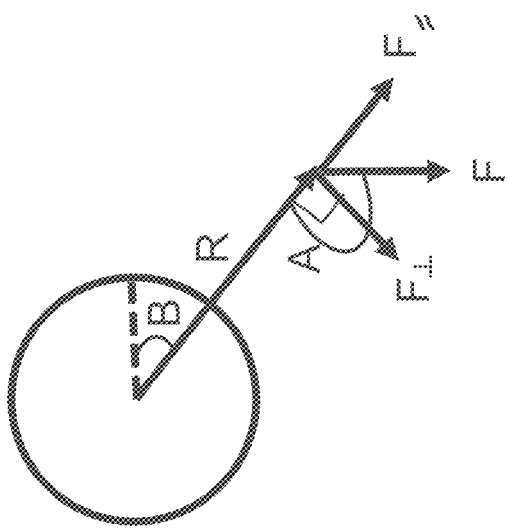

Next, please refer to FIGS. 8F-8H. When the first two-ways clutch 230A' and the second two-ways clutch 230B' are controlled to rotate along with same first rotation direction D1 as shown in FIG. 8F, and the first forcing apparatus 300 is moved to carry the first part 210 to move along with (+) first axis as shown in FIG. 8G, the first two-ways clutch 230A' is slipped along with the first linear part 450A without any linkage, and the second two-ways clutch 230B' is backstoppedly engaged with the second linear part 450B to carry the first linear part 450A to move forward toward (+) first axis and drive the first roller 100, the first driving axis 110, the second roller 120 and the second driving axis 130 to rotate along with the same second rotation direction D2. When the first two-ways clutch 230A' and the second two-ways clutch 230B' are controlled to rotate along with same first rotation direction D1 as shown in FIG. 8F, and the first forcing apparatus 300 is moved to carry the first part 210 to move along with (+) first axis as shown in FIG. 8H, the second two-ways clutch 230B' is slipped along with the second linear part 450B without any linkage, and the first two-ways clutch 230A' is backstoppedly engaged with the first linear part 450A to carry the first linear part 450A to move forward toward (−) first axis and drive the first roller 100, the first driving axis 110, the second roller 120 and the second driving axis 130 to rotate along with the same second rotation direction D2.

Next, please refer to FIGS. 8F-8H. When the third two-ways clutch 430A' and the fourth two-ways clutch 230B' are controlled to rotate along with same first rotation direction D1 as the first two-ways clutch 230A' and the second two-ways clutch 230B' as shown in FIG. 8F, and the second forcing apparatus 500 is moved to carry the second part 410 to move along with (+) first axis as shown in FIG. 8G, the third two-ways clutch 430A' is slipped along with the third linear part 550A without any linkage, and the fourth two-ways clutch 430W is backstoppedly engaged with the fourth linear part 550B to carry the fourth linear part 550B to move forward toward (+) first axis and drive the first roller 100, the first driving axis 110, the second roller 120 and the second driving axis 130 to rotate along with the same second rotation direction D2. Similarly, when the third two-ways clutch 430A' and the fourth two-ways clutch 230B' are controlled to rotate along with same first rotation direction D1 as the first two-ways clutch 230A' and the second two-ways clutch 230B' as shown in FIG. 8F, and the second forcing apparatus 500 is moved to carry the second part 410 to move along with (−) first axis, the fourth two-ways clutch 430B' is slipped along with the fourth linear part 550B without any linkage, and the third two-ways clutch 430A' is backstoppedly engaged with the third linear part 550A to carry the third linear part 550A to move forward toward (−) first axis and drive the first roller 100, the first driving axis 110, the second roller 120 and the second driving axis 130 to rotate along with the same second rotation direction D2.

The rotation direction of the first roller 100 and the second roller 120 can be changed by controlling the first two-ways clutch 230A', the second two-ways clutch 230B', the third two-ways clutch 430A', and the fourth two-ways clutch 430B' to rotate along with the first rotation direction D1 or the second rotation direction D2.

The first closed driving element 450 and the second closed driving element 550 of the reciprocating linear prime mover 8000 can optionally be integrated as a whole, and the first linear part 450A and the third linear part 550A are integrated as a whole, and the second linear part 450B and the fourth linear part 550B are integrated as a whole.

Furthermore, according to other embodiment of this invention, the reciprocating linear prime mover 5000 can optionally comprises a guiding mechanism 40, for example but not limited to a guiding rail or a cable line, and the first part 210 can be guided by the guiding mechanism 40 to reciprocatingly move along with the first axis.

This preset invention has been described by way of example and in terms of the preferred embodiments, it is to be understood that the invention is not limited to the disclosed-loop embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A reciprocating linear prime mover, comprising:
a first roller, disposed on a first driving axis extended along a Y-axis;
a second roller, disposed on a second driving axis extended along the Y-axis;
a closed first linear driving element winded on and between the first roller and the second roller, comprising a first linear part and a second linear part between the first roller and the second roller, wherein the second linear part is above the first linear part along a Z-axis;
a first part disposed between the first roller and the second roller, wherein the first part is reciprocatingly moved along an X-axis, and the first part comprises at least a first one-way clutch adjacent to an outer side of the first linear part and contacting therewith, and at least a second one-way clutch adjacent to an outer side of the second linear part and contacting therewith, and the first one-way clutch and the second one-way clutch rotate in a same second rotation direction D2; and
a first forcing apparatus fastened on the first part;
wherein, the X axis the Y-axis and the Z-axis are perpendicular to each other;
wherein, when the first forcing apparatus is moved to carry the first part to move forward along the X-axis, the second one-way clutch is slipped along with the second linear part, and the first one-way clutch is engaged with the first linear part to carry the first linear part to move forward along the X-axis and drive the first roller, the first driving axis, the second roller and the second driving axis to rotate in a same first rotation direction D1;
wherein, when the first forcing apparatus is moved to carry the first part to move backward along the X-axis, the first one-way clutch is slipped along with the first linear part, and the second one-way clutch is engaged with the second linear part to carry the second linear part to move backward along the X-axis and drive the first roller, the first driving axis, the second roller and the second driving axis to rotate in the same first rotation direction D1.

* * * * *